US006744745B1

(12) United States Patent
Fukui

(10) Patent No.: US 6,744,745 B1
(45) Date of Patent: Jun. 1, 2004

(54) SYSTEM FOR PROVIDING INFORMATION AND AN APPARATUS WHICH RECEIVES THE INFORMATION

(75) Inventor: Satoru Fukui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 748 days.

(21) Appl. No.: 09/696,022

(22) Filed: Oct. 26, 2000

(30) Foreign Application Priority Data

Dec. 3, 1999 (JP) .......................................... 11-345514

(51) Int. Cl.[7] ................................................ H04B 7/216
(52) U.S. Cl. ........................ 370/320; 370/342; 455/427; 455/12.1
(58) Field of Search ................................ 370/315, 316, 370/319, 320, 329, 335, 342, 442; 455/427, 430, 11.1, 12.1, 13.1, 13.2, 13.4

(56) References Cited

U.S. PATENT DOCUMENTS 5,608,722 A * 3/1997 Miller ........................ 370/320
5,691,974 A * 11/1997 Zehavi et al. ............... 370/203
5,757,767 A * 5/1998 Zehavi ....................... 370/208
6,240,124 B1 * 5/2001 Wiedeman et al. ......... 375/130
6,377,557 B1 * 4/2002 Ohlson et al. .............. 370/320

FOREIGN PATENT DOCUMENTS

JP HEI 8-87234 A 4/1996
JP HEI 11-38872 A 2/1999

* cited by examiner

*Primary Examiner*—Douglas Olms
*Assistant Examiner*—Bob A. Phunkulh
(74) *Attorney, Agent, or Firm*—Staas & Halsey LLP

(57) ABSTRACT

Information transmitting station transmits code division multiplexed information to many mobile units via a satellite. An information receiving apparatus is mounted on each automobile running on the ground and it receives the multiplexed information. In this information receiving apparatus, a self-position calculating section detects the position of the automobile using GPS, a PN code setting section retrieves a PN code corresponding to the position of the automobile from a table containing the correspondence of the two, and an information receiving section extracts the information related to the position of the automobile from the multiplexed information based on the retrieved PN code.

10 Claims, 26 Drawing Sheets

FIG.4A $T_1$ $P_A$ (THE NORTH LATITUDE 35 DEGREES, AND THE EAST LONGITUDE 135 DEGREES) = PN CODE $C_A$ (= 11000011)
$P_B$ (THE NORTH LATITUDE 35 DEGREES, AND THE EAST LONGITUDE 136 DEGREES) = PN CODE $C_B$ (= 11001100)
$P_C$ (THE NORTH LATITUDE 35 DEGREES, AND THE EAST LONGITUDE 137 DEGREES) = PN CODE $C_C$ (=10011001)

FIG.4B $T_2$ $A_A$ (THE NORTH LATITUDE 35±0.5 DEGREES, AND THE EAST LONGITUDE 135±0.5 DEGREES) = PN CODE $C_A$ (= 11000011)
$A_B$ (THE NORTH LATITUDE 35±0.5 DEGREES, AND THE EAST LONGITUDE 136±0.5 DEGREES) = PN CODE $C_B$ (= 11001100)
$A_C$ (THE NORTH LATITUDE 35±0.5 DEGREES, AND THE EAST LONGITUDE 137±0.5 DEGREES) = PN CODE $C_C$ (= 10011001)

FIG.14A

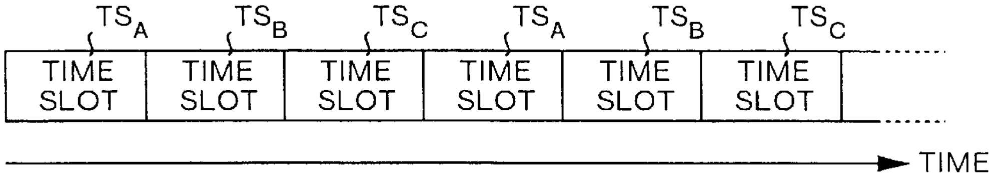

FIG.14B $T_3$ $P_A$ (THE NORTH LATITUDE 35 DEGREES, AND THE EAST LONGITUDE 135 DEGREES) = TIME SLOT $TS_A$
$P_B$ (THE NORTH LATITUDE 35 DEGREES, AND THE EAST LONGITUDE 136 DEGREES) = TIME SLOT $TS_B$
$P_C$ (THE NORTH LATITUDE 35 DEGREES, AND THE EAST LONGITUDE 137 DEGREES) = TIME SLOT $TS_C$

FIG.14C $T_4$ $A_A$ (THE NORTH LATITUDE 35±0.5 DEGREES, AND THE EAST LONGITUDE 135±0.5 DEGREES) = TIME SLOT $TS_A$
$A_B$ (THE NORTH LATITUDE 35±0.5 DEGREES, AND THE EAST LONGITUDE 136±0.5 DEGREES) = TIME SLOT $TS_B$
$A_C$ (THE NORTH LATITUDE 35±0.5 DEGREES, AND THE EAST LONGITUDE 137±0.5 DEGREES) = TIME SLOT $TS_C$

FIG.19

TABLE $T_5$

| TYPE OF MOBILE UNIT | SPEED SECTOR /SPEED RANGE (km/HOUR) | TIME SLOT | PROVIDED INFORMATION /CONTENTS |
|---|---|---|---|
| LOW-SPEED MOBILE UNIT | LOW SPEED /EQUAL TO OR ABOVE 0 AND LESS THAN 40 | TIME SLOT $TS_A$ | $J_A$ /CLASSIC MUSIC |
| MEDIUM-SPEED MOBILE UNIT | MEDIUM SPEED /EQUAL TO OR ABOVE 40 AND LESS THAN 60 | TIME SLOT $TS_B$ | $J_B$ /JAZZ MUSIC |
| HIGH-SPEED MOBILE UNIT | HIGH SPEED /EQUAL TO OR ABOVE 60 | TIME SLOT $TS_C$ | $J_C$ /ROCK MUSIC |

FIG.23

TABLE $T_6$

| TYPE OF MOBILE UNIT | SPEED SECTOR /SPEED RANGE (km/HOUR) | PN CODE | PROVIDED INFORMATION /CONTENTS |
|---|---|---|---|
| LOW-SPEED MOBILE UNIT | LOW SPEED /EQUAL TO OR ABOVE 0 AND LESS THAN 40 | PN CODE $C_A$ | $J_A$ /CLASSIC MUSIC |
| MEDIUM-SPEED MOBILE UNIT | MEDIUM SPEED /EQUAL TO OR ABOVE 40 AND LESS THAN 60 | PN CODE $C_B$ | $J_B$ /JAZZ MUSIC |
| HIGH-SPEED MOBILE UNIT | HIGH SPEED /EQUAL TO OR ABOVE 60 | PN CODE $C_C$ | $J_C$ /ROCK MUSIC |

SYSTEM FOR PROVIDING INFORMATION AND AN APPARATUS WHICH RECEIVES THE INFORMATION

FIELD OF THE INVENTION

The present invention relates to a system for providing information to mobile units like vehicles, and an information receiving apparatus.

BACKGROUND OF THE INVENTION

In recent years, high-level road traffic systems called ITS (Intelligent Transport Systems) have been arranged. The high-level road traffic systems in this case refer to traffic systems that solve various problems attributable to traffic matters like traffic accidents, traffic jams, environmental pollution, etc., by driving techniques of information communication and electronic control.

As representative high-level road traffic systems, there are available a highway radio, a VICS (Vehicle Information and Communication System) called a road traffic information system, and an ETC (Electronic Toll Collection System) called an automatic toll collection system. However, in order to arrange these high-level road traffic systems, there has been a problem of high facility cost.

The highway radio and the VICS have conventionally been distributed as a part of the high-level road traffic systems for broadcasting road traffic information to mobile units like vehicles. The highway radio is for broadcasting road traffic information from a radio base station by utilizing a frequency of, for example, 1620 kHz.

The VICS is for broadcasting road traffic information from a radio base station such as a wave beacon, an optical beacon, an FM (Frequency Modulation) multiplex broadcasting station, etc. The highway radio and the VICS employ a micro cell structure having a plurality of micro cells arranged along a road, each micro cell having a radius of about a few km. Therefore, the highway radio and the VICS require a radio base station at each micro cell, and have a large number of radio base stations installed at every few kilometers.

Recently, in addition to the highway radio and the VICS, there has also been introduced an on-demand type information providing system in which a mobile unit transmits a request for information to an information center by radio, and the information center provides the requested information to the mobile unit. According to this on-demand type information providing system, a user who is on a mobile unit makes an access to the information center from a digital portable telephone, and gives a message to an operator about the information the user wants to receive. Then, this requested information is provided to the user through a car navigation system or the like.

As the conventional highway radio and VICS employ a micro cell structure as described above, it is necessary to install a large number of radio base stations at every few kilometers, which has had a problem of a very high installation cost.

Further, in the on-demand type information providing system, a user must make an access to the center each time the user wants to receive information. Therefore, this system has a problem in that it is not convenient to utilize this system, and that the quality of the information provision service is low.

SUMMARY OF THE INVENTION

It is an object of this invention to provide a system for providing information and an apparatus that receives the information in which it is possible to lower the cost and improve the quality of the information provision service.

The information providing system according to this invention comprises a transmitting station for transmitting multiplex information having a plurality of pieces of contents information to be provided to a mobile unit multiplexed, to a ground surface via a relay unit in the sky; and an information receiving apparatus that is mounted on the mobile unit, for receiving the multiplex information. Further, the information receiving apparatus comprises a receiving unit receiving the multiplex information; a self-position detecting unit detecting a self-position of the mobile unit; a memory unit storing a table that represents a relationship between extraction information that is used for extracting contents information from the multiplex information and position information relating to a position at which the mobile unit can exist; a retrieving unit retrieving the position information corresponding to the self-position from the table, and thereafter for retrieving the extraction information corresponding to the position information; and an extracting unit extracting the contents information from the multiplex information that has been received by the receiving unit, based on the extraction information retrieved from the retrieving unit.

The information receiving apparatus according to the present invention comprises a receiving unit mounted on a mobile unit, for receiving multiplex information that has been transmitted to a ground surface via a relay unit in the sky and that has a plurality of pieces of contents information multiplexed; a self-position detecting unit detecting a self-position of the mobile unit; a memory unit storing a table that shows a relationship between extraction information that is used for extracting contents information from the multiplex information and position information relating to a position at which the mobile unit can exist; a retrieving unit retrieving the position information corresponding to the self-position from the table, and thereafter for retrieving the extraction information corresponding to the position information; and an extracting unit extracting the contents information from the multiplex information that has been received by the receiving unit, based on the extraction information retrieved from the retrieving unit.

Multiplex information transmitted via the relay unit is received by the receiving unit that is mounted on the mobile unit. The self-position detecting unit in the information receiving apparatus detects the position of the mobile unit (hereafter, self-position). The retrieving unit retrieves the position information of the self-position from the contents of the table, and then retrieves the extraction information corresponding to the position information. Based on this, the extracting unit extracts contents information from the multiplex information that has been received by the receiving unit. The extracted contents information is the information corresponding to the position information relating to the self-position of the mobile unit. If the mobile unit moves, then the self-position detected by the self-position detecting unit and the position information and the extraction information retrieved by the retrieving unit change. Therefore, in this case, the contents information extracted by the extracting unit also changes. In other words, the extracted contents information automatically changes corresponding to the change in the self-position of the mobile unit.

Thus, based on the transmission of the multiplex information to the ground surface from the relay unit in the sky, it becomes possible to provide information over an extremely wider range than it has been able to provide by the conventional highway radio. In principle, the installation of a minimum one transmitting station is sufficient. Therefore, it becomes possible to lower the installation cost.

Further, the extraction information and the position information at which the mobile unit can exist are corresponded to each other in the table. At the same time, the self-position of the mobile unit and the contents information are corresponded to each other indirectly, and the extracted contents information is automatically changed along with the move of the mobile unit. Therefore, a user can handle the information providing system of this invention substantially better than the conventional on-demand type information providing system. As a result, it is possible to improve the quality of the information provision service.

Other objects and features of this invention will become apparent from the following description with reference to the accompanying drawings.

BRIEF DESCRIPTION OF THE DRAWINGS

FIG. 4A and FIG. 4B are views showing a position/PN code table $T_1$ and an area/PN code table $T_2$ used in the first embodiment respectively.

FIG. 14A to FIG. 14C are views showing time slots $TS_A$ to $TS_C$, a position/time slot table $T_3$, and an area/time slot table $T_4$ of the fourth embodiment respectively.

FIG. 19 is a view showing a table $T_5$ used in the fifth embodiment.

FIG. 23 is a view showing a table $T_6$ used in the sixth embodiment.

DESCRIPTION OF THE PREFERRED EMBODIMENTS

Seventh preferred embodiment of the information providing system and the information receiving apparatus relating to the present invention will be explained below with reference to the drawings.

Figure 1:
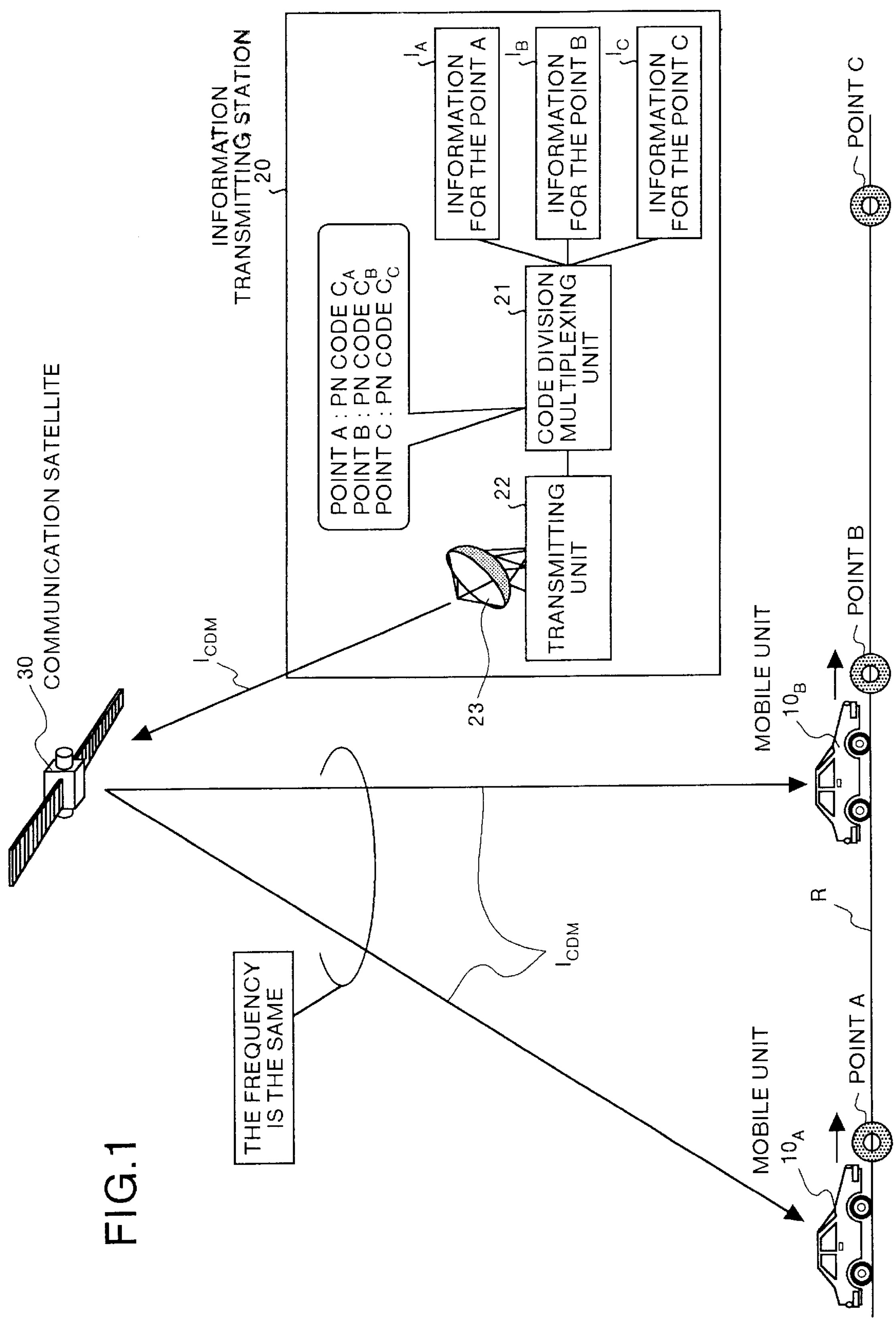
FIG. 1 is a view showing the structure of a first embodiment relating to the present invention.
Figure 2:
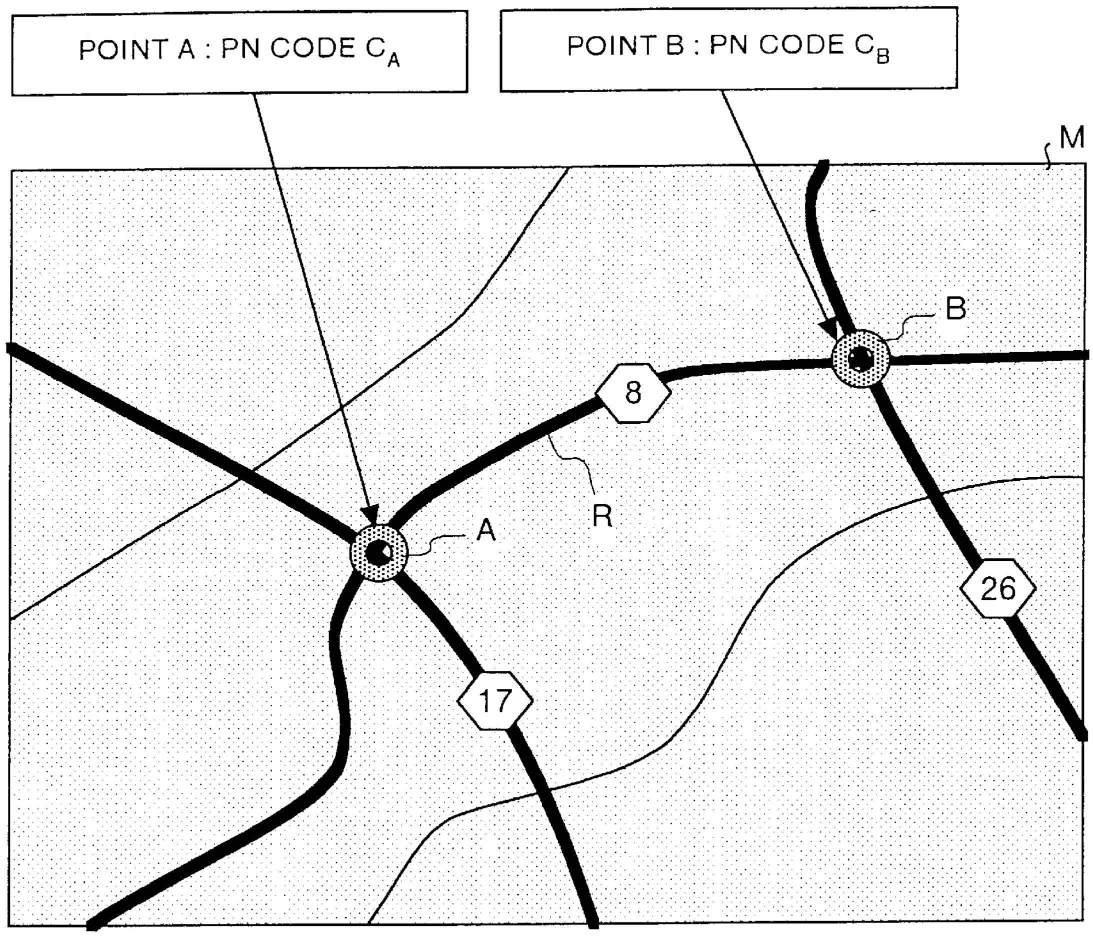
FIG. 2 is a view showing a map M including a point A and a point B shown in FIG. 1.

FIG. 1 is a view showing the structure of a first embodiment relating to the present invention. In FIG. 1, a mobile unit $\mathbf{10}_A$ is a vehicle that is running toward a point A on a moving route R (for example, a road) shown in FIG. 2. On this moving route R, there exist the point A, a point B, and a point C from left to the right as shown in FIG. 1. FIG. 2 shows a map M that two dimensionally expresses the moving rout R, the point A and the point B.

Referring back to FIG. 1, a mobile unit $\mathbf{10}_B$ is a vehicle that is positioned in an area between the point A and the point B, and is running toward the point B. Each of the mobile unit $\mathbf{10}_A$ and the mobile unit $\mathbf{10}_B$ is mounted with an information receiving apparatus 40 (refer to FIG. 3) for receiving information provided from an information provider. A detailed structure of the information receiving apparatus 40 will be explained later.

An information transmitting station 20 is a broadcasting station that multiplexes information $I_A$ for the point A, information $I_B$ for the point B, and information $I_C$ for the point C provided from the information provider respectively, by using a code division multiplex (CDM) system, and that transmits the multiplexed information to the mobile units as code division multiplexed information $I_{CDM}$.

This information transmitting station 20 is installed with a code division multiplexing unit 21, a transmitting unit 22, and a parabolic antenna 23. The code division multiplexing unit 21 is a unit for code division multiplexing the information $I_A$ for the point A, the information $I_B$ for the point B, and the information $I_C$ for the point C by using a PN (Pseudo Noise) code $C_A$, a PN code $C_B$, and a PN code $C_C$ corresponding to these information respectively.

The information $I_A$ for the point A, the information $I_B$ for the point B, and the information $I_C$ for the point C are mutually different kinds of information, and these correspond to the PN code $C_A$, the PN code $C_B$, and the PN code $C_C$ respectively. The information $I_A$ for the point A is the information for a mobile unit that is positioned at the point A (or in an area including the point A) on the moving route R. This information $I_A$ for the point A is the information that includes weather information at the point A, traffic information at the point A, news information specialized in the area including the-point A, etc.

The information $I_B$ for the point B is the information for a mobile unit that is positioned at the point B (or in an area including the point B) on the moving route R. This information $I_B$ for the point B is the information that includes weather information at the point B, traffic information at the point B, news information specialized in the area including the point B, etc. The information $I_C$ for the point C is the information for a mobile unit that is positioned at the point C (or in an area including the point C) on the moving route R. This information $I_C$ for the point C is the information that includes weather information at the point C, traffic information at the point C, news information specialized in the area including the point C, etc.

The PN code $C_A$, the PN code $C_B$, and the PN code $C_C$ have wider bands than the bands of the information $I_A$ for the point A, the information $I_B$ for the point B, and the information $I_C$ for the point C respectively. Each of the PN code $C_A$, the PN code $C_B$, and the PN code $C_C$ is a diffusion code that is multiplied with the corresponding one of the information $I_A$ for the point A, the information $I_B$ for the point B, and the information $I_C$ for the point C. Thus, the information $I_A$ for the point A, the information $I_B$ for the point B, and the information $I_C$ for the point C are spectrum diffused respectively.

The code division multiplexing unit 21 multiplies the information $I_A$ for the point A of the narrow band with the PN code $C_A$ of the wide band, multiplies the information $I_B$ for the point B of the narrow band with the PN code $C_B$ of the wide band, and multiplies the information $I_C$ for the point C of the narrow band with the PN code $C_C$ of the wide band. Then, the code division multiplexing unit 21 sums up the three multiplied results, and outputs the summed-up result as code division multiplexed information $I_{CDM}$ to the transmitting unit 22.

The transmitting unit 22 transmits the code division multiplexed information $I_{CDM}$ to a communication satellite 30 via the parabolic antenna 23. The communication satellite 30 functions as a relay unit. The communication satellite 30 receives the code division multiplexed information $I_{CDM}$ that has been transmitted from the parabolic antenna 23, and then transmits the code division multiplexed information $I_{CDM}$ to a ground surface including at least the point A, the point B and the point C.

Figure 3:
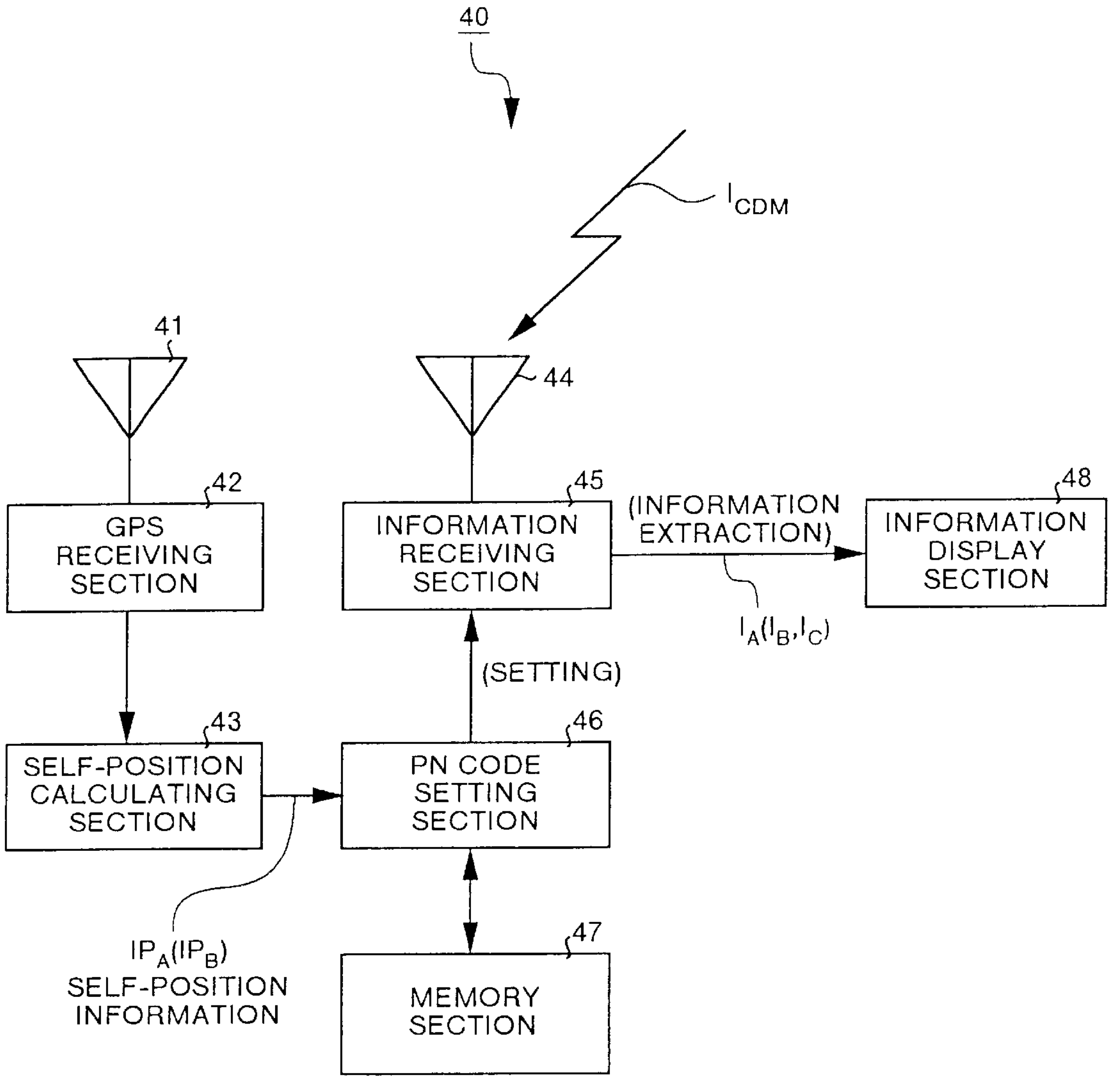
FIG. 3 is a block diagram showing the structure of an information receiving apparatus 40 used in the first embodiment.

An information receiving apparatus 40 shown in FIG. 3 is mounted on a mobile unit (for example, the mobile unit $\mathbf{10}_A$ and the mobile unit $\mathbf{10}_B$). The information receiving apparatus 40 has a measuring function for measuring a self-position of the mobile unit by utilizing a GPS (Global Positioning System), a receiving function for receiving the code division multiplexed information $I_{CDM}$ from the communication satellite 30, an information extracting function for extracting information corresponding to the point at which the mobile unit is located from the code division multiplexed information $I_{CDM}$ based on the self-position, and a display function for displaying the extracted information.

In this information receiving apparatus 40, a GPS receiving section 42 receives via the antenna 41 waves from at least four GPS satellites out of 24 GPS satellites (not shown) that fly in a circular orbit at the height of about 20,000 km. A self-position calculating section 43 obtains four unknown numbers (latitude, longitude, height, and time error) that include three-dimensional coordinates (latitude, longitude, and height) of a mobile unit and a time error within the device, based on a result of the reception by the GPS receiving section 42. The self-position calculating section 43 outputs the latitude and the longitude out of the four unknown numbers (latitude, longitude, and height) that have been obtained.

A PN code setting section 46 sets to an information receiving section 45 a PN code (for example, the PN code $C_A$, or the PN code $C_B$, or the PN code $C_C$ shown in FIG. 1) that corresponds to the self-position information from the self-position calculating section 43. This PN code is a code for extracting the information $I_A$ for the point A, the information $I_B$ for the point B, or the information $I_C$ for the point C from the code division multiplexed information $I_{CDM}$, based on a correlation with the code division multiplexed information $I_{CDM}$.

Specifically, the PN code setting section 46 retrieves the PN code corresponding to a position nearest to the self-position from a position/PN code table $T_1$ (refer to FIG. 4A) stored in a memory section 47, by using the self-position information from the self-position calculating section 43 as a key. Then, the PN code setting section 46 sets the retrieved PN code to the information receiving section 45. The position/PN code table $T_1$ shown in FIG. 4A is a table that defines a relationship between the position and the PN code.

In the example shown in FIG. 4A, the position $P_A$ at the point A is a position (the north latitude 35 degrees, and the east longitude 135 degrees) at the point A (refer to FIG. 1 and FIG. 2). The PN code $C_A$ corresponding to this position $P_A$ at the point A is the PN code (=11000011) that is set to the information receiving section 45 at the time of extracting the information $I_A$ for the point A (refer to FIG. 1) from the code division multiplexed information $I_{CDM}$.

The position $P_B$ at the point B is a position (the north latitude 35 degrees, and the east longitude 136 degrees) at the point B (refer to FIG. 1 and FIG. 2). The PN code $C_B$ corresponding to this position $P_B$ at the point B is the PN code (=11001100) that is set to the information receiving section 45 at the time of extracting the information $I_B$ for the point B from the code division multiplexed information $I_{CDM}$. The position $P_C$ at the point C is a position (the north latitude 35 degrees, and the east longitude 137 degrees) at the point C (refer to FIG. 1). The PN code $C_C$ corresponding to this position $P_C$ at the point C is the PN code (=10011001) that is set to the information receiving section 45 at the time of extracting the information $I_C$ for the point C from the code division multiplexed information $I_{CDM}$.

The information receiving section 45 receives via the antenna 44 the code division multiplexed information $I_{CDM}$ that has been relayed to the communication satellite 30 (refer to FIG. 1). The information receiving section 45 correlates the received code division multiplexed information $I_{CDM}$ with the PN code that has been set by the PN code setting section 46. Thus, the information receiving section 45 extracts the information (the information $I_A$ for the point A, the information $I_B$ for the point B, or the information $I_C$ for the point C) that corresponds to the PN code (the PN code $C_A$, the PN code $C_B$, or the PN code $C_C$) from the code division multiplexed information $I_{CDM}$. An information display section 48 is an LCD (Liquid Crystal Display) or a CRT (cathode-ray tube) that displays the information extracted by the information receiving section 45.

Figure 5:
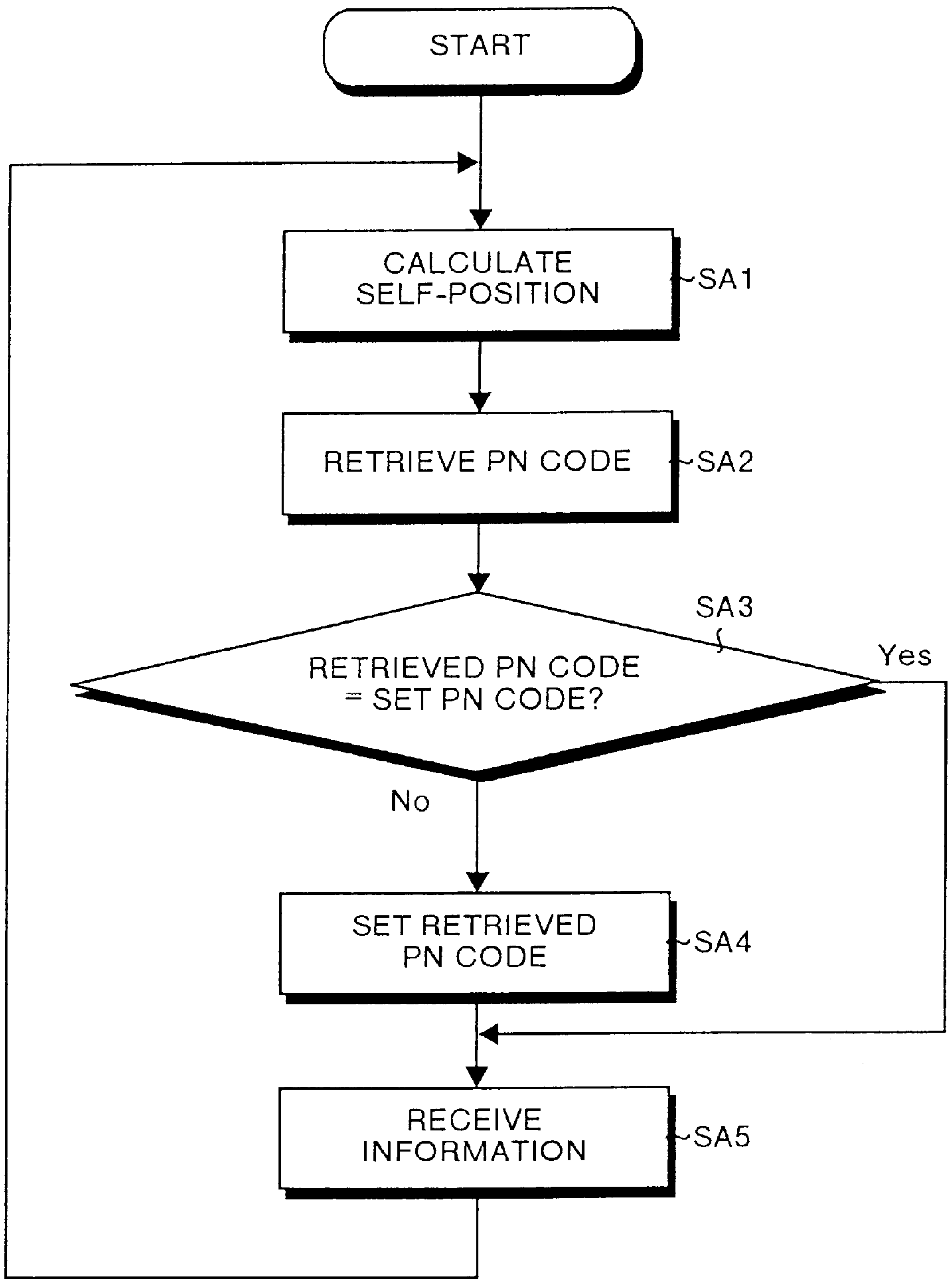
FIG. 5 is a flowchart for explaining an operation example 1 of the first embodiment.

An operation example 1 of the first embodiment will be explained next with reference to a flowchart shown in FIG. 5. When the information $I_A$ for the point A, the information $I_B$ for the point B, and the information $I_C$ for the point C shown in FIG. 1 have been input to the code division multiplexing unit 21, the code division multiplexing unit 21 code division multiplexes the information $I_A$ for the point A, the information $I_B$ for the point B, and the information $I_C$ for the point C respectively.

In other words, the code division multiplexing unit 21 multiplies the information $I_A$ for the point A of the narrow band with the PN code $C_A$ of the wide band, multiplies the information $I_B$ for the point B of the narrow band with the PN code $C_B$ of the wide band, and multiplies the information $I_C$ for the point C of the narrow band with the PN code $C_C$ of the wide band. Then, the code division multiplexing unit 21 sums up the three multiplied results, generates the summed-up result as the code division multiplexed information $I_{CDM}$, and outputs this to the transmitting unit 22. Then, the transmitting unit 22 transmits the code division multiplexed information $I_{CDM}$ to the communication satellite 30 from the parabolic antenna 23. This code division multiplexed information $I_{CDM}$ is relayed to the communication satellite 30, and is then transmitted to the ground surface including the point A, the point B and the point C.

It is assumed that the mobile unit $10_A$ that is moving along the moving route R is positioned near the point A, and the mobile unit $10_B$ is positioned near the point B. When the GPS receiving section 42 of the information receiving apparatus 40 mounted on the mobile unit $10_A$ has received the waves from four GPS satellites (not shown) via the antenna 41, the self-position calculating section 43 proceeds to step SA1 shown in FIG. 5. At step SA1, the self-position calculating section 43 obtains the self-position (latitude and longitude) of the mobile unit $10_A$ from the result of the reception by the GPS receiving section 42, and outputs this self-position to the PN code setting section 46 as self-position information $IP_A$.

At step SA2, the PN code setting section 46 retrieves the PN code corresponding to a position nearest to the self-position of the mobile unit $10_A$ from the position/PN code table $T_1$ shown in FIG. 4A by using the self-position information $IP_A$ from the self-position calculating section 43 as a key. In this case, it is assumed that the position $P_A$ at the point A within the position/PN code table $T_1$ is the nearest to the self-position of the mobile unit $10_A$. After the PN code setting section 46 has retrieved the PN code $C_A$ (=11000011) corresponding to the position $P_A$ at the point A from the position/PN code table $T_1$, the PN code setting section 46 proceeds to step SA3.

At step SA3, the PN code setting section 46 makes a decision as to whether or not the PN code (a retrieved PN code) that has been retrieved at step SA2 coincides with the PN code (a set PN code) that has already been set in the information receiving section 45. When the retrieved PN code does not coincide with the set PN code, the PN code setting section 46 sets "No" as a result of the decision made at step SA3, and then proceeds to step SA4. When the retrieved PN code coincides with the set PN code, the PN code setting section 46 sets "Yes" as a result of the decision made at step SA3, and does not set a new PN code to the information receiving section 45.

At step SA4, the PN code setting section 46 sets the PN code $C_A$ (refer to FIG. 2 and FIG. 4A) retrieved at step SA2 to the information receiving section 45. Next, at step SA5, the information receiving section 45 correlates the code division multiplexed information $I_{CDM}$ that has been received via the antenna 44 with the PN code $C_A$ that has been set by the PN code setting section 46. Thus, the information receiving section 45 extracts the information $I_A$ for the point A (refer to FIG. 1) from the code division multiplexed information $I_{CDM}$. Then, the information receiving section 45 outputs the information $I_A$ for the point A to the information display section 48.

Figure 6:
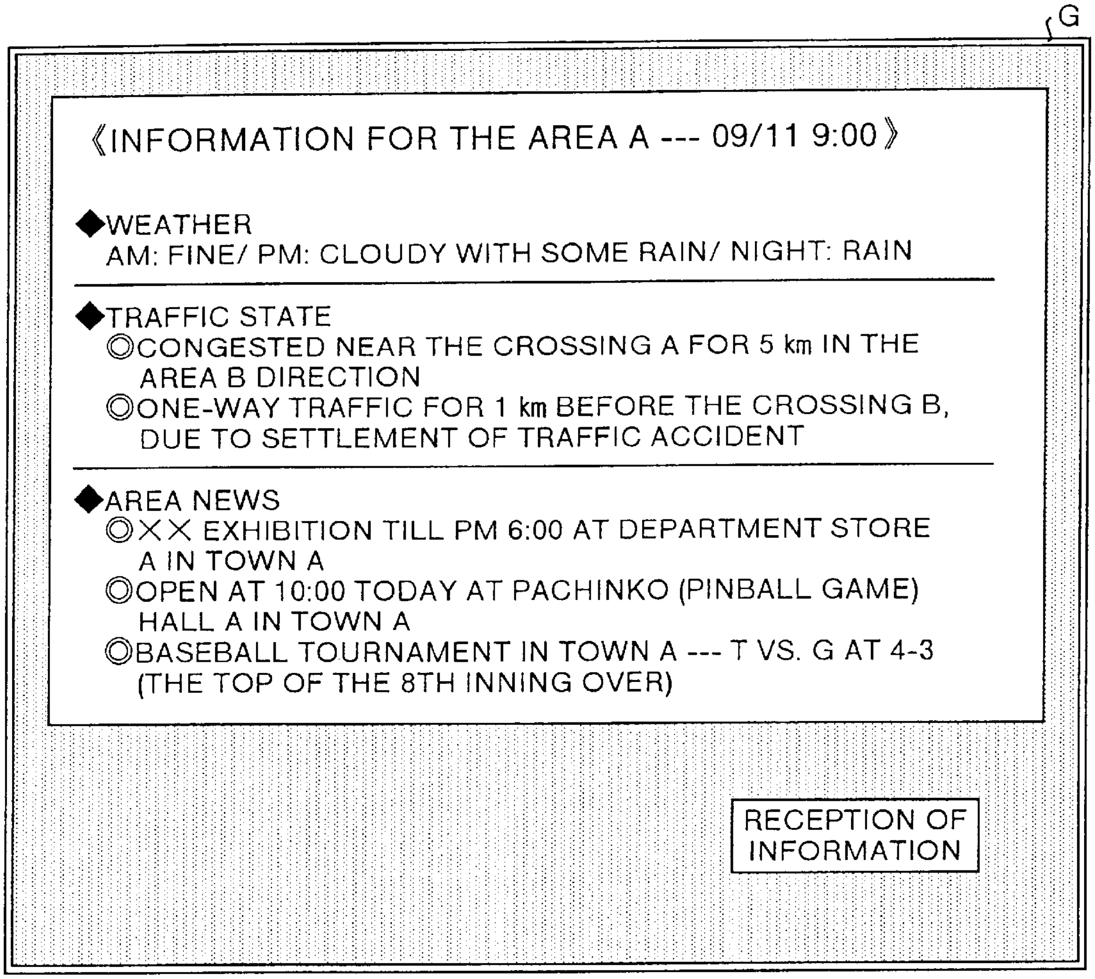
FIG. 6 is a view showing one example of a surface screen G of an information display section 48 shown in FIG. 3.

Then, the information display section 48 displays a display screen G shown in FIG. 6. As shown in FIG. 6, the information display section 48 displays the "weather" information at the point A, the "traffic information" at the point A, and the "area news" information of the area including the point A. Thereafter, the information receiving apparatus 40 that is mounted on the mobile unit $10_A$ repeats the execution of the processing at step SA1 to step SA5 shown in FIG. 5.

In the mean time, in parallel with the operation of the information receiving apparatus 40 mounted on the mobile unit $10_A$, the GPS receiving section 42 of the information receiving apparatus 40 mounted on the mobile unit $10_B$ shown in FIG. 1 receives waves from four GPS satellites (not shown) via the antenna 41. Then, the self-position calculating section 43 proceeds to step SA1 shown in FIG. 5. At step SA1, the self-position calculating section 43 obtains the self-position (latitude and the longitude) of the mobile unit $10_B$ from the result of the reception by the GPS receiving section 42, and outputs this self-position to the PN code setting section 46 as self-position information $IP_B$.

At step SA2, the PN code setting section 46 retrieves the PN code corresponding to a position nearest to the self-position of the mobile unit $10_B$ from the position/PN code table $T_1$ shown in FIG. 4A by using the self-position information $IP_B$ from the self-position calculating section 43 as a key. In this case, it is assumed that the position $P_B$ at the point B within the position/PN code table $T_1$ is the nearest to the self-position of the mobile unit $10_B$. After the PN code setting section 46 has retrieved the PN code $C_B$ (=11001100) corresponding to the position $P_B$ at the point B from the position/PN code table $T_1$, the PN code setting section 46 proceeds to step SA3.

At step SA3, the PN code setting section 46 makes a decision as to whether or not the PN code (a retrieved PN code) that has been retrieved at step SA2 coincides with the PN code (a set PN code) that has already been set in the information receiving section 45. When the retrieved PN code does not coincide with the set PN code, the PN code setting section 46 sets "No" as a result of the decision made at step SA3, and then proceeds to step SA4. At step SA4, the PN code setting section 46 sets the PN code $C_B$ (refer to FIG. 2 and FIG. 4A) retrieved at step SA2 to the information receiving section 45.

Next, at step SA5, the information receiving section 45 correlates the code division multiplexed information $I_{CDM}$ that has been received via the antenna 44 with the PN code $C_B$ that has been set by the PN code setting section 46. Thus, the information receiving section 45 extracts the information $I_B$ for the point B (refer to FIG. 1) from the code division multiplexed information $I_{CDM}$. Then, the information receiving section 45 outputs the information $I_B$ for the point B to the information display section 48. Then, the information display section 48 displays the information $I_B$ for the point B. Thereafter, the information receiving apparatus 40 that is mounted on the mobile unit $10_B$ repeats the execution of the processing at step SA1 to step SA5 shown in FIG. 5.

When the mobile unit $10_A$ that is in the moving state shown in FIG. 1 comes close to the point B, at step SA1, the self-position calculating section 43 obtains the self-position (latitude and longitude) of the mobile unit $10_A$ from the result of the reception by the GPS receiving section 42, and outputs this self-position to the PN code setting section 46 as the self-position information $IP_A$ At step SA2, the PN code setting section 46 retrieves the PN code corresponding to a position nearest to the self-position of the mobile unit $10_A$ from the position/PN code table $T_1$ shown in FIG. 4A by using the self-position information $IP_A$ from the self-position calculating section 43 as a key. In this case, it is assumed that the position $P_B$ at the point B within the position/PN code table $T_1$ is the nearest to the self-position of the mobile unit $10_A$. After the PN code setting section 46 has retrieved the PN code $C_B$ (=11001100) corresponding to the position $P_B$ at the point B from the position/PN code table $T_1$, the PN code setting section 46 proceeds to step SA3.

At step SA3, the PN code setting section 46 makes a decision as to whether or not the PN code (=the PN code $C_B$) that has been retrieved at step SA2 coincides with the PN code (=the PN code CA) that has already been set in the information receiving section 45. As the two PN codes do not coincide with each other, the PN code setting section 46 sets "No" as a result of the decision made at step SA3, and then proceeds to step SA4. At step SA4, the PN code setting section 46 sets the PN code $C_B$ (refer to FIG. 2 and FIG. 4A) retrieved at step SA2 to the information receiving section 45.

Next, at step SA5, the information receiving section 45 correlates the code division multiplexed information $I_{CDM}$ that has been received via the antenna 44 with the PN code $C_B$ that has been set by the PN code setting section 46. Thus, the information receiving section 45 extracts the information $I_B$ for the point B (refer to FIG. 1) from the code division multiplexed information $I_{CDM}$. Then, the information receiving section 45 outputs the information $I_B$ for the point B to the information display section 48. Then, the information display section 48 displays the information $I_B$ for the point B instead of the information $I_A$ for the point A.

In the above operation example 1, the description has been made of the case where the PN code $C_A$ and others are corresponded to the position $P_A$ at the point A and others in the position/PN code table $T_1$shown in FIG. 4A. It is also good to make the PN code $C_A$ and others correspond to areas. This will be explained next as an operation example 2.

In the operation example 2, the memory section 47 shown in FIG. 3 stores an area/PN code table $T_2$ shown in FIG. 4B instead of the position/PN code table $T_1$ (refer to FIG. 4A). This area/PN code table $T_2$ is the table that defines a relationship between the area and the PN code.

In the example shown in FIG. 4B, an area $A_A$ is an area of the north latitude 35±0.5 degrees and the east longitude 135±0.5 degrees in which the point A (the north latitude 35 degrees, and the east longitude 135 degrees) exists. This area $A_A$ is corresponded to a PN code $C_A$ (=11000011). An area $A_B$ is an area of the north latitude 35±0.5 degrees and the east longitude 136±0.5 degrees in which the point B (the north latitude 35 degrees, and the east longitude 136 degrees) exists. This area $A_B$ is corresponded to a PN code $C_B$ (=11001100). An area $A_C$ is an area of the north latitude 35±0.5 degrees and the east longitude 137±0.5 degrees in which the point C (the north latitude 35 degrees, and the east longitude 137 degrees) exists. This area $A_C$ is corresponded to a PN code $C_C$ (=10011001).

Figure 7:
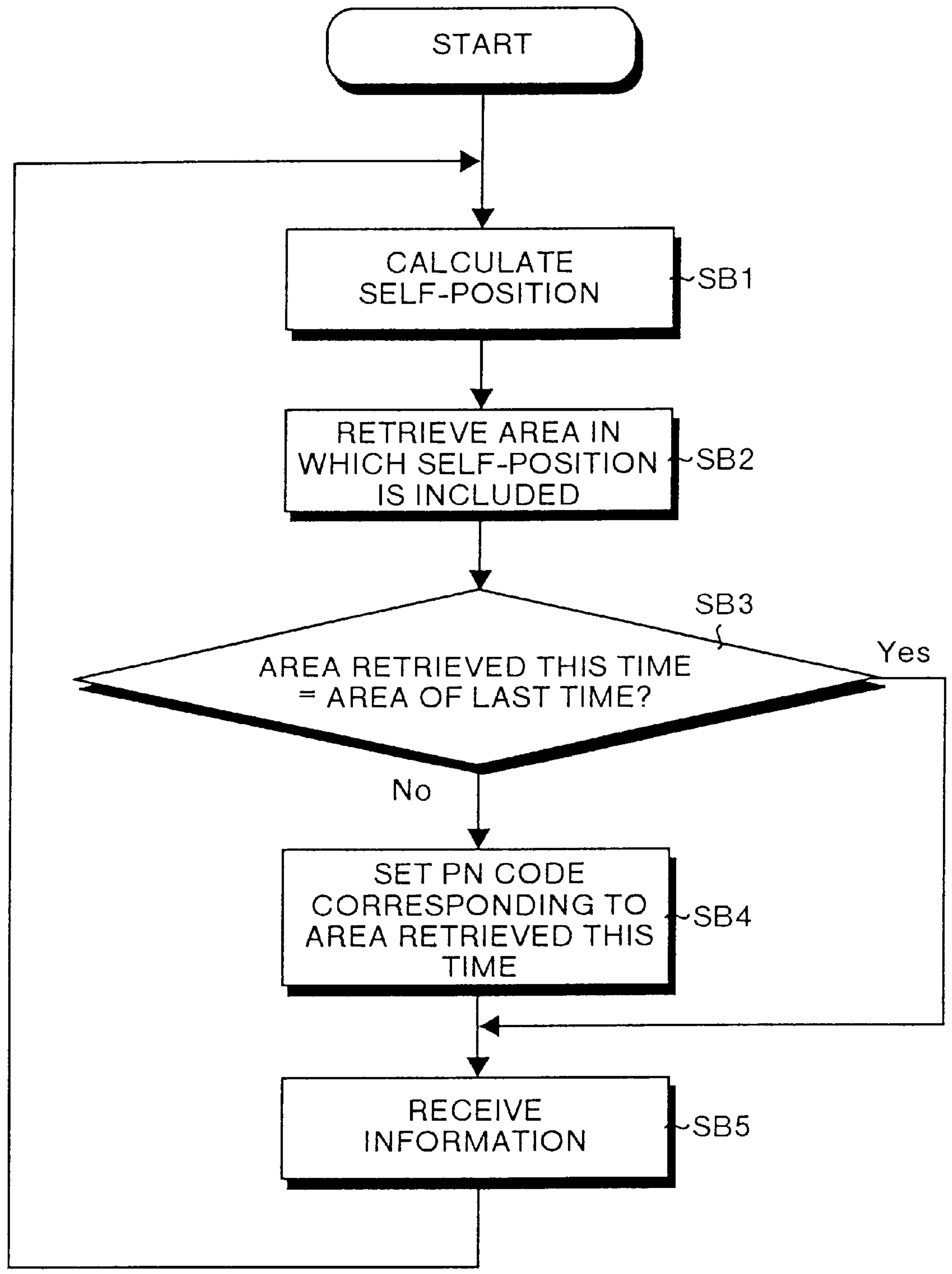
FIG. 7 is a flowchart for explaining an operation example 2 of the first embodiment.

Next, the operation example 2 of the first embodiment will be explained with reference to a flowchart shown in FIG. 7. It is assumed that the mobile unit $10_A$ that is moving along the moving route R shown in FIG. 1 is positioned near the point A, and the mobile unit $10_B$ is positioned near the point B. When the GPS receiving section 42 of the information receiving apparatus 40 mounted on the mobile unit $10_A$ has received the waves from four GPS satellites (not shown) via the antenna 41, the self-position calculating section 43 proceeds to step SB1 shown in FIG. 7.

At step SB1, the self-position calculating section 43 obtains the self-position (latitude and longitude) of the mobile unit $10_A$ from the result of the reception by the GPS receiving section 42, and outputs this self-position to the PN code setting section 46 as self-position information $IP_A$, in a similar manner to that as described for the operation example 1. At step SB2, the PN code setting section 46 retrieves an area in which the mobile unit $10_A$ exists from the area/PN code table $T_2$ shown in FIG. 4B by using the self-position information $IP_A$ from the self-position calculating section 43 as a key.

In this case, it is assumed that the mobile unit $10_A$ exists in the area $A_A$ within the area/PN code table $T_2$. After the PN code setting section 46 has retrieved the area $A_A$ from the area/PN code table $T_2$, the PN code setting section 46 proceeds to step SB3. At step SB3, the PN code setting section 46 makes a decision as to whether or not the area (a retrieved area) that has been retrieved this time at step SB2 coincides with the area that has been retrieved last time.

When the two areas do not coincide with each other, the PN code setting section 46 sets "No" as a result of the decision made at step SB3, and then proceeds to step SB4. When the area retrieved last time coincides with the area retrieved this time, the PN code setting section 46 sets "Yes" as a result of the decision made at step SB3. The PN code setting section 46 does not set a new PN code corresponding to the area retrieved this time, to the information receiving section 45.

At step SB4, the PN code setting section 46 sets the PN code $C_A$ (refer to FIG. 2 and FIG. 4B) corresponding to the area $A_A$ retrieved this time at step SB2, to the information receiving section 45. Next, at step SB5, the information receiving section 45 correlates the code division multiplexed information $I_{CDM}$ that has been received via the antenna 44 with the PN code $C_A$ that has been set by the PN code setting section 46. Thus, the information receiving section 45 extracts the information $I_A$ for the point A (refer to FIG. 1) from the code division multiplexed information $I_{CDM}$. Then, the information receiving section 45 outputs the information $I_A$ for the point A to the information display section 48.

Then, the information display section 48 displays the information $I_A$ for the point A. Thereafter, the information receiving apparatus 40 that is mounted on the mobile unit $10_A$ repeats the execution of the processing at step SB1 to step SB5 shown in FIG. 7.

In the mean time, in parallel with the operation of the information receiving apparatus 40 mounted on the mobile unit $10_A$, the GPS receiving section 42 of the information receiving apparatus 40 mounted on the mobile unit $10_B$ shown in FIG. 1 receives waves from four GPS satellites (not shown) via the antenna 41. Then, the self-position calculating section 43 proceeds to step SB1 shown in FIG. 7. At step SB1, the self-position calculating section 43 obtains the self-position (latitude and the longitude) of the mobile unit $10_B$ from the result of the reception by the GPS receiving section 42, and outputs this self-position to the PN code setting section 46 as self-position information $IP_B$.

At step SB2, the PN code setting section 46 retrieves the area in which the mobile unit $10_B$ exists from the area/PN code table $T_2$ shown in FIG. 4B by using the self-position information $IP_B$ from the self-position calculating section 43 as a key. In this case, it is assumed that the mobile unit $10_B$ exists in the area $A_B$ within the area/PN code table $T_2$. After the PN code setting section 46 has retrieved the area $A_B$ from the area/PN code table $T_2$, the PN code setting section 46 proceeds to step SB3.

At step SB3, the PN code setting section 46 makes a decision as to whether or not the area (a retrieved area) that has been retrieved this time at step SB2 coincides the area that has been retrieved last time. In this case, the PN code setting section 46 sets "No" as a result of the decision made at step SB3, and then proceeds to step SB4. At step SB4, the PN code setting section 46 sets the PN code $C_B$ (refer to FIG. 2 and FIG. 4B) that corresponds to the area $A_B$ retrieved at step SB2, to the information receiving section 45.

Next, at step SB5, the information receiving section 45 correlates the code division multiplexed information $I_{CDM}$ that has been received via the antenna 44 with the PN code $C_B$ that has been set by the PN code setting section 46. Thus, the information receiving section 45 extracts the information $I_B$ for the point B (refer to FIG. 1) from the code division multiplexed information $I_{CDM}$. Then, the information receiving section 45 outputs the information $I_B$ for the point B to the information display section 48. Then, the information display section 48 displays the information $I_B$ for the point B. Thereafter, the information receiving apparatus 40 that is mounted on the mobile unit $\mathbf{10}_B$ repeats the execution of the processing at step SB1 to step SB5 shown in FIG. 7.

When the mobile unit $\mathbf{10}_A$ that is in the moving state shown in FIG. 1 comes close to the point B, at step SB1, the self-position calculating section 43 obtains the self-position (latitude and longitude) of the mobile unit $\mathbf{10}_A$ from the result of the reception by the GPS receiving section 42, and outputs this self-position to the PN code setting section 46 as the self-position information $IP_A$.

At step SB2, the PN code setting section 46 retrieves the area in which the mobile unit $\mathbf{10}_A$ exists from the area/PN code table $T_2$ shown in FIG. 4B by using the self-position information $IP_A$ from the self-position calculating section 43 as a key. In this case, it is assumed that the mobile unit $\mathbf{10}_A$ does not exist in the area/PN code table $T_2$. After the PN code setting section 46 has retrieved the area $A_B$ from the area/PN code table $T_2$, the PN code setting section 46 proceeds to step SB3.

At step SB3, the PN code setting section 46 makes a decision as to whether or not the area (a retrieved area) that has been retrieved this time at step SB2 coincides with the area that has been retrieved last time. As the two areas do not coincide with each other, the PN code setting section 46 sets "No" as a result of the decision made at step SB3, and then proceeds to step SB4. At step SB4, the PN code setting section 46 sets the PN code $C_B$ (refer to FIG. 2 and FIG. 4B) that corresponds to the area $A_B$ retrieved this time at step SB2, to the information receiving section 45.

Next, at step SB5, the information receiving section 45 correlates the code division multiplexed information $I_{CDM}$ that has been received via the antenna 44 with the PN code $C_B$ that has been set by the PN code setting section 46. Thus, the information receiving section 45 extracts the information $I_B$ for the point B (refer to FIG. 1) from the code division multiplexed information $I_{CDM}$. Then, the information receiving section 45 outputs the information $I_B$ for the point B to the information display section 48. Then, the information display section 48 displays the information $I_C$ for the point B instead of the information $I_A$ for the point A.

As explained above, according to the first embodiment, based on the transmission of the code division multiplexed information $I_{CDM}$ to the ground surface from the communication satellite 30 in the sky, it becomes possible to provide information over an extremely wider range than it has been able to provide by the conventional highway radio. Therefore, the installation of only one information transmitting station 20 becomes sufficient, which makes it possible to lower the installation cost.

Further, according to the first embodiment, the position (the position $P_A$ at the point A, etc.) at which the mobile unit (the mobile unit $\mathbf{10}_A$, etc.) can exist and the PN code (the PN code $C_A$, etc.) are corresponded to each other in the position/PN code table $T_1$ in advance. At the same time, the self-position of the mobile unit and the information (the information $I_A$ for the point A, etc.) to be provided are corresponded to each other indirectly, and the information extracted from the code division multiplexed information $I_{CDM}$ is automatically changed along with the move of the mobile unit. Therefore, a user can handle the information providing system of this embodiment substantially better than the conventional on-demand type information providing system. As a result, it becomes possible to improve the quality of the information provision service.

Further, according to the first embodiment, the area (the area $A_A$, etc.) in which the mobile unit (the mobile unit $\mathbf{10}_A$, etc.) can exist and the PN code (the PN code $C_A$, etc.) are corresponded to each other in the area/PN code table $T_2$ in advance. At the same time, the self-position of the mobile unit and the information (the information $I_A$ for the point A, etc.) to be provided are corresponded to each other indirectly, and the information extracted from the code division multiplexed information $I_{CDM}$ is automatically changed along with the move of the mobile unit. Therefore, a user can handle the information providing system of this embodiment substantially better than the conventional on-demand type information providing system. As a result, it becomes possible to improve the quality of the information provision service.

In the first embodiment, the description has been made of the case where the code division multiplexing unit 21 shown in FIG. 1 code division multiplexes the information $I_A$ for the point A, the information $I_B$ for the point B, and the information $I_C$ for the point C, by using the code division multiplex (CDM) system. It is also possible to multiplex the information $I_A$ for the point A, the information $I_B$ for the point B, and the information $I_C$ for the point C in the space respectively, by using a code division multiple access (CDMA) system, in place of the code division multiplex (CDM) system. This case will be explained below as a second embodiment of this invention.

Figure 8:
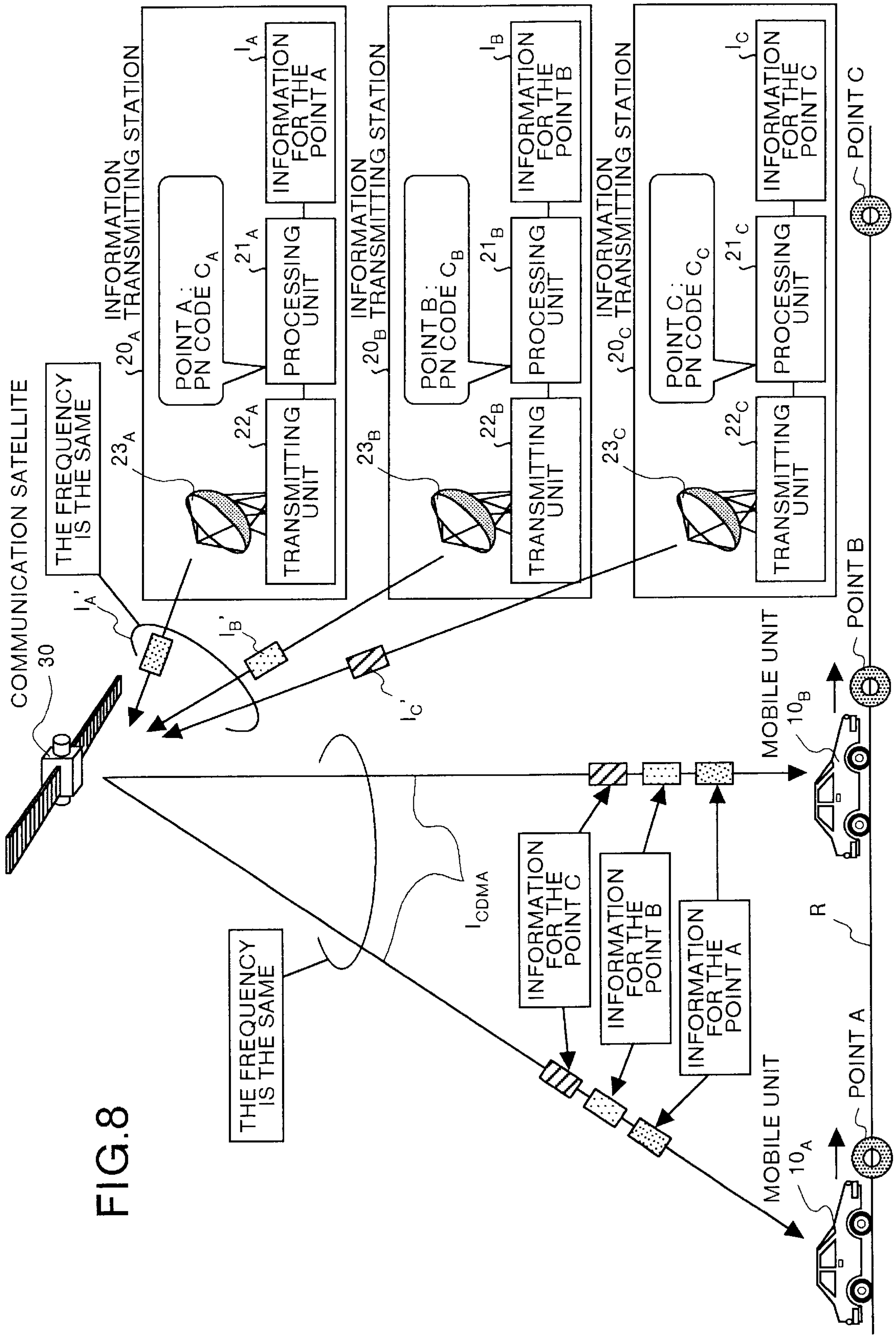
FIG. 8 is a view showing the structure of a second embodiment relating to the present invention.

FIG. 8 is a view showing the structure of the second embodiment relating to the present invention. In FIG. 8, portions corresponding to those in FIG. 1 are attached with identical legends, and their detailed explanation will be omitted. In FIG. 8, in place of the information transmitting station 20 shown in FIG. 1, an information transmitting station $\mathbf{20}_A$, an information transmitting station $\mathbf{20}_B$, and an information transmitting station $\mathbf{20}_C$ are provided. In the first embodiment, only one information transmitting station is sufficient as the code division multiplex system is employed. On the other hand, in the second embodiment, three information transmitting stations are necessary in order to employ the code division multiple access system.

The information transmitting station $\mathbf{20}_A$ is a transmitting station that multiplies the information $I_A$ for the point A provided by an information provider with the PN code $C_A$. Thus, the information transmitting station $\mathbf{20}_A$ spectrum diffuses the information $I_A$ for the point A, and transmits this result to the communication satellite 30 as code division multiple access information $I_A'$. This information transmitting station $\mathbf{20}_A$ is installed with a processing unit $\mathbf{21}_A$, a transmitting unit $\mathbf{22}_A$, and a parabolic antenna $\mathbf{23}_A$.

The processing unit $\mathbf{21}_A$ is a unit that multiplies the information $I_A$ for the point A provided by an information provider with the PN code $C_A$. Thus, the processing unit $\mathbf{21}_A$ spectrum diffuses the information $I_A$ for the point A, and transmits this result to the transmitting unit $22_A$ as the code division multiple access information $I_A$'. The transmitting unit $22_A$ transmits the code division multiple access information $I_A$' to the communication satellite 30 via the parabolic antenna $23_A$.

The information transmitting station $20_B$ is a transmitting station that multiplies the information $I_B$ for the point B provided by an information provider with the PN code $C_B$. Thus, the information transmitting station $20_B$ spectrum diffuses the information $I_C$ for the point B, and transmits this result to the communication satellite 30 as code division multiple access information $I_B$'. This information transmitting station $20_B$ is installed with a processing unit $21_B$, a transmitting unit $22_B$, and a parabolic antenna $23_B$.

The processing unit $21_B$ is a unit that multiplies the information $I_B$ for the point B provided by an information provider with the PN code $C_B$. Thus, the processing unit $21_B$ spectrum diffuses the information $I_B$ for the point B, and transmits this result to the transmitting unit $22_B$ as the code division multiple access information $I_B$' The transmitting unit $22_B$ transmits the code division multiple access information $I_B$' to the communication satellite 30 via the parabolic antenna $23_B$.

The information transmitting station $20_C$ is a transmitting station that multiplies the information $I_C$ for the point C provided by an information provider with the PN code $C_C$. Thus, the information transmitting station $20_C$ spectrum diffuses the information $I_C$ for the point C, and transmits this result to the communication satellite 30 as code division multiple access information $I_C$' This information transmitting station $20_C$ is installed with a processing unit $21_C$, a transmitting unit $22_C$, and a parabolic antenna $23_C$.

The processing unit $21_C$ is a unit that multiplies the information $I_C$ for the point C provided by an information provider with the PN code $C_C$. Thus, processing unit $21_C$ spectrum diffuses the information $I_C$ for the point C, and transmits this result to the transmitting unit $22_C$ as the code division multiple access information $I_C$'. The transmitting unit $22_C$ transmits the code division multiple access information $I_C$' to the communication satellite 30 via the parabolic antenna $23_C$.

The code division multiple access information $I_A$', $I_B$', and $I_C$' are code division multiple accessed in the space, and are relayed by the communication satellite 30. In other words, the communication satellite 30 transmits the multiple-accessed (multiplexed) code division multiple access information $I_A$', $I_B$', and $I_C$', that is code division multiple-accessed information $I_{CDMA}$, to the ground surface.

Both the code division multiple-accessed information $I_{CDMA}$ and the code division multiplexed information $I_{CDM}$ (refer to FIG. 1) described above are substantially the same information, with the only difference in the place of multiplexing the information. That is, the code division multiple-accessed information $I_{CDMA}$ is multiplexed in the space, and the code division multiplexed information $I_{CDM}$ is multiplexed by the code division multiplexing unit 21 (refer to FIG. 1).

In the above structure, when the information $I_A$ for the point A shown in FIG. 8 has been input to the processing unit $21_A$, the processing unit $21_A$ generates the code division multiple access information $I_A$' by using the information $I_A$ for the point A and the PN code $C_A$. Then, the processing unit $21_A$ outputs the code division multiple access information $I_A$' to the transmitting unit $22_A$. The transmitting unit $22_A$ transmits the code division multiple access information $I_A$' to the communication satellite 30 via the parabolic antenna $23_A$.

When the information $I_B$ for the point B has been input to the processing unit $21_B$, the processing unit $21_B$ generates the code division multiple access information $I_B$' by using the information $I_B$ for the point B and the PN code $C_B$. Then, the processing unit $21_B$ outputs the code division multiple access information $I_B$' to the transmitting unit $22_B$. The transmitting unit 22 transmits the code division multiple access information $I_B$' to the communication satellite 30 via the parabolic antenna $23_B$.

When the information $I_C$ for the point C has been input to the processing unit $21_C$, the processing unit $21_C$ generates the code division multiple access information $I_C$' by using the information $I_C$ for the point C and the PN code $C_C$. Then, the processing unit $21_C$ outputs the code division multiple access information $I_C$' to the transmitting unit $22_C$. The transmitting unit $22_C$ transmits the code division multiple access information $I_C$' to the communication satellite 30 via the parabolic antenna $23_C$.

The code division multiple access information $I_A$', $I_B$', and $I_C$' that have been transmitted to the communication satellite 30 are code division multiple accessed in the space, and the result is relayed as the code division multiple-accessed information $I_{CDMA}$ by the communication satellite 30. Thus, the code division multiple-accessed information $I_{CDMA}$ is transmitted to the ground surface including the point A, the point C, and the point C.

The information receiving apparatuses 40 (refer to FIG. 3) mounted on the mobile unit $10_A$ and the mobile unit $10_B$ respectively receive the code division multiple-accessed information $I_{CDMA}$. Thereafter, the information receiving apparatuses 40 operate according to the flowchart shown in FIG. 5 or FIG. 7 in a similar manner to that when the code division multiplexed information $I_{CDM}$ is received as explained in the first embodiment. Thus, the mobile unit $10_A$ and the mobile unit $10_B$ respectively receive the information $I_A$ for the point A, the information $I_B$ for the point B, and the information $I_C$ for the point C shown in FIG. 8.

As explained above, according to the second embodiment, based on the transmission of the code division multiple-accessed information $I_{CDMA}$ to the ground surface from the communication satellite 30 in the sky, it becomes possible to provide information over an extremely wider range than it has been able to provide by the conventional highway radio. Therefore, the installation of three stations for the information transmitting stations $20_A$ to $20_C$ becomes sufficient corresponding to the number of information (the information $I_A$ for the point A, etc.) to be provided, which makes it possible to lower the installation cost.

Further, according to the second embodiment, like in the first embodiment, a user can handle the information providing system of this embodiment substantially better than the conventional on-demand type information providing system. As a result, it becomes possible to improve the quality of the information provision service.

In the above first and second embodiments, the description has been made of the case where the information receiving apparatus 40 has a function of retrieving the PN code using the self-position of the mobile unit as a key. However, it is also possible to arrange such that an external device retrieves the PN code. This case will be explained below as a third embodiment of this invention.

Figure 9:
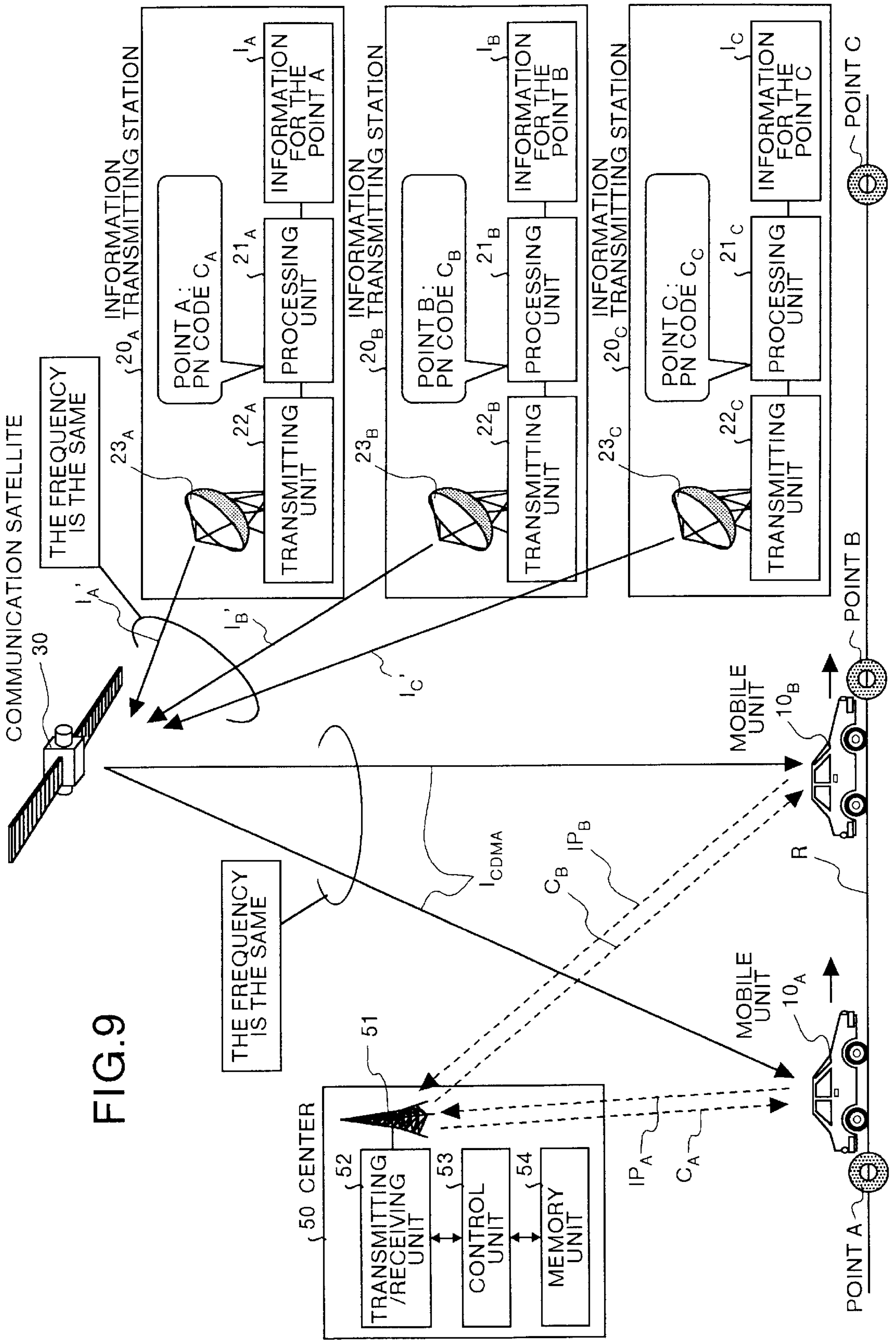
FIG. 9 is a view showing the structure of a third embodiment relating to the present invention.
Figure 10:
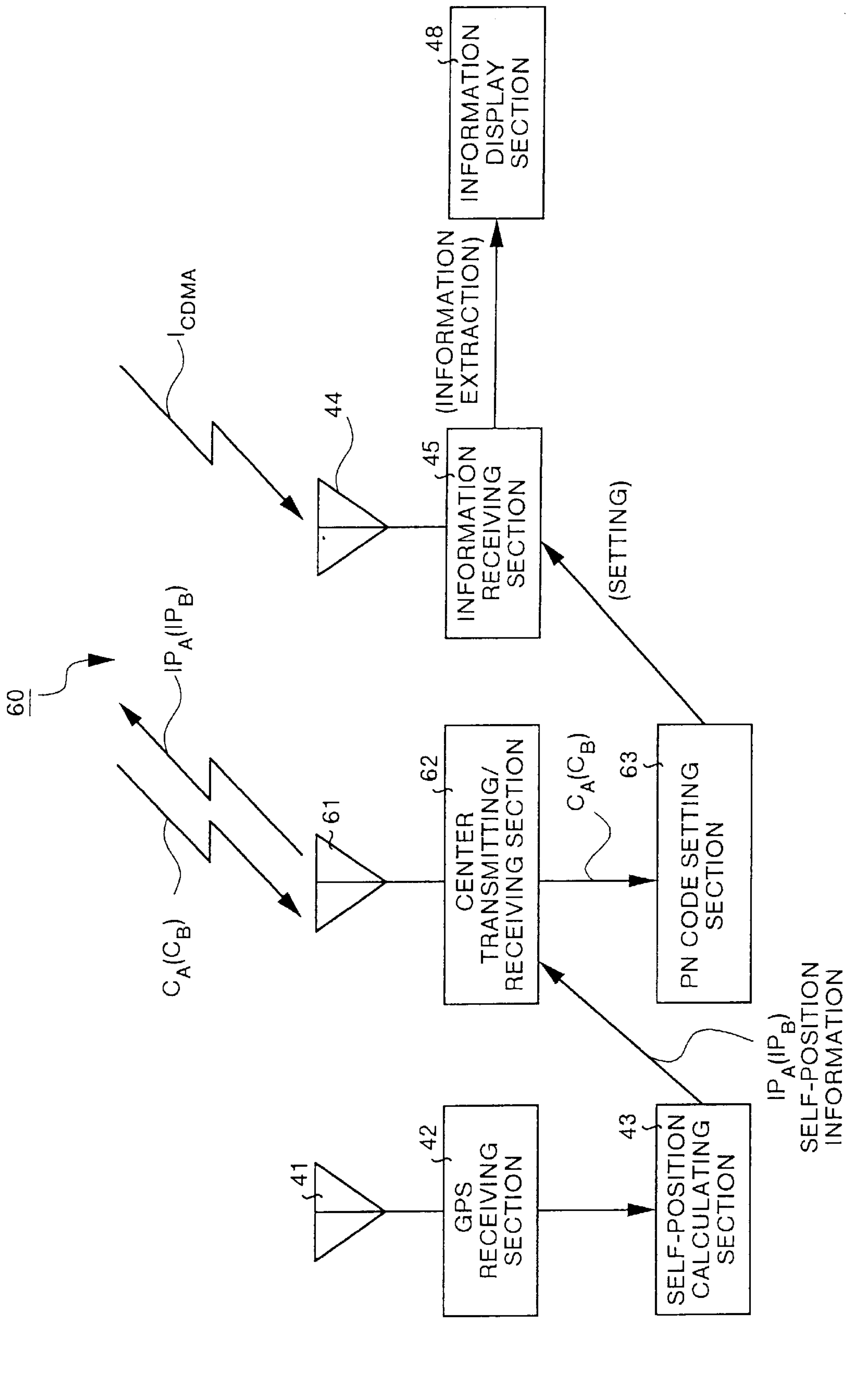
FIG. 10 is a block diagram showing the structure of an information receiving apparatus 60 used in the third embodiment.

FIG. 9 is a view showing the structure of the third embodiment relating to the present invention. In FIG. 9, portions corresponding to those in FIG. 8 are attached with identical legends, and their detailed explanation will be omitted. In FIG. 9, a center 50 is newly provided. Further, each of the mobile unit $10_A$ and the mobile unit $10_B$ shown in FIG. 9 is mounted with an information receiving apparatus 60 shown in FIG. 10 in place of the information receiving apparatus 40 shown in FIG. 3. In FIG. 10, portions corresponding to those in FIG. 3 are attached with identical legends, and their detailed explanation will be omitted.

This information receiving apparatus 60 has a measuring function for measuring a self-position of the mobile unit by utilizing a GPS, a PN code enquiry function for inquiring the center 50 (refer to FIG. 9) for a PN code that is used at the time of extracting information from the code division multiple-accessed information $I_{CDMA}$ based on the self-position information, a receiving function for receiving the code division multiple-accessed information $I_{CDMA}$ from the communication satellite 30, an information extracting function for extracting information corresponding to the point at which the mobile unit is located from the code division multiple-accessed information $I_{CDMA}$ based on the self-position and the PN code posted from the center 50, and a display function for displaying the extracted information.

In the information receiving apparatus 60, a center transmitting/receiving section 62 transmits the self-position information (for example, self-position information $IP_A$ or self-position information $IP_B$) from the self-position calculating section 43 to the center 50, and receives a PN code posted from the center 50. The self-position information is the information for inquiring,the center 50 for the PN code.

This PN code is a code for extracting the information $I_A$ for the point A, the information $I_B$ for the point B, or the information $I_C$ for the point C from the code division multiple-accessed information $I_{CDMA}$, based on a correlation with the code division multiple-accessed information $I_{CDM}$. A PN code setting section 63 sets the PN code that has been posted from the center 50, to the information receiving section 45.

Referring back to FIG. 9, the center 50 is a transmitting/receiving station for transmitting a corresponding PN code at the inquiry from the information receiving apparatus 60 (refer to FIG. 10) for the PN code. The center 50 is installed with an antenna 51, a transmitting/receiving unit 52, a control unit 53, and a memory unit 54. The transmitting/receiving unit 52 is a unit for receiving the self-position information (for example, the self-position information $IP_A$, or the self-position information $IP_B$) from the information receiving apparatus 60 mounted on the mobile unit, and for transmitting the PN code (for example, the PN code $C_A$, or the PN code $C_B$) to the information receiving apparatus 60, via the antenna 51 respectively.

The control unit 53 retrieves a PN code from the area/PN code table $T_2$ (refer to FIG. 4B) stored in the memory unit 54, using the self-position information received by the transmitting/receiving unit 52 as a key, and delivers this PN code to the transmitting/receiving unit 52. In other words, the control unit 53 has a function similar to the PN code retrieving function of the PN code setting section 46 (refer to FIG. 3).

The operation of the third embodiment will be explained with reference to a flowchart shown in FIG. 11. It is assumed that the mobile unit $10_A$ that is moving along the moving route R shown in FIG. 9 is positioned near the point A, and the mobile unit $10_B$ is positioned near the point B. Further, it is assumed that the communication satellite 30 is transmitting the code division multiple-accessed information $I_{CDMA}$ to the ground surface.

Figure 11:
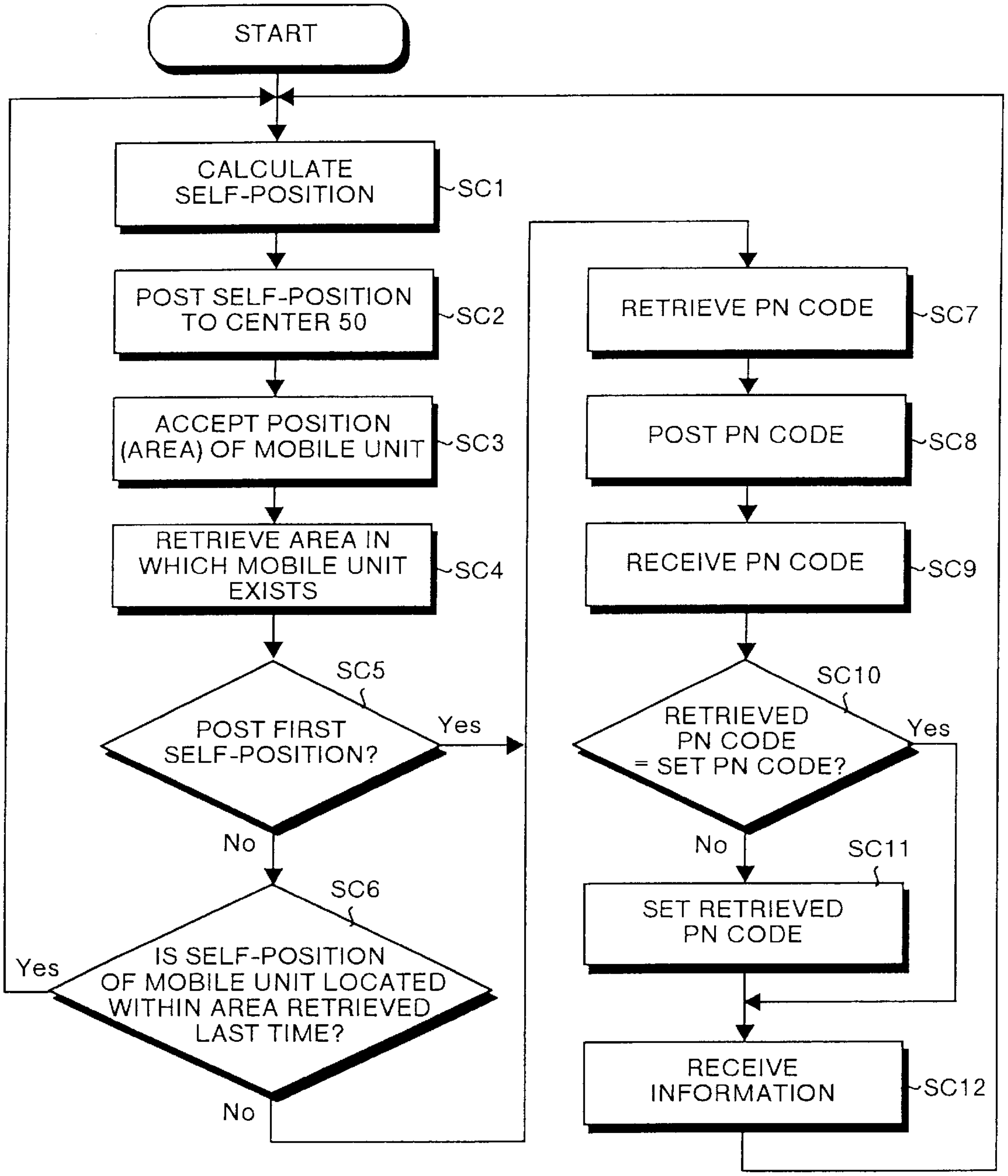
FIG. 11 is a flowchart for explaining the operation of the third embodiment.

When the GPS receiving section 42 of the information receiving apparatus 60 (refer to FIG. 10) mounted on the mobile unit $10_A$ has received the waves from four GPS satellites (not shown) via the antenna 41, the self-position calculating section 43 proceeds to step SC1 shown in FIG. 11. At step SC1, the self-position calculating section 43 obtains the self-position (latitude and longitude) of the mobile unit $10_A$ from the result of the reception by the GPS receiving section 42, in a similar manner to that of the first embodiment, and then outputs this self-position to the center transmitting/receiving section 62 as self-position information $IP_A$.

At step SC2, the center transmitting/receiving section 62 posts the self-position information $IP_A$ to the center 50 (refer to FIG. 9). Specifically, the center transmitting/receiving section 62 posts the self-position information $IP_A$ to the center 50 via the antenna 61. Then, when the self-position information $IP_A$ has been received by the transmitting/receiving unit 52 via the antenna 51 shown in FIG. 9, the control unit 53 accepts, at step SC3, the position (or the area) of the mobile unit $10_A$ from the self-position information $IP_A$, and proceeds to step SC4.

At step SC4, the control unit 53 retrieves an area in which the mobile unit $10_A$ exists from the area/PN code table $T_2$ shown in FIG. 4B by using the self-position information $IP_A$ as a key. In this case, it is assumed that the mobile unit $10_A$ exists in the area $A_A$ within the area/PN code table $T_2$. After the control unit 53 has retrieved the area $A_A$ from the area/PN code table $T_2$, the PN code setting section 46 proceeds to step SC5.

At step SC5, the control unit 53 makes a decision as to whether the posting of the self-position from the mobile unit $10_A$ (refer to step SC2) is the first posting of the self-position or not. The control unit 53 sets "No" as a result of the decision made at step SC5, and then proceeds to step SC6. When a result of the decision made at step SC5 is "Yes", the control unit 53 proceeds to step SC7.

At step SC6, the control unit 53 makes a decision as to whether the self-position of the mobile unit $10_A$ exists within the area retrieved last time or not. The control unit 53 sets "No" as a result of the decision made at step SC6, and then proceeds to step SC7. When a result of the decision made at step SC6 is "Yes", the control unit 53 repeats the processing from step SC1 to step SC6.

At step SC7, the control unit 53 retrieves the PN code corresponding to the area in which the mobile unit $10_A$ exists from the area/PN code table $T_2$ shown in FIG. 4B. In this case, the control unit 53 retrieves the PN code $C_A$ corresponding to the area $A_A$ from the area/PN code table $T_2$, and delivers this to the transmitting/receiving unit 52. At step SC8, the transmitting/receiving unit 52 posts the PN code $C_A$ to the information receiving apparatus 60 that is mounted on the mobile unit $10_A$ Specifically, the transmitting/receiving unit 52 posts the PN code $C_A$ to the information receiving apparatus 60 via the antenna 51.

At step SC9, the center transmitting/receiving section 62 shown in FIG. 10 receives the PN code $C_A$ via the antenna 61, and then delivers it to the PN code setting section 63. Next, at step SC10, the PN code setting section 63 makes a decision as to whether or not the retrieved PN code that has been retrieved and posted from the center 50 at step SC7 coincides with the set PN code that has already been set in the information receiving section 45.

When the two PN codes do not coincide with each other, the PN code setting section 63 sets "No" as a result of the decision made at step SC10, and proceeds to step SC11. When the retrieved PN code coincides with the set PN code, the PN code setting section 63 sets "Yes" as a result of the decision made at step SC10, and does not set a new PN code to the information receiving section 45.

At step SC11, the PN code setting section 63 sets the PN code $C_A$ (refer to FIG. 2 and FIG. 4B) that has been posted from the center 50, to the information receiving section 45. Next, at step SC12, the information receiving section 45 correlates the code division multiple-accessed information $I_{CDMA}$ that has been received via the antenna 44 with the PN code $C_A$ that has been set by the PN code setting section 63. Thus, the information receiving section 45 extracts the information $I_A$ for the point A (refer to FIG. 9) from the code division multiple-accessed information $I_{CDMA}$. Then, the information receiving section 45 outputs the information $I_A$ for the point A to the information display section 48. Then, the information display section 48 displays the information $I_A$ for the point A.

In the mean time, the information receiving apparatus 60 mounted on the mobile unit $10_B$ shown in FIG. 9 also posts the self-position information $IP_B$ to the center 50, and inquires for the PN code. Thereafter, the information receiving apparatus 60 receives a post of the PN code $C_B$ from the center 50 in a similar manner to that of the information receiving apparatus 60 mounted on the mobile unit $10_A$. Thus, in the information receiving apparatus 60 mounted on the mobile unit $10_B$, the information $I_B$ for the point B is extracted from the code division multiple-accessed information $I_{CDMA}$ based on the PN code $C_B$. Then, this information $I_B$ for the point B is displayed on the information display section 48.

When the mobile unit $10_A$ shown in FIG. 9 comes close to the point B, at step SC1, the self-position calculating section 43 shown in FIG. 10 obtains the self-position (latitude and longitude) of the mobile unit $10_A$ from a result received by the GPS receiving section 42, in a similar manner to that described above. The self-position calculating section 43 outputs the result to the center transmitting/receiving section 62 as the self-position information $IP_A$.

At step SC2, the center transmitting/receiving section 62 posts the self-position information $IP_A$ to the center 50 (refer to FIG. 9). Then, when the self-position information $IP_A$ has been received by the transmitting/receiving unit 52 via the antenna 51 shown in FIG. 9, the control unit 53 accepts, at step SC3, the position (or the area) of the mobile unit $10_A$ from the self-position information $IP_A$, and proceeds to step SC4.

At step SC4, the control unit 53 retrieves an area in which the mobile unit $10_A$ exists from the area/PN code table $T_2$ shown in FIG. 4B by using the self-position information $IP_A$ as a key. In this case, it is assumed that the mobile unit $10_A$ exists in the area $A_B$ within the area/PN code table $T_2$. After the control unit 53 has retrieved the area $A_B$ from the area/PN code table $T_2$, the PN code setting section 46 proceeds to step SC5.

At step SC5, the control unit 53 makes a decision as to whether the posting of the self-position from the mobile unit $10_A$ (refer to step SC2) is the first posting of the self-position or not. The control unit 53 sets "No" as a result of the decision made at step SC5, and then proceeds to step SC6. The control unit 53 sets "No" as a result of the decision made at step SC6, and then proceeds to step SC7.

At step SC7, the control unit 53 retrieves the PN code $C_B$ corresponding to the area $A_B$ from the area/PN code table $T_2$, and delivers this to the transmitting/receiving unit 52. At step SC8, the transmitting/receiving unit 52 posts the PN code $C_B$ to the information receiving apparatus 60 that is mounted on the mobile unit $10_A$.

At step SC9, the center transmitting/receiving section 62 shown in FIG. 10 receives the PN code $C_B$ via the antenna 61, and then delivers it to the PN code setting section 63. Next, at step SC10, the PN code setting section 63 makes a decision as to whether or not the PN code $C_B$ that has been posted from the center 50 coincides with the set PN code that has already been set in the information receiving section 45.

When the two PN codes do not coincide with each other, the PN code setting section 63 sets "No" as a result of the decision made at step SC10, and proceeds to step SC11. At step SC11, the PN code setting section 63 sets the PN code $C_B$ (refer to FIG. 2 and FIG. 4B) that has been posted from the center 50, to the information receiving section 45.

Next, at step SC12, the information receiving section 45 correlates the code division multiple-accessed information $I_{CDMA}$ that has been received via the antenna 44 with the PN code $C_B$ that has been set by the PN code setting section 63. Thus, the information receiving section 45 extracts the information $I_B$ for the point B (refer to FIG. 9) from the code division multiple-accessed information $I_{CDMA}$. Then, the information receiving section 45 outputs the information $I_B$ for the point B to the information display section 48. Then, the information display section 48 displays the information $I_B$ for the point B.

In the third embodiment, it may be so arranged that, in place of the area/PN code table $T_2$ shown in FIG. 4B, the position/PN code table $T_1$ shown in FIG. 4A is stored in the memory unit 54 (refer to FIG. 9), and that the PN code is retrieved by using this position/PN code table $T_1$. In this case, the retrieving operation of the control unit 53 is similar to the retrieving operation of the PN code setting section 46 explained in the operation example 1 of the first embodiment.

Further, in the third embodiment, the description has been made of the case where the code division multiple-accessed information $I_{CDMA}$ is used. However, it may also be so arranged that the code division multiplexed information $I_{CDM}$ explained in the first embodiment is used in place of the code division multiple-accessed information $I_{CDMA}$. In this case, the information transmitting station 20 (refer to FIG. 1) is used in place of the information transmitting stations $20_A$ to $20_C$ shown in FIG. 9.

As explained above, according to the third embodiment, the center 50 has the retrieving function relating to the area (the area $A_A$, etc.) and the PN code (the PN code $C_A$, etc.) corresponding to the self-position information of the mobile unit (the mobile unit $10_A$, etc.). Further, the memory unit 54 of one center 50 holds the position/PN code table $T_1$ or the area/PN code table $T_2$. Therefore, it becomes easy to carry out the maintenance (a change of the relationship) of the position/PN code table $T_1$ or the area/PN code table $T_2$.

In the first embodiment, the description has been made of the case where the code division multiplex (CDM) system is employed as the multiplexing system. In place of this system, it is also good to employ a time division multiplex (TDM) system. This case will be explained below as a fourth embodiment of this invention.

Figure 12:
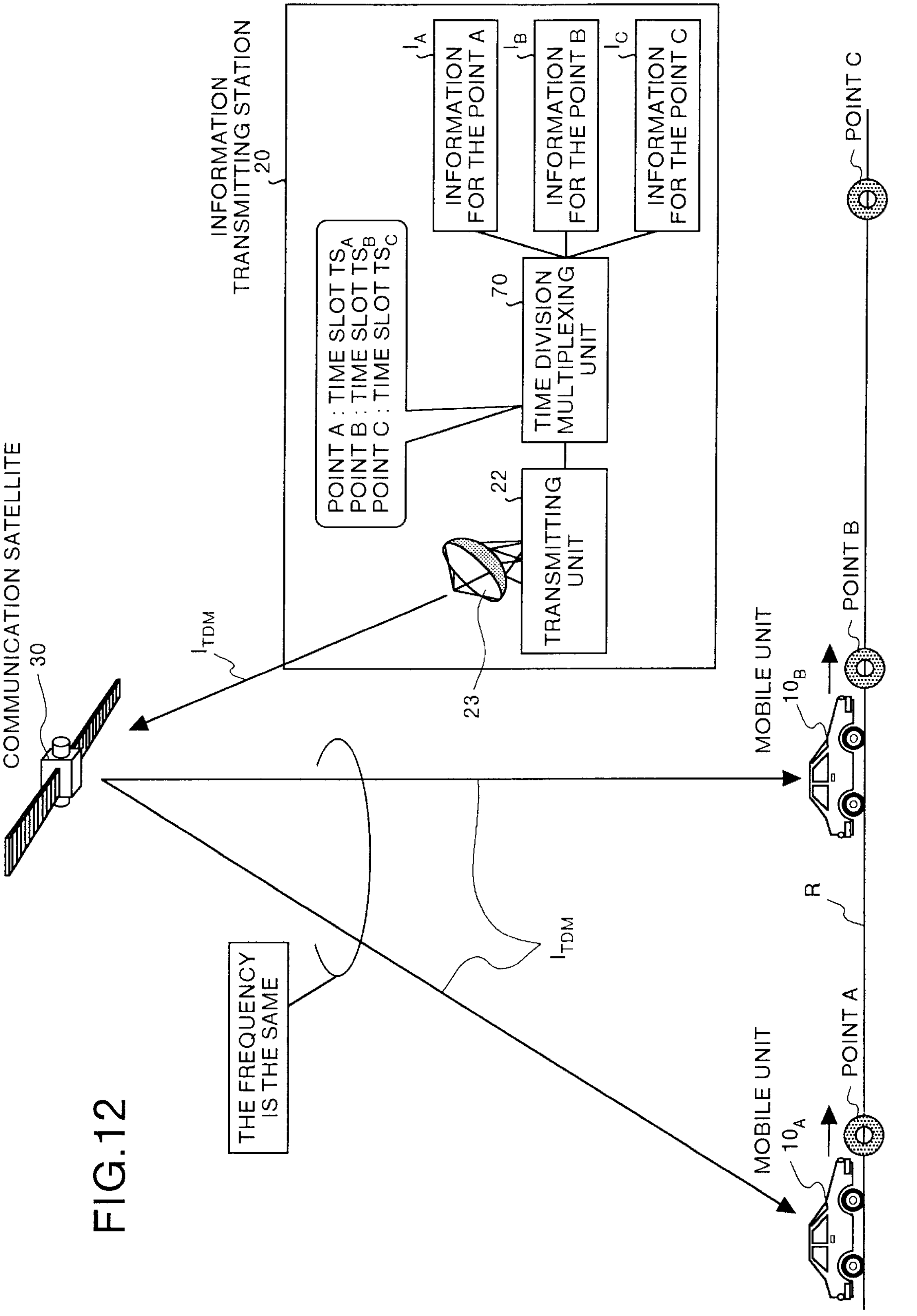
FIG. 12 is a view showing the structure of a fourth embodiment relating to the present invention.
Figure 13:
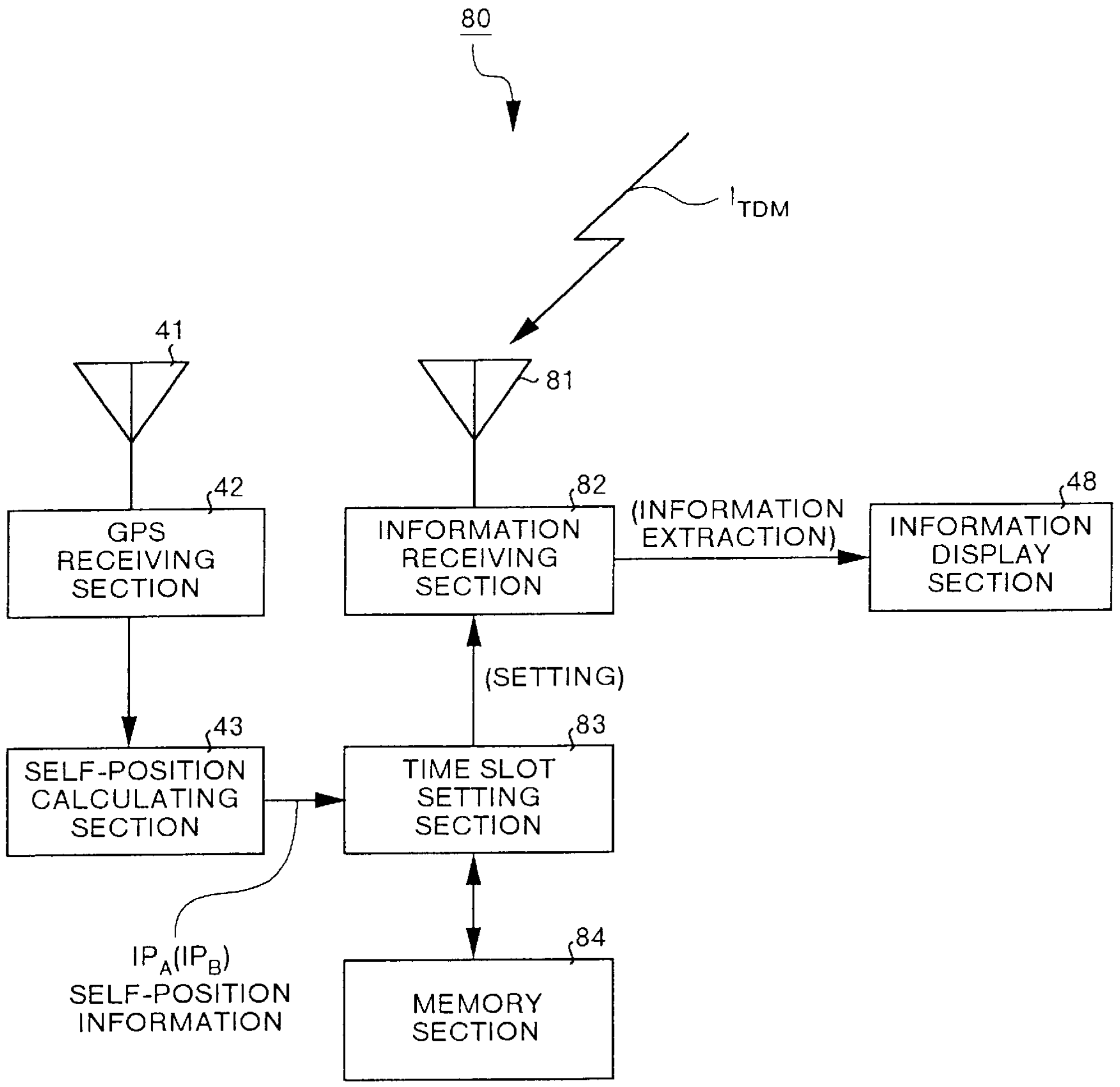
FIG. 13 is a block diagram showing the structure of an information receiving apparatus 80 used in the fourth embodiment.

FIG. 12 is a view showing the structure of the fourth embodiment relating to the present invention. In FIG. 12, portions corresponding to those in FIG. 1 are attached with identical legends, and their detailed explanation will be omitted. In FIG. 12, in place of the code division multiplexing unit 21 shown in FIG. 1, a time division multiplexing unit 70 is provided. Further, each of the mobile unit $10_A$ and the mobile unit $10_B$ shown in FIG. 12 is mounted with an information receiving apparatus 80 shown in FIG. 13, in place of the information receiving apparatus 40 shown in FIG. 3. In FIG. 13, portions corresponding to those in FIG. 3 are attached with identical refer to numbers or symbols, and their detailed explanation will be omitted.

The time division multiplexing unit 70 shown in FIG. 12 is a unit that allocates the information $I_A$ for the point A, the information $I_B$ for the point B, and the information $I_C$ for the point C to a time slot $TS_A$, a time slot $TS_B$, and a time slot $TS_C$ shown in FIG. 14A respectively. Thus, time division multiplexing unit 70 time division multiplexes the information $I_A$ for the point A, the information $I_B$ for the point B, and the information $I_C$ for the point C respectively on a time axis.

In FIG. 14A, the time slot $TS_A$ is allocated with the information $I_A$ for the point A, the time slot $TS_B$ is allocated with the information $I_B$ for the point B, and the time slot $TS_C$ is allocated with the information $I_C$ for the point C. The time division multiplexing unit 70 outputs a time division multiplexed result to the transmitting unit 22 as time division multiplexed information $I_{TDM}$.

The transmitting unit 22 transmits the time division multiplexed information $I_{TDM}$ to the communication satellite 30 via the parabolic antenna 23. The communication satellite 30 functions as a relay unit. The communication satellite 30 receives the time division multiplexed information $I_{TDM}$ that has been transmitted from the parabolic antenna 23, and then transmits the time division multiplexed information $I_{TDM}$ to the ground surface including at least the point A, the point B and the point C.

The information receiving apparatus 80 shown in FIG. 13 is mounted on a mobile unit (for example, the mobile unit $\mathbf{10}_A$ and the mobile unit $\mathbf{10}_B$), and has a measuring function for measuring a self-position of the mobile unit by utilizing a GPS (Global Positioning System), a receiving function for receiving the time division multiplexed information $I_{TDM}$ from the communication satellite 30, an information extracting function for extracting information corresponding to the point at which the mobile unit is located from the time division multiplexed information $I_{TDM}$ based on the self-position, and a display function for displaying the extracted information.

In this information receiving apparatus 80, a time slot setting section 83 sets to an information receiving section 82 a time slot (for example, the time slot $TS_A$, the time slot $TS_B$, or the time slot $TS_C$ shown in FIG. 14A) that corresponds to the self-position information from the self-position calculating section 43. The information receiving section 82 extracts the information (for example, the information $I_A$ for the point A, the information $I_B$ for the point B, or the information $I_C$ for the point C) of the time slot that has been set by the time slot setting section 83.

Specifically, the time slot setting section 83 retrieves the time slot corresponding to a position nearest to the self-position from a position/time slot table $T_3$ (refer to 14B) stored in a memory section 84, by using the self-position information from the self-position calculating section 43 as a key. Then, the time slot setting section 83 sets the retrieved time slot to the information receiving section 82. The position/time slot table $T_3$ shown in FIG. 14B is a table that defines a relationship between the position and the time slot.

In the example shown in FIG. 14B, the position $P_A$ at the point A is a position (the north latitude 35 degrees, and the east longitude 135 degrees) at the point A (refer to FIG. 12). The time slot $TS_A$ corresponding to this position $P_A$ at the point A is set to the information receiving section 82 at the time of extracting the information $I_A$ for the point A (refer to FIG. 12) from the time division multiplexed information $I_{TDM}$.

The position $P_B$ at the point B is a position (the north latitude 35 degrees, and the east longitude 136 degrees) at the point B (refer to FIG. 12). The time slot $TS_B$ corresponding to this position $P_B$ at the point B is set to the information receiving section 82 at the time of extracting the information $I_B$ for the point B from the time division multiplexed information $I_{TDM}$. The position $P_C$ at the point C is a position (the north latitude 35 degrees, and the east longitude 137 degrees) at the point C (refer to FIG. 12). The time slot $TS_C$ corresponding to this position $P_C$ at the point C is set to the information receiving section 82 at the time of extracting the information $I_C$ for the point C from the time division multiplexed information $I_{TDM}$. The information receiving section 82 receives via an antenna 81 the time division multiplexed information $I_{TDM}$ that has been relayed to the communication satellite 30 (refer to FIG. 12). The information receiving section 82 extracts the time slot information set by the mobile unit 83, from the received time division multiplexed information $I_{TDM}$. An operation example 1 of the fourth embodiment will be explained next with reference to a flowchart shown in FIG. 15. When the information $I_A$ for the point A, the information $I_B$ for the point B, and the information $I_C$ for the point C shown in FIG. 1 have been input to the time division multiplexing unit 70, the time division multiplexing unit 70 time division multiplexes the information $I_A$ for the point A, the information $I_B$ for the point B, and the information $I_C$ for the point C respectively.

In other words, the time division multiplexing unit 70 allocates the information $I_A$ for the point A to the timeslot $TS_A$, allocates the information $I_B$ for the point B to the timeslot $TS_B$, and allocates the information $I_C$ for the point C to the timeslot $TS_C$, thereby to generate the time division multiplexed information $I_{TDM}$. Then, the time division multiplexing unit 70 output time division multiplexed information $I_{TDM}$ to the transmitting unit 22. Then, the transmitting unit 22 transmits the time division multiplexed information $I_{TDM}$ to the communication satellite 30 from the parabolic antenna 23. This time division multiplexed information $I_{TDM}$ is relayed to the communication satellite 30, and is then transmitted to the ground surface including the point A, the point B and the point C.

It is assumed that the mobile unit $\mathbf{10}_A$ that is moving along the moving route R is positioned near the point A, and the mobile unit $\mathbf{10}_B$ is positioned near the point B. At step SD1, the self-position calculating section 43 obtains the self-position (latitude and longitude) of the mobile unit $\mathbf{10}_A$ from a result of the reception by the GPS receiving section 42, and outputs this self-position to the time slot setting section 83 as self-position information $IP_A$.

At step SD2, the time slot setting section 83 retrieves the time slot corresponding to a position nearest to the self-position of the mobile unit $\mathbf{10}_A$ from the position/time slot table $T_3$ shown in FIG. 14B by using the self-position information $IP_A$ from the self-position calculating section 43 as a key. In this case, it is assumed that the position $P_A$ at the point A within the position/time slot table $T_3$ is the nearest to the self-position of the mobile unit $\mathbf{10}_A$. After the time slot setting section 83 has retrieved the time slot $TS_A$ corresponding to the position $P_A$ at the point A from the position/time slot table $T_3$, the time slot setting section 83 proceeds to step SD3.

At step SD3, the time slot setting section 83 makes a decision as to whether or not the time slot (a retrieved time slot) that has been retrieved at step SD2 coincides with the time slot (a set time slot) that has already been set in the information receiving section 82. When the retrieved time slot does not coincide with the set time slot, the time slot setting section 83 sets "No" as a result of the decision made at step SD3, and then proceeds to step SD4. When the retrieved time slot coincides with the set time slot, the time slot setting section 83 sets "Yes" as a result of the decision made at step SD3, and does not set a new time slot to the information receiving section 82.

At step SD4, the time slot setting section 83 sets the time slot $TS_A$ (refer to FIG. 14B) retrieved at step SD2 to the information receiving section 82. Next, at step SD5, the information receiving section 82 extracts the information $I_A$ for the point A (refer to FIG. 12) of the time slot $TS_A$ that has been set by the time slot setting section 83, from the time division multiplexed information $I_{TDM}$ that has been received via the antenna 81. Then, the time slot setting section 83 outputs the information $I_A$ for the point A to the information display section 48.

Then, the information display section 48 displays the information $I_A$ for the point A. Thereafter, the information receiving apparatus 80 that is mounted on the mobile unit $\mathbf{10}_A$ repeats the execution of the processing at step SD1 to step SD5 shown in FIG. 15.

Figure 15:
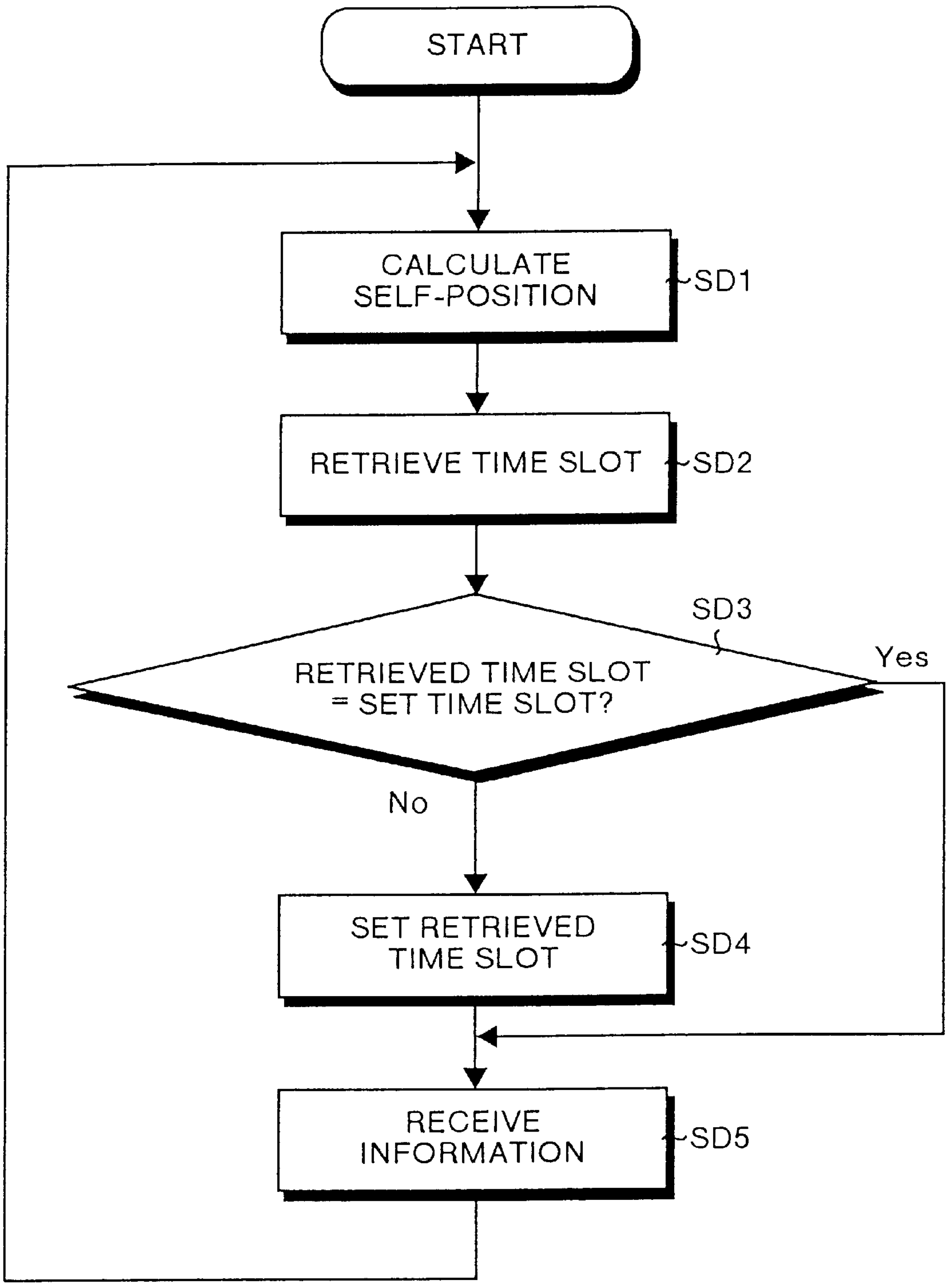
FIG. 15 is a flowchart for explaining an operation example 1 of the fourth embodiment.

In the mean time, in parallel with the operation of the information receiving apparatus 80 mounted on the mobile unit $\mathbf{10}_A$, the self-position calculating section 43 of the information receiving apparatus 80 mounted on the mobile unit $\mathbf{10}_B$ shown in FIG. 12 executes step SD1 shown in FIG. 15. At step SD1, the self-position calculating section 43 obtains the self-position (latitude and the longitude) of the mobile unit $\mathbf{10}_B$ from the result of the reception by the GPS receiving section 42, and outputs this self-position to the time slot setting section 83 as self-position information $IP_B$.

At step SD2, the time slot setting section 83 retrieves the time slot corresponding to a position nearest to the self-position of the mobile unit $\mathbf{10}_B$ from the position/time slot table $T_3$ shown in FIG. 14B by using the self-position information $IP_B$ from the self-position calculating section 43 as a key. In this case, it is assumed that the position $P_B$ at the point B within the position/time slot table $T_3$ is the nearest to the self-position of the mobile unit $\mathbf{10}_B$. After the time slot setting section 83 has retrieved the time slot $TS_B$ corresponding to the position $P_B$ at the point B from the position/time slot table $T_3$ the time slot setting section 83 proceeds to step SD3.

At step SD3, the time slot setting section 83 makes a decision as to whether or not the time slot (a retrieved time slot) that has been retrieved at step SD2 coincides with the time slot (a set time slot) that has already been set in the information receiving section 82. When the retrieved time slot does not coincide with the set time slot, the time slot setting section 83 sets "No" as a result of the decision made at step SD3, and then proceeds to step SD4. At step SD4, the time slot setting section 83 sets the time slot $TS_B$ (refer to FIG. 14B) retrieved at step SD2, to the information receiving section 82.

Next, at step SD5, the information receiving section 82 extracts the information $I_B$ for the point B (refer to FIG. 12) of the time slot $TS_B$ that has been set by the time slot setting section 83, from the time division multiplexed information $I_{TDM}$ that has been received via the antenna 81. Then, the information receiving section 82 outputs the information $I_B$ for the point B to the information display section 48. Then, the information display section 48 displays the information $I_B$ for the point B. Thereafter, the information receiving apparatus 80 that is mounted on the mobile unit $\mathbf{10}_B$ repeats the execution of the processing at step SD1 to step SD5 shown in FIG. 15.

When the mobile unit $\mathbf{10}_A$ that is in the moving state shown in FIG. 12 comes close to the point B, at step SD1, the self-position calculating section 43 obtains the self-position (latitude and longitude) of the mobile unit $\mathbf{10}_A$ from the result of the reception by the GPS receiving section 42, and outputs this self-position to the time slot setting section 83 as the self-position information $IP_A$.

At step SD2, the time slot setting section 83 retrieves the time slot corresponding to a position nearest to the self-position of the mobile unit $\mathbf{10}_A$ from the position/time slot table $T_3$ shown in FIG. 14B by using the self-position information $IP_A$ from the self-position calculating section 43 as a key. In this case, it is assumed that the position $P_B$ at the point B within the position/time slot table $T_3$ is the nearest to the self-position of the mobile unit $\mathbf{10}_A$. After the time slot setting section 83 has retrieved the time slot $TS_B$ corresponding to the position $P_B$ at the point B from the position/time slot table $T_3$, the time slot setting section 83 proceeds to step SD3.

At step SD3, the time slot setting section 83 makes a decision as to whether or not the retrieved time slot (=the time slot $TS_B$) that has been retrieved at step SD2 coincides with the set time slot (=the time slot $TS_A$) that has already been set in the information receiving section 82. As the two time slots do not coincide with each other, the time slot setting section 83 sets "No" as a result of the decision made at step SD3, and then proceeds to step SD4. At step SD4, the time slot setting section 83 sets the time slot $T_B$ (refer to FIG. 14B) retrieved at step SD2, to the information receiving section 82.

Next, at step SD5, the information receiving section 82 extracts the information $I_B$ for the point B (refer to FIG. 12) of the time slot $TS_B$ that has been set by the time slot setting section 83, from the time division multiplexed information $I_{TDM}$ that has been received via the antenna 81. Then, the information receiving section 82 outputs the information $I_B$ for the point B to the information display section 48. The information display section 48 displays the information $I_B$ for the point B in place of the information $I_A$ for the point A.

In the above operation example 1, the description has been made of the case where the time slots $TS_A$ and others are corresponded to the position $P_A$ at the point A and others in the position/time slot table $T_3$ shown in FIG. 14B. It is also good to make the time slots $TS_A$ and others correspond to areas. This will be explained next as an operation example 2.

In the operation example 2, the memory section 84 shown in FIG. 13 stores an area/time slot table $T_4$ shown in FIG. 14C instead of the position/time slot table $T_3$ (refer to FIG. 14B). This area/time slot table $T_4$ is the table that defines a relationship between the area and the time slot.

In the example shown in FIG. 14C, an area $A_A$ is an area of the north latitude 35±0.5 degrees and the east longitude 135±0.5 degrees in which the point A (the north latitude 35 degrees, and the east longitude 135 degrees) exists. This area $A_A$ is corresponded to the time slot $TS_A$. An area $A_B$ is an area of the north latitude 35±0.5 degrees and the east longitude 136±0.5 degrees in which the point B (the north latitude 35 degrees, and the east longitude 136 degrees) exists. This area $A_B$ is corresponded to the times slot $TS_B$. An area $A_C$ is an area of the north latitude 35±0.5 degrees and the east longitude 137±0.5 degrees in which the point C (the north latitude 35 degrees, and the east longitude 137 degrees) exists. This area $A_C$ is corresponded to the time slot $TS_C$.

Figure 16:
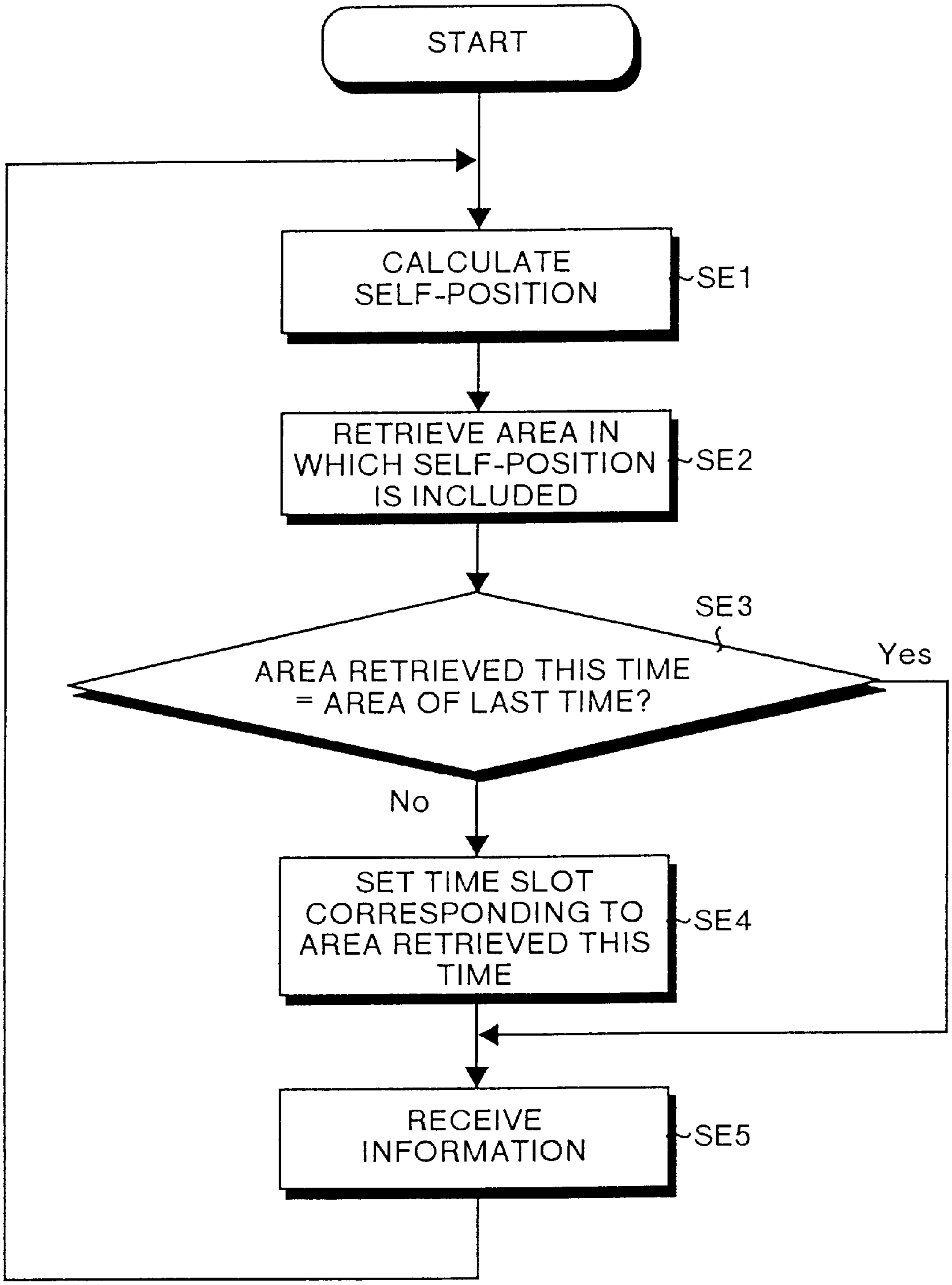
FIG. 16 is a flowchart for explaining an operation example 2 of the fourth embodiment.

Next, the operation example 2 of the fourth embodiment will be explained with reference to a flowchart shown in FIG. 16. It is assumed that the mobile unit $\mathbf{10}_A$ that is moving along the moving route R shown in FIG. 12 is positioned near the point A, and the mobile unit $\mathbf{10}_B$ is positioned near the point B. At step SE1, the self-position calculating section 43 obtains the self-position (latitude and longitude) of the mobile unit $\mathbf{10}_A$ from the result of the reception by the GPS receiving section 42. The self-position calculating section 43 then outputs this self-position to the time slot setting section 83 as self-position information $IP_A$, in a similar manner to that as described for the operation example 1.

At step SE2, the time slot setting section 83 retrieves an area in which the mobile unit $\mathbf{10}_A$ exists from the area/time slot table $T_4$ shown in FIG. 14C by using the self-position information $IP_A$ from the self-position calculating section 43 as a key. In this case, it is assumed that the mobile unit $\mathbf{10}_A$ exists in the area $A_A$ within the area/time slot table $T_4$. After the time slot setting section 83 has retrieved the area $A_A$ from the area/time slot table $T_4$, the time slot setting section 83 proceeds to step SE3.

At step SE3, the time slot setting section 83 makes a decision as to whether or not the area (a retrieved area) that has been retrieved this time at step SE2 coincides with the area that has been retrieved last time. When the two areas do not coincide with each other, the time slot setting section 83 sets "No" as a result of the decision made at step SE3, and then proceeds to step SE4. When the area retrieved last time coincides with the area retrieved this time, the time slot setting section 83 sets "Yes" as a result of the decision made at step SE3. The time slot setting section 83 does not set a new time slot corresponding to the area retrieved this time, to the information receiving section 82.

At step SE4, the time slot setting section 83 sets the time slot $TS_A$ (refer to FIG. 14C) corresponding to the area $A_A$ retrieved this time at step SE2, to the information receiving section 82. Next, at step SE5, the information receiving section 82 extracts the information $I_A$ for the point A (refer to FIG. 12) of the time slot $TS_A$ that has been set by the time slot setting section 83, from the time division multiplexed information $I_{TDM}$ that has been received via the antenna 81. Then, the information receiving section 82 outputs the information $I_A$ for the point A to the information display section 48.

Then, the information display section 48 displays the information $I_A$ for the point A. Thereafter, the information receiving apparatus 80 that is mounted on the mobile unit $\mathbf{10}_A$ repeats the execution of the processing at step SE1 to step SE5 shown in FIG. 16.

In the mean time, in parallel with the operation of the information receiving apparatus 80 mounted on the mobile unit $\mathbf{10}_A$, the self-position calculating section 43 of the information receiving apparatus 80 mounted on the mobile unit $\mathbf{10}_B$ shown in FIG. 12 executes the processing at step SE1. In other words, at step SE1, the self-position calculating section 43 obtains the self-position (latitude and the longitude) of the mobile unit $\mathbf{10}_B$ from the result of the reception by the GPS receiving section 42, and outputs this self-position to the time slot setting section 83 as self-position information $IP_B$.

At step SE2, the time slot setting section 83 retrieves the area in which the mobile unit $\mathbf{10}_B$ exists from the area/time slot table $T_4$ shown in FIG. 14C by using the self-position information $IP_B$ from the self-position calculating section 43 as a key. In this case, it is assumed that the mobile unit $\mathbf{10}_B$ exists in the area $A_B$ within the area/time slot table $T_4$. After the time slot setting section 83 has retrieved the area $A_B$ from the area/time slot table $T_4$, the time slot setting section 83 proceeds to step SE3.

At step SE3, the time slot setting section 83 makes a decision as to whether or not the area (a retrieved area) that has been retrieved this time at step SE2 coincides the area that has been retrieved last time. In this case, the time slot setting section 83 sets "No" as a result of the decision made at step SE3, and then proceeds to step SE4. At step SE4, the time slot setting section 83 sets the time slot $TS_B$ (refer to FIG. 14C) that corresponds to the area $A_B$ retrieved at step SE2, to the information receiving section 82.

Next, at step SE5, the information receiving section 82 extracts the information $I_B$ for the point B (refer to FIG. 12) for the time slot $TS_B$ that has been set by the time slot setting section 83, from the time division multiplexed information $I_{TDM}$ that has been received via the antenna 81. Then, the information receiving section 82 outputs the information $I_B$ for the point B to the information display section 48. The information display section 48 displays the information $I_B$ for the point B. Thereafter, the information receiving apparatus 80 that is mounted on the mobile unit $\mathbf{10}_B$ repeats the execution of the processing at step SE1 to step SE5 shown in FIG. 16.

When the mobile unit $\mathbf{10}_A$ that is in the moving state shown in FIG. 12 comes close to the point B, at step SE1, the self-position calculating section 43 obtains the self-position (latitude and longitude) of the mobile unit $\mathbf{10}_A$ from the result of the reception by the GPS receiving section 42, and outputs this self-position to the time slot setting section 83 as the self-position information $IP_A$.

At step SE2, the time slot setting section 83 retrieves the area in which the mobile unit $\mathbf{10}_A$ exists from the area/time slot table $T_4$ shown in FIG. 14C by using the self-position information $IP_A$ from the self-position calculating section 43 as a key. In this case, it is assumed that the mobile unit $\mathbf{10}_A$ does not exist in the area/time slot table $T_4$. After the time slot setting section 83 has retrieved the area $A_B$ from the area/time slot table $T_4$, the time slot setting section 83 proceeds to step SE3.

At step SE3, the time slot setting section 83 makes a decision as to whether or not the area (a retrieved area) that has been retrieved this time at step SE2 coincides with the area $A_A$ that has been retrieved last time. As the two areas do not coincide with each other, the time slot setting section 83 sets "No" as a result of the decision made at step SE3, and then proceeds to step SE4. At step SE4, the time slot setting section 83 sets the time slot $TS_B$ (refer to FIG. 14C) that corresponds to the area $A_B$ retrieved this time at step SE2, to the information receiving section 82.

Next, at step SE5, the information receiving section 82 extracts the information $I_B$ for the point B (refer to FIG. 12) for the time slot $TS_B$ that has been set by the time slot setting section 83, from the time division multiplexed information $I_{TDM}$ that has been received via the antenna 81. Then, the information receiving section 82 outputs the information $I_B$ for the point B to the information display section 48. The information display section 48 displays the information $I_B$ for the point B in place of the information $I_A$ for the point A.

As explained above, according to the fourth embodiment, based on the transmission of the time division multiplexed information $I_{TMD}$ to the ground surface from the communication satellite 30 in the sky, it becomes possible to provide information over an extremely wider range than it has been able to provide by the conventional highway radio.

Therefore, the installation of only one information transmitting station 20 becomes sufficient, which makes it possible to lower the installation cost.

Further, according to the fourth embodiment, the position (the position $P_A$ at the point A, etc.) at which the mobile unit (the mobile unit $\mathbf{10}_A$, etc.) can exist and the time slot (the time slot $TS_A$, etc.) are corresponded to each other in the position/time slot table $T_3$ in advance. At the same time, the self-position of the mobile unit and the information (the information $I_A$ for the point A, etc.) to be provided are corresponded to each other indirectly, and the information extracted from the time division multiplexed information $I_{TDM}$ is automatically changed along with the move of the mobile unit. Therefore, a user can handle the information providing system of this embodiment substantially better than the conventional on-demand type information providing system. As a result, it becomes possible to improve the quality of the information provision service.

Further, according to the fourth embodiment, the area (the area $A_A$, etc.) in which the mobile unit (the mobile unit $\mathbf{10}_A$ etc.) can exist and the time slot (the time slot $TS_A$, etc.) are corresponded to each other in the area/time slot table $T_4$ in advance. At the same time, the self-position of the mobile unit and the information (the information $I_A$ for the point A, etc.) to be provided are corresponded to each other indirectly, and the information extracted from the time division multiplexed information $I_{TDM}$ is automatically changed along with the move of the mobile unit. Therefore, a user can handle the information providing system of this embodiment substantially better than the conventional on-demand type information providing system. As a result, it becomes possible to improve the quality of the information provision service.

In the fourth embodiment, the description has been made of the case where a plurality of pieces of information are time division multiplexed by the time division multiplexing unit 70 shown in FIG. 12 according to the time division multiplex (TDM) system. In place of this time division multiplex system, a plurality of pieces of information may be multiplexed by a time division multiple access (TDMA) system.

Further, in the fourth embodiment, the description has been made of the case where the information relating to the position of the mobile unit (the information $I_A$ for the point A, etc.) is corresponded to the time slot $TS_A$, the time slot $TS_B$, and the time slot $TS_C$ shown in FIG. 12 respectively. However, it is also possible to make other information than the position information correspond to these time slots. These will be explained below as a fifth embodiment of this invention.

Figure 17:
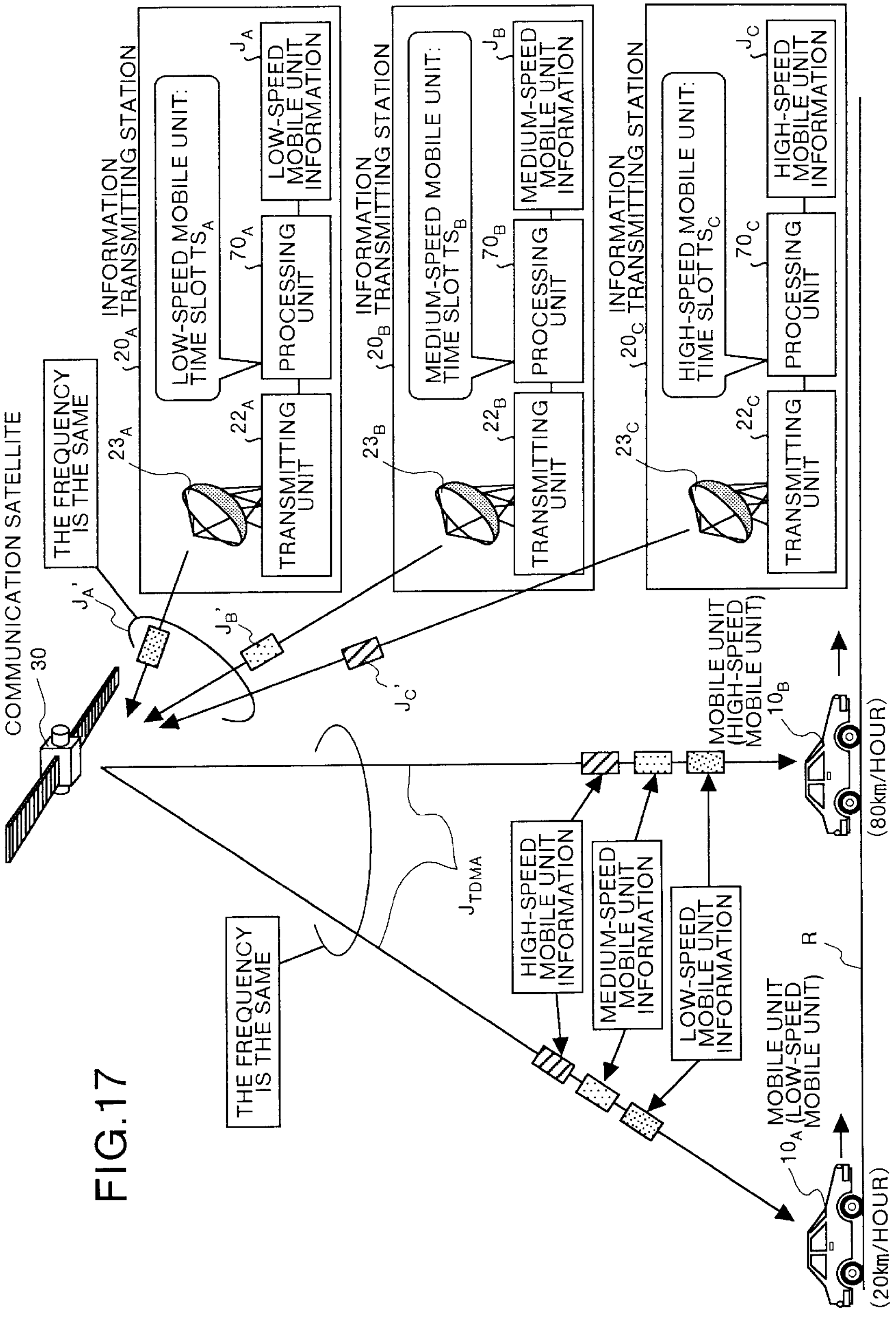
FIG. 17 is a view showing the structure of a fifth embodiment relating to the present invention.

FIG. 17 is a view showing the structure of the fifth embodiment relating to the present invention. In FIG. 17, portions corresponding to those in FIG. 12 are attached with identical legends, and their detailed explanation will be omitted. In FIG. 17, in place of the information transmitting station 20 shown in FIG. 12, an information transmitting station $\mathbf{20}_A$, an information transmitting station $\mathbf{20}_B$, and an information transmitting station $\mathbf{20}_C$ are provided. In the fourth embodiment, only one information transmitting station is sufficient as the time division multiplex system is employed. On the other hand, in the fifth embodiment, three information transmitting stations are necessary in order to employ the time division multiple access system.

Further, in the fifth embodiment, in place of the information $I_A$ for the point A, the information $I_B$ for the point B, and the information $I_C$ for the point C shown in FIG. 12, low-speed mobile unit information $J_A$ medium-speed mobile unit information $J_B$, and high-speed mobile unit information $J_C$ are corresponded to the time slot $TS_A$, the time slot $TS_B$, and the time slot $TS_C$ (refer to FIG. 14A) respectively.

The low-speed mobile unit information $J_A$, the medium-speed mobile unit information $J_B$, and the high-speed mobile unit information $J_C$ are mutually different information, and they correspond to different speed sectors of the mobile unit. These speed sectors include a low speed (equal to or above 0 km/hour and less than 40 km/hour), a medium speed (equal to or above 40 km/hour and less than 60 km/hour), and a high speed (equal to or above 60 km/hour) as shown in FIG. 19.

The low-speed mobile unit information $J_A$ is the information for a mobile unit (a low-speed mobile unit) that is moving at a low speed, such as, for example, a classic music (refer to FIG. 19). The medium-speed mobile unit information $J_B$ is the information for a mobile unit (a medium-speed mobile unit) that is moving at a medium speed, such as, for example, a jazz music (refer to FIG. 19). The high-speed mobile unit information $J_C$ is the information for a mobile unit (a high-speed mobile unit) that is moving at a high speed, such as, for example, a rock music (refer to FIG. 19).

A processing unit $\mathbf{70}_A$ installed in an information transmitting station $\mathbf{20}_A$ allocates the low-speed mobile unit information $J_A$ to a time slot $TS_A$ (refer to FIG. 14A), and outputs this to a transmitting unit $\mathbf{22}_A$ as time division multiple access information $J_A'$. The transmitting unit $\mathbf{22}_A$ transmits the time division multiple access information $J_A'$ to a communication satellite 30 via a parabolic antenna $\mathbf{23}_A$.

A processing unit $\mathbf{70}_B$ installed in an information transmitting station $\mathbf{20}_B$ allocates the medium-speed mobile unit information $J_B$ to a time slot $TS_B$ (refer to FIG. 14A), and outputs this to a transmitting unit $\mathbf{22}_B$ as time division multiple access information $J_B'$. The transmitting unit $\mathbf{22}_B$ transmits the time division multiple access information $J_B'$ to the communication satellite 30 via a parabolic antenna $\mathbf{23}_B$.

A processing unit $\mathbf{70}_C$ installed in an information transmitting station $\mathbf{20}_B$ allocates the high-speed mobile unit information $J_C$ to a time slot $TS_C$ (refer to FIG. 14A), and outputs this to a transmitting unit $\mathbf{22}_C$ as time division multiple access information $J_C'$. The transmitting unit $\mathbf{22}_C$ transmits the time division multiple access information $J_C'$ to the communication satellite 30 via a parabolic antenna $\mathbf{23}_C$.

The time division multiple access information $J_A'$, $J_B'$, and $J_C'$ are time division multiple accessed in the sky, and the multiple-accessed result is relayed by the communication satellite 30. In other words, the communication satellite 30 transmits the time division multiple access information $J_A'$, $J_B'$, and $J_C'$ that have been multiple-accessed (multiplexed), as time division multiple-accessed information $J_{TDMA}$, to the ground surface.

The time division multiple-accessed information $J_{TDMA}$ and the time division multiplexed information $I_{TDM}$ (refer to FIG. 12) are different in that they are multiplexed at different places. In other words, the time division multiple-accessed information $J_{TDMA}$ is multiplexed in the sky, and the time division multiplexed information $I_{TDM}$ is multiplexed by the time division multiplexing unit 70 (refer to FIG. 12). Further, time is synchronized between the processing unit $\mathbf{70}_A$, the processing unit $\mathbf{70}_B$, and the processing unit $\mathbf{70}_C$.

Figure 18:
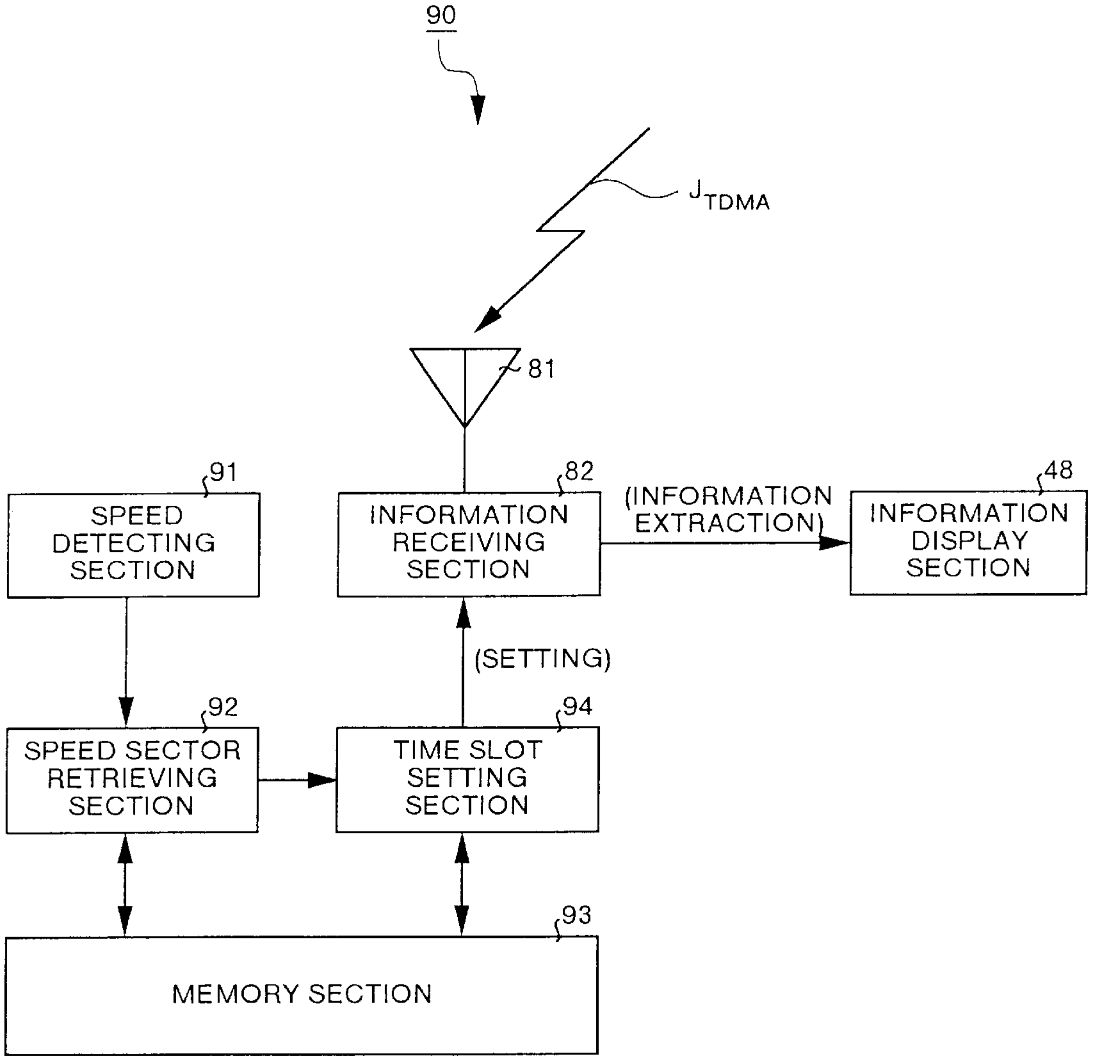
FIG. 18 is a block diagram showing the structure of an information receiving apparatus 90 used in the fifth embodiment.

Further, in the fifth embodiment, each of the mobile unit $\mathbf{10}_A$ and the mobile unit $\mathbf{10}_B$ shown in FIG. 17 is mounted with an information receiving apparatus 90 shown in FIG. 18 in place of the information receiving apparatus 80 shown in FIG. 13. In FIG. 18, portions corresponding to those in FIG. 13 are attached with identical legends.

The information receiving apparatus 90 shown in FIG. 18 has a speed detecting function for detecting a moving speed (a running speed) of the mobile unit (for example, the mobile unit $10_A$ or the mobile unit $10_B$), a receiving function for receiving the time division multiple-accessed information $J_{TDMA}$ from the communication satellite 30, an information extracting function for extracting the information corresponding to the moving speed of the mobile unit from the time division multiple-accessed information $J_{TDMA}$, and a display function for displaying the extracted information.

In the information receiving apparatus 90, a speed detecting section 91 detects the moving speed of the mobile unit. A speed sector retrieving section 92 retrieves a speed sector to which the speed belongs, from a table $T_5$ (refer to FIG. 19) that is stored in a memory section 93, by using the moving speed that has been detected by the speed detecting section 91 as a key. The speed sector retrieving section 92 then delivers the retrieved result to a time slot setting section 94.

The table $T_5$ shown in FIG. 19 is a table that defines a relationship between a type of a mobile unit, a speed sector/speed range, a time slot, and provided information/contents. In the example shown in FIG. 19, a low-speed mobile unit, a medium-speed mobile unit, and a high-speed mobile unit are defined for the type of the mobile unit. For the speed sector/speed range, there are defined a low speed/equal to or above 0 and less than 40, a medium speed/equal to or above 40 and less than 60, and a high speed/equal to or above 60.

Further, for the time slot, there are defined the time slot $TS_A$, the time slot $TS_B$, and the time slot $TS_C$, shown in FIG. 17. For the provided information/contents, there are defined the low-speed mobile unit information $J_A$/classic music, the medium-speed mobile unit information $J_B$/jazz music, and the high-speed mobile unit information $J_C$/rock music.

The time slot setting section 94 sets a time slot of the table $T_5$ shown in FIG. 19 corresponding to a speed sector that has been retrieved by the speed sector retrieving section 92, to a information receiving section 82. The information receiving section 82 extracts the time slot information (for example, the low-speed mobile unit information $J_A$, the medium-speed mobile unit information $J_B$, or the high-speed mobile unit information $J_C$) that has been set by the time slot setting section 94, from the time division multiple-accessed information $J_{TDMA}$. The information display section 48 displays the contents name and the reproduction time of the information that has been extracted by the information receiving section 82, and reproduces the music contents.

Figure 20:
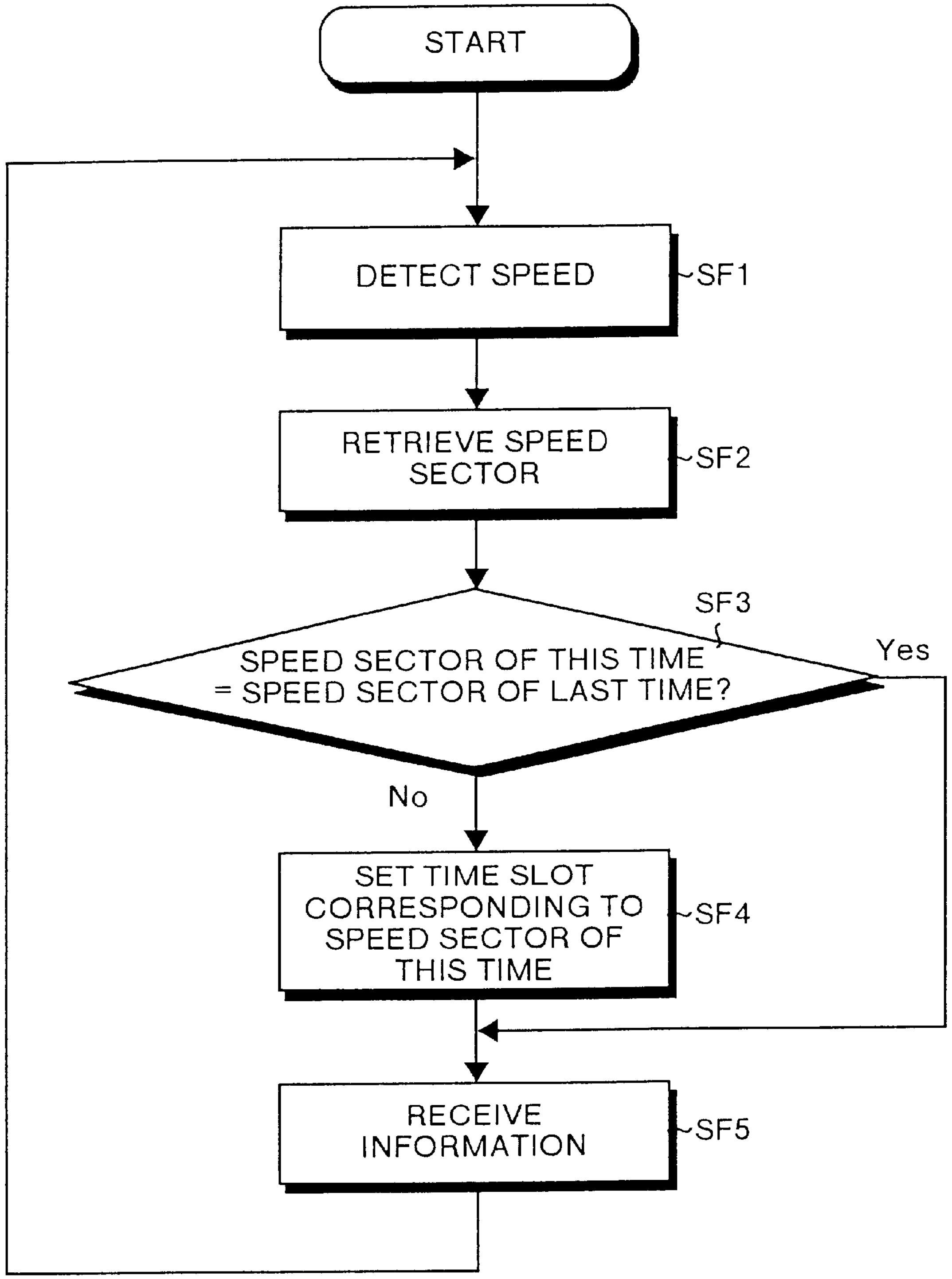
FIG. 20 is a flowchart for explaining the operation of the fifth embodiment.

The operation of the fifth embodiment will be explained next with reference to a flowchart shown in FIG. 20. First, when the low-speed mobile unit information $J_A$ shown in FIG. 17 has been input to the processing unit $70_A$, the processing unit $70_A$ allocates the low-speed mobile unit information $J_A$ to the time slot $TS_A$, and outputs the time division multiple access information $J_A$, to the transmitting unit $22_A$. Then, the transmitting unit $22_A$ transmits the time division multiple access information $J_A'$ to the communication satellite 30 via the parabolic antenna $23_A$.

When the medium-speed mobile unit information $J_B$ has been input to the processing unit $70_B$, the processing unit $70_B$ allocates the medium-speed mobile unit information $J_B$ to the time slot $TS_B$ and outputs the time division multiple access information $J_B'$ to the transmitting unit $22_B$. Then, the transmitting unit $22_B$ transmits the time division multiple access information $J_B'$ to the communication satellite 30 via the parabolic antenna $23_B$.

When the high-speed mobile unit information $J_C$ has been input to the processing unit $70_C$, the processing unit $70_C$ allocates the high-speed mobile unit information $J_C$ to the time slot $TS_C$, and outputs the time division multiple access information $J_C'$ to the transmitting unit $22_C$. Then, the transmitting unit $22_C$ transmits the time division multiple access information $J_C'$ to the communication satellite 30 via the parabolic antenna $23_C$.

The time division multiple access information $J_A'$, $J_B'$, and $J_C'$ that have been transmitted to the communication satellite 30 are time division multiple accessed in the sky, and a result is relayed by the communication satellite 30 as the time division multiple-accessed information $J_{TDMA}$. Thus, the time division multiple-accessed information $J_{TDMA}$ is transmitted to the ground surface by the communication satellite.

It is assumed that the mobile unit $10_A$ that is moving along the moving route R shown in the drawing is moving at the moving speed of 20 km/hour, and that the mobile unit $10_B$ is moving at the moving speed of 80 km/hour. In this case, at step SF1, the speed detecting section 91 detects the moving speed (20 km/hour) of the mobile unit $10_A$, and delivers this to the speed sector retrieving section 92.

At step SF2, the speed sector retrieving section 92 retrieves the speed sector relating to the mobile unit $10_A$ from the table $T_5$ shown in FIG. 19, by using the moving speed (20 km/hour) that has been detected by the speed detecting section 91 as a key. In this case, the speed sector retrieving section 92 retrieves the "low speed" as the speed sector from the table $T_5$, and delivers this to the time slot setting section 94.

At step SF3, the time slot setting section 94 makes a decision as to whether or not the speed sector that has been retrieved this time by the speed sector retrieving section 92 coincides with the speed sector that has been retrieved last time. When the two speed sectors do not coincide with each other, the time slot setting section 94 sets "No" as a result of the decision made at step SF3, and then proceeds to step SF4. When the speed sector retrieved last time coincides with the speed sector retrieved this time, the time slot setting section 94 sets "Yes" as a result of the decision made at step SF3. The time slot setting section 94 does not set a new time slot corresponding to the speed sector retrieved this time by the speed sector retrieving section 92, to the information receiving section 82.

At step SF4, the time slot setting section 94 sets the time slot $TS_A$ (refer to FIG. 19) corresponding to the speed sector (the "low speed") retrieved by the speed sector retrieving section 92 this time, to the information receiving section 82, by referring to the table $T_5$ shown in FIG. 19. Next, at step SF5, the information receiving section 82 extracts the low-speed mobile unit information $J_A$ (refer to FIG. 17) of the time slot $TS_A$ that has been set by the time slot setting section 94, from the time division multiple-accessed information $J_{TDMA}$ that has been received via the antenna 81. Then, the information receiving section 82 outputs the low-speed mobile unit information $J_A$ (refer to FIG. 17) to the information display section 48.

Then, the information display section 48 displays the contents name (the name of the classic music) and the reproduction time of the low-speed mobile unit information $J_A$, and reproduces the low-speed mobile unit information $J_A$ Thus, a classic music that generates the atmosphere suitable for the low-speed driving flows in the mobile unit $10_A$.

In the mean time, in parallel with the operation of the information receiving apparatus 90 mounted on the mobile unit $10_A$, the speed detecting section 91 of the information receiving apparatus 90 mounted on the mobile unit $10_B$ shown in FIG. 17 executes the processing at step SF1. In other words, at step SF1, the speed detecting section 91 detects the moving speed (80 km/hour) of the mobile unit $10_B$ At step SF2, the speed sector detecting section 92 retrieves the "high speed" as the speed sector relating to the mobile unit $10_B$ from the table $T_5$ shown in FIG. 19, by using the moving speed (80 km/hour) that has been detected by the speed detecting section 91 as a key. Then, the speed sector detecting section 92 delivers this "high speed" to the time slot setting section 94.

At step SF3, the time slot setting section 94 sets "No" as a result of the decision made, and then proceeds to step SF4. At step SF4, the time slot setting section 94 sets the time slot $TS_C$ (refer to FIG. 19) that corresponds to the speed sector (the "high speed") that has been retrieved this time by the speed sector detecting section 92, to the information receiving section 82.

Next, at step SF5, the information receiving section 82 extracts the high-speed mobile unit information $J_C$ (refer to FIG. 17) for the time slot $TS_C$ that has been set by the time slot setting section 94, from the time division multiple-accessed information $J_{TDMA}$ that has been received via the antenna 81. Then, the information receiving section 82 outputs the time division multiple-accessed information $J_{TDMA}$ to the information display section 48.

The information display section 48 displays the contents name (the name of the rock music) and the reproduction time of the high-speed mobile unit information $J_C$, and reproduces the high-speed mobile unit information $J_C$. Thus, a rock music of a high tempo that makes livelier the atmosphere suitable for the high-speed driving flows in the mobile unit $10_B$.

When the moving speed of the mobile unit $10_A$ has been accelerated from 20 km/hour to 50 km/hour, the speed sector shown in FIG. 19 changes from the "low speed" to the "medium speed". Therefore, the time slot setting section 94 newly sets the time slot $TS_B$ that corresponds to the "medium speed" to the information receiving section 82. In this case, the information receiving section 82 extracts the medium-speed mobile unit information $J_B$ (refer to FIG. 17) of the time slot $TS_B$ that has been set by the time slot setting section 94, from the time division multiple-accessed information $J_{TDMA}$ that has been received via the antenna 81.

The information display section 48 displays the contents name (the name of the jazz music) and the reproduction time of the medium-speed mobile unit information $J_B$ in place of the low-speed mobile unit information $J_A$, and reproduces the medium-speed mobile unit information $J_B$. Thus, a jazz music that makes elegant the atmosphere suitable for the medium-speed driving flows in the mobile unit $10_A$.

As explained above, according to the fifth embodiment, the speed sectors and the time slots are corresponded to the table $T_5$ in advance. Along with the change in the moving speed of the mobile unit, the information (the low-speed mobile unit information $J_A$, etc.) that has been extracted from the $J_{TDMA}$ is automatically changed. Therefore, a user can handle the information providing system of this embodiment substantially better than the conventional on-demand type information providing system. As a result, it becomes possible to improve the quality of the information provision service.

In the fifth embodiment, the description has been made of the case where the time division multiple access (TDMA) system is used. In place of this system, the code division multiple access (CDMA) system (refer to FIG. 9) explained in the third embodiment may also be used. This case will be explained below as a sixth embodiment of this invention.

Figure 21:
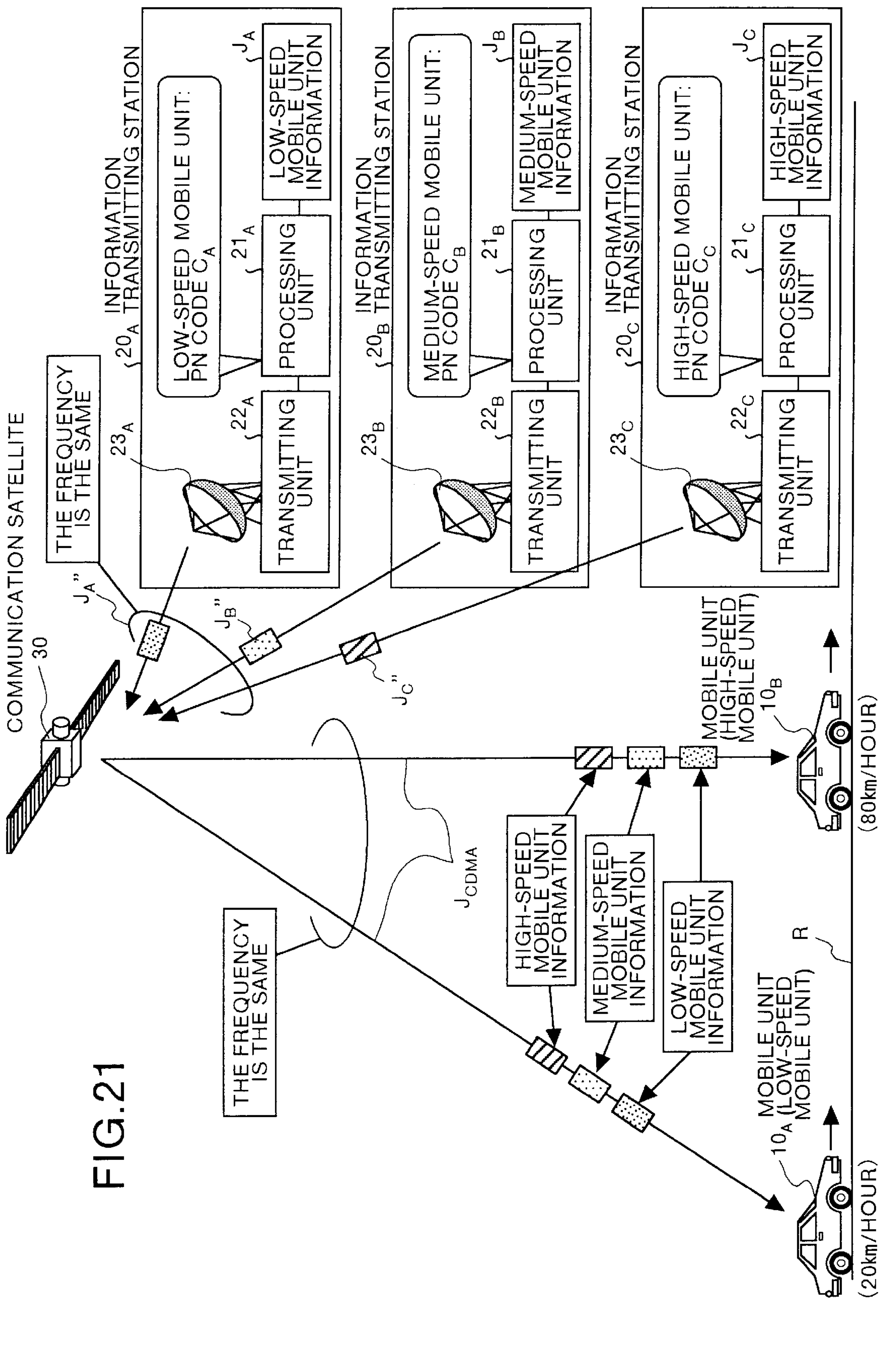
FIG. 21 is a view showing the structure of a sixth embodiment relating to the present invention.

FIG. 21 is a view showing the structure of the sixth embodiment relating to the present invention. In FIG. 21, portions corresponding to those in FIG. 9 and FIG. 17 are attached with identical legends, and their detailed explanation will be omitted. In FIG. 21, in place of the processing units $70_A$ to $70_C$ shown in FIG. 17, the processing units $21_A$ to $21_C$ (refer to FIG. 9) are provided.

The processing unit $21_A$ is a unit that multiplies the low-speed mobile unit information $J_A$ with the PN code $C_A$, thereby to spectrum diffuse the low-speed mobile unit information $J_A$, and transmits this result to the transmitting unit $22_A$ as the code division multiple access information $J_A$" The transmitting unit $22_A$ transmits the code division multiple access information $J_A$" to the communication satellite 30 via the parabolic antenna $23_A$.

The processing unit $21_B$ is a unit that multiplies the medium-speed mobile unit information $J_B$ with the PN code $C_B$, thereby to spectrum diffuse the medium-speed mobile unit information $J_B$, and transmits this result to the transmitting unit $22_B$ as the code division multiple access information $J_B$". The transmitting unit $22_B$ transmits the code division multiple access information $J_B$" to the communication satellite 30 via the parabolic antenna $23_B$.

The processing unit $21_C$ is a unit that multiplies the high-speed mobile unit information $J_C$ with the PN code $C_C$, thereby to spectrum diffuse the high-speed mobile unit information $J_C$, and transmits this result to the transmitting unit $22_C$ as the code division multiple access information $J_C$". The transmitting unit $22_C$ transmits the code division multiple access information $J_C$" to the communication satellite 30 via the parabolic antenna $23_C$.

The code division multiple access information $J_A$", $J_B$", and $J_C$" are code division multiple accessed in the space, and the code division multiple-accessed result is relayed by the communication satellite. In other words, the communication satellite 30 transmits the code division multiple access information $J_A$", $J_B$", and $J_C$" that have been code division multiple accessed (multiplexed), that is, the code division multiple-accessed information $J_{CDMA}$, to the ground surface.

Figure 22:
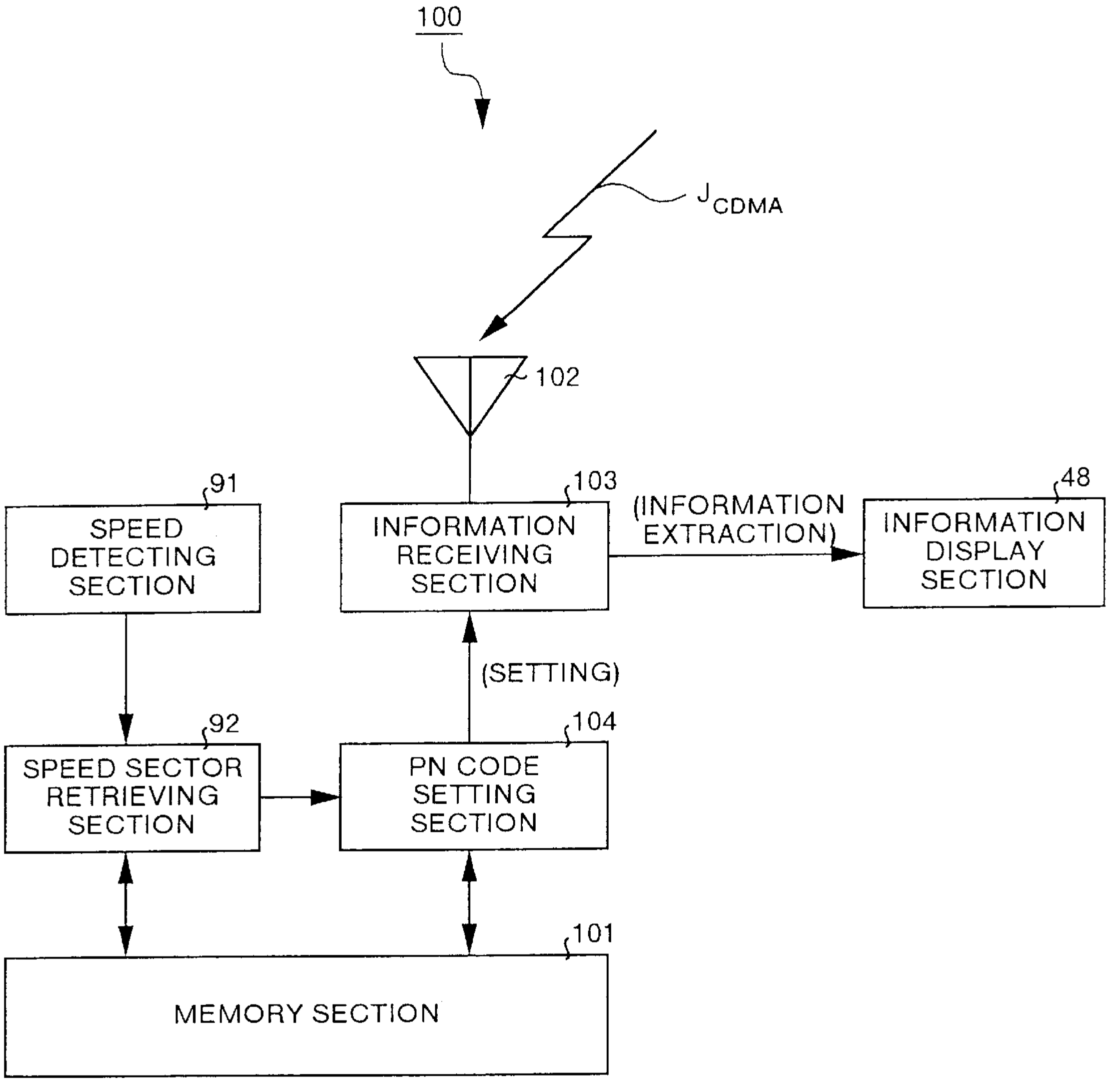
FIG. 22 is a block diagram showing the structure of an information receiving apparatus 100 used in the sixth embodiment.

In the sixth embodiment, each of the mobile unit $10_A$ and the mobile unit $10_B$ shown in FIG. 21 is mounted with an information receiving apparatus 100 shown in FIG. 22 in place of the information receiving apparatus 90 shown in FIG. 18. In FIG. 22, portions corresponding to those in FIG. 18 are attached with identical legends.

The information receiving apparatus 100 shown in FIG. 22 has a speed detecting function for detecting a moving speed (a running speed) of the mobile unit (for example, the mobile unit $10_A$ or the mobile unit $10_B$), a receiving function for receiving the code division multiple-accessed information $J_{CDMA}$ from the communication satellite 30, an information extracting function for extracting the information corresponding to the moving speed of the mobile unit from the code division multiple-accessed information $J_{CDMA}$, and a display function for displaying the extracted information.

In this information receiving apparatus 100, a memory section 101 stores a table $T_6$ shown in FIG. 23. In FIG. 23, portions corresponding to those in FIG. 19 are attached with identical reference symbols and names. In this table $T_6$, the PN codes (the PN code $C_A$, the PN code $C_B$, and the PN code $C_C$) are defined in place of the time slots (the time slot $TS_A$, the time slot $TS_B$, and the time slot $TS_C$) shown in FIG. 19. This table T6 is a table that defines a relationship between a type of a mobile unit, a speed sector/speed range, a PN code, and provided information/contents.

Referring back to FIG. 22, a speed sector retrieving section retrieves a speed sector to which the speed belongs, from the table $T_6$ (refer to FIG. 23) that is stored in the memory section 101, by using the moving speed that has been detected by a speed detecting section 91 as a key. The speed sector retrieving section 92 then delivers the retrieved result to a PN code setting section 104.

The PN code setting section 104 sets a PN code in the table T6 shown in FIG. 23 corresponding to the speed sector that has been retrieved by the speed sector retrieving section 92, to a information receiving section 103. The information receiving section 103 correlates the received code division multiple-accessed information $J_{CDMA}$ with the PN code that has been set by the PN code setting section 104. Thus, the information receiving section 103 extracts the information (for example, low-speed mobile unit information $J_A$, the medium-speed mobile unit information $J_B$, or the high-speed mobile unit information $J_C$) from the code division multiple-accessed information $J_{CDMA}$.

Figure 24:
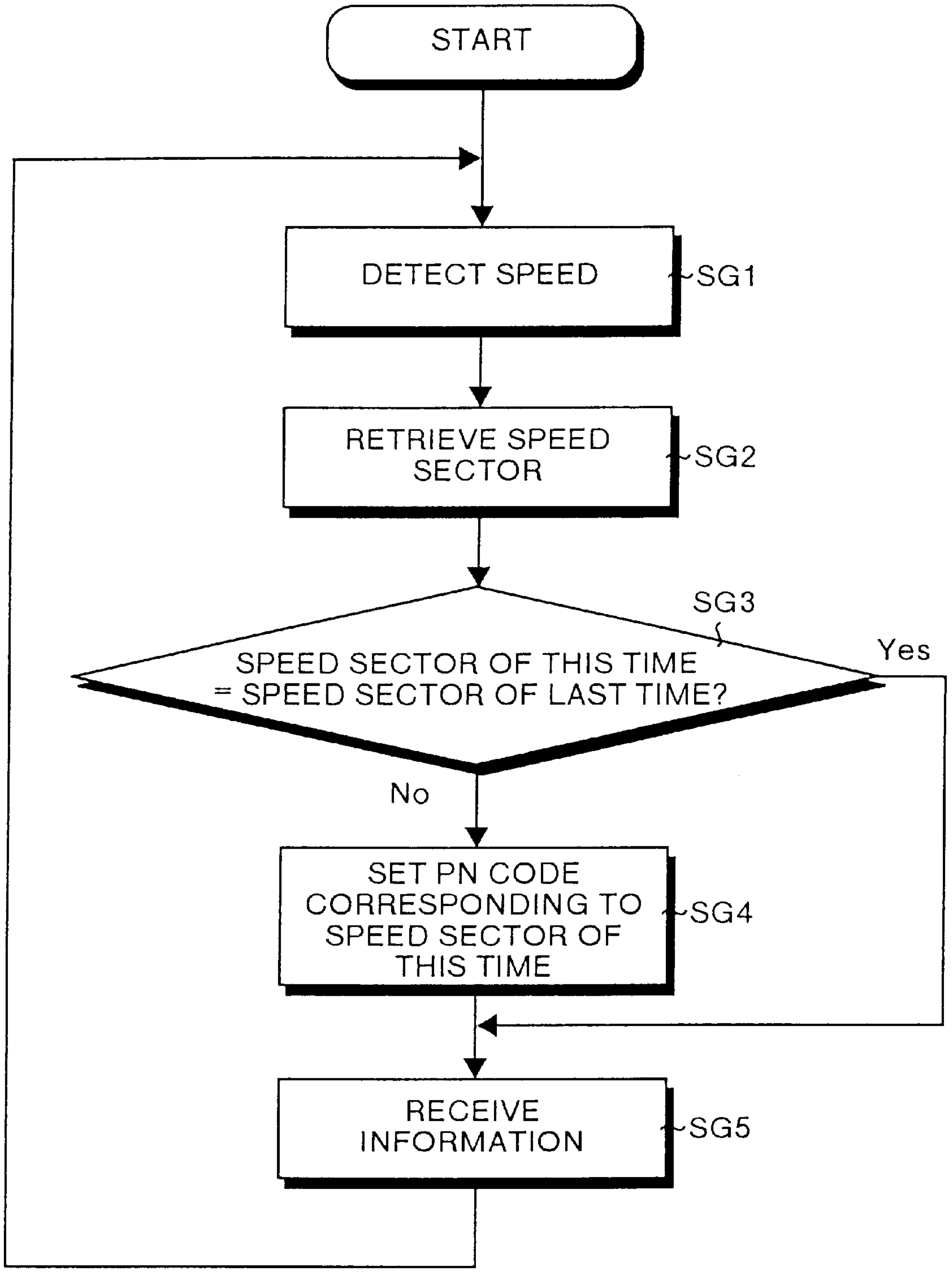
FIG. 24 is a flowchart for explaining the operation of the sixth embodiment.

The operation of the sixth embodiment will be explained next with reference to a flowchart shown in FIG. 24. First, when the low-speed mobile unit information $J_A$ shown in FIG. 21 has been input to the processing unit $21_A$, the processing unit $21_A$ generates the code division multiple access information $J_A''$ by using the low-speed mobile unit information $J_A$ and the PN code $C_A$. The processing unit $21_A$ then transmits the generated code division multiple access information $J_A''$ to the transmitting unit $22_A$. Then, the transmitting unit $22_A$ transmits the code division multiple access information $J_A''$ to the communication satellite 30 via the parabolic antenna $23_A$.

When the medium-speed mobile unit information $J_B$ has been input to the processing unit $21_B$, the processing unit $21_B$ generates the code division multiple access information $J_B''$ by using the medium-speed mobile unit information $J_B$ and the PN code $C_B$ The processing unit $21_B$ then transmits the generated code division multiple access information $J_B''$ to the transmitting unit $22_B$. Then, the transmitting unit $22_B$ transmits the code division multiple access information $J_B''$ to the communication satellite 30 via the parabolic antenna $23_B$.

When the high-speed mobile unit information $J_C$ has been input to the processing unit $21_C$, the processing unit $21_C$ generates the code division multiple access information $J_C''$ by using the high-speed mobile unit information $J_C$ and the PN code $C_C$. The processing unit $21_C$ then transmits the generated code division multiple access information $J_C''$ to the transmitting unit $22_C$. Then, the transmitting unit $22_C$ transmits the code division multiple access information $J_C''$ to the communication satellite 30 via the parabolic antenna $23_C$.

The code division multiple access information $J_A''$, $J_B''$, and $J_C''$ that have been transmitted to the communication satellite 30 are code division multiple accessed in the sky, and a result is relayed by the communication satellite 30 as the code division multiple-accessed information $J_{CDMA}$. Thus, the code division multiple-accessed information $J_{CDMA}$ is transmitted to the ground surface by the communication satellite 30.

It is assumed that the mobile unit $10_A$ that is moving along the moving route R shown in FIG. 21 is moving at the moving speed of 20 km/hour, and that the mobile unit $10_B$ is moving at the moving speed of 80 km/hour. In this case, at step SG1, the speed detecting section 91 detects the moving speed (20 km/hour) of the mobile unit $10_A$.

At step SG2, the speed sector retrieving section 92 retrieves the speed sector relating to the mobile unit $10_A$ from the table $T_6$ shown in FIG. 23, by using the moving speed (20 km/hour) that has been detected by the speed detecting section 91 as a key. In this case, the speed sector retrieving section 92 retrieves the "low speed" as the speed sector from the table $T_6$, and delivers this to the PN code setting section 104.

At step SG3, the PN code setting section 104 makes a decision as to whether or not the speed sector that has been retrieved this time by the speed sector retrieving section 92 coincides with the speed sector that has been retrieved last time. When the two speed sectors do not coincide with each other, the PN code setting section 104 sets "No" as a result of the decision made at step SG3, and then proceeds to step SG4.

When the speed sector retrieved last time coincides with the speed sector retrieved this time, the PN code setting section 104 sets "Yes" as a result of the decision made at step SG3. The PN code setting section 104 does not set a new PN code corresponding to the speed sector retrieved this time by the speed sector retrieving section 92.

At step SG4, the PN code setting section 104 sets the PN code $C_A$ (refer to FIG. 23) corresponding to the speed sector (the "low speed") retrieved by the speed sector retrieving section 92 this time, to the information receiving section 103, by referring to the table $T_6$ shown in FIG. 23.

Next, at step SG5, the information receiving section 103 extracts the low-speed mobile unit information $J_A$ (refer to FIG. 21) from the code division multiple-accessed information $J_{CDMA}$, by correlating the code division multiple-accessed information $J_{CDMA}$ that has been received via the antenna 102 with the PN code $C_A$. Then, the information receiving section 103 outputs the low-speed mobile unit information $J_A$ to the information display section 48. Then, the information display section 48 displays the contents name (the name of the classic music) and the reproduction time of the low-speed mobile unit information $J_A$, and reproduces the low-speed mobile unit information $J_A$, in a similar manner to that of the fifth embodiment.

In the mean time, in parallel with the operation of the information receiving apparatus 100 mounted on the mobile unit $10_A$, the speed detecting section 91 of the information receiving apparatus 100 mounted on the mobile unit $10_B$ shown in FIG. 21 executes the processing at step SG1. In other words, at step SG1, the speed detecting section 91 detects the moving speed (80 km/hour) of the mobile unit $10_B$. At step SG2, the speed sector detecting section 92 retrieves the "high speed" as the speed sector relating to the mobile unit $10_B$ from the table $T_6$ shown in FIG. 23, by using the moving speed (80 km/hour) that has been detected by the speed detecting section 91 as a key. Then, the speed sector detecting section 92 delivers this "high speed" to the PN code setting section 104.

At step SG3, the PN code setting section 104 sets "No" as a result of the decision made, and then proceeds to step SG4. At step SG4, the PN code setting section 104 sets the PN code $C_C$ (refer to FIG. 23) that corresponds to the speed sector (the "high speed") that has been retrieved this time by the speed sector detecting section 92, to the information receiving section 103.

Next, at step SG5, the information receiving section 103 extracts the high-speed mobile unit information $J_C$ (refer to FIG. 21) from the code division multiple-accessed information $J_{CDMA}$, by correlating the code division multiple-accessed information $J_{CDMA}$ that has been received via the antenna 102 with the PN code $C_C$. Then, the information receiving section 103 outputs the high-speed mobile unit information $J_C$ to the information display section 48. Then, the information display section 48 displays the contents name (the name of the rock music) and the reproduction time of the high-speed mobile unit information $J_C$, and reproduces the high-speed mobile unit information $J_C$, in a similar manner to that of the fifth embodiment.

When the moving speed of the mobile unit $\mathbf{10}_A$ has been accelerated from 20 km/hour to 50 km/hour, the speed sector shown in FIG. 23 changes from the "low speed" to the "medium speed", by the operation similar to that described above. Therefore, the PN code setting section 104 newly sets the PN code $C_B$ that corresponds to the "medium speed" to the information receiving section 103.

In this case, the information receiving section 103 extracts the medium-speed mobile unit information $J_B$ (refer to FIG. 21) from the code division multiple-accessed information $J_{CDMA}$, by correlating the code division multiple-accessed information $J_{CDMA}$ that has been received via the antenna 102 with the PN code $C_B$. Then, the information receiving section 103 outputs the medium-speed mobile unit information $J_B$ to the information display section 48. Then, the information display section 48 displays the contents name (the name of the jazz music) and the reproduction time of the medium-speed mobile unit information $J_B$ in place of the low-speed mobile unit information $J_A$, and reproduces the medium-speed mobile unit information $J_B$, in a similar manner to that of the fifth embodiment.

As explained above, according to the sixth embodiment, the speed sectors and the PN codes are corresponded to the table $T_6$ in advance. Along with the change in the moving speed of the mobile unit, the information (the low-speed mobile unit information $J_A$, etc.) that has been extracted from the code division multiple-accessed information $J_{CDMA}$ is automatically changed. Therefore, a user can handle the information providing system of this embodiment substantially better than the conventional on-demand type information providing system. As a result, it becomes possible to improve the quality of the information provision service.

Seventh embodiment of this invention will be explained here. In the operation example 2 of the first embodiment and also in the operation example 2 of the fourth embodiment, the description has been made of the case where the areas $A_A$ to $A_C$ are defined in the area/PN code table $T_2$ shown in FIG. 4B and in the area/time slot table $T_4$ shown in FIG. 14C respectively. In place of these areas $A_A$ to $A_C$, a table (not shown) that defines an area #A to an area #D shown in FIG. 25 may be used. In this table (not shown), PN codes $C_A$ to $C_D$ (or a time slot $TS_A$ to a time slot $TS_D$) are corresponded to the area #A to the area #D respectively.

Figure 25:
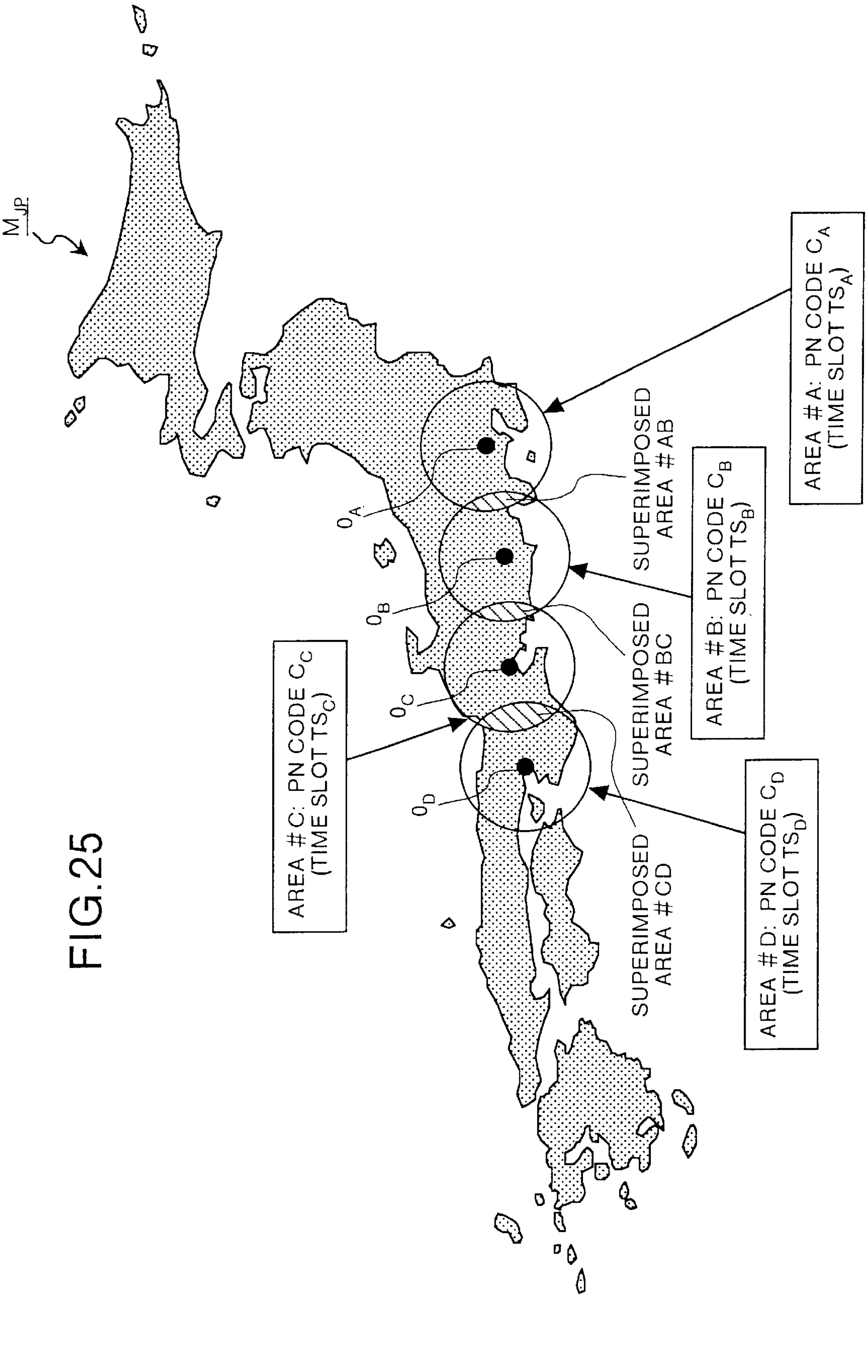
FIG. 25 is a view for explaining a seventh embodiment relating to the present invention.

In a Japanese map $M_{JP}$ shown in FIG. 25, the area #A to the area #D are arranged from the east side to the west side respectively, with a part of each area superimposed with a part of the adjacent area respectively. In other words, an area in which the area #A is superimposed with the area #B is called a superimposed area #AB, and an area in which the area #B is superimposed with the area #C is called a superimposed area #BC.

Similarly, an area in which the area #C is superimposed with the area #D is called a superimposed area #CD. The basic structure of the seventh embodiment is similar to the structure of the first embodiment shown in FIG. 1 or the structure of the fourth embodiment shown in FIG. 12.

Figure 26:
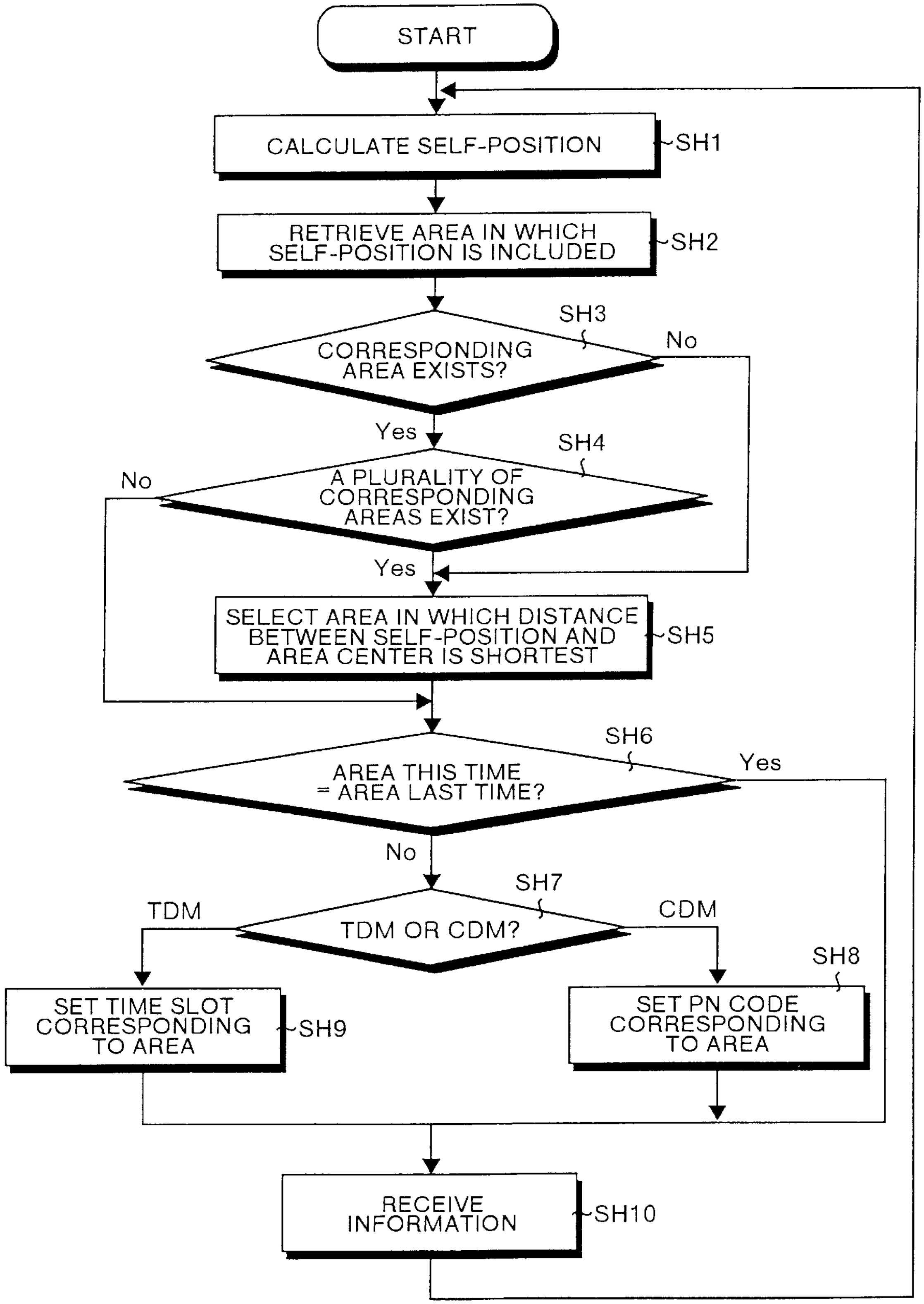
FIG. 26 is a flowchart for explaining the operation of the seventh embodiment.

The operation of the seventh embodiment will be explained next with reference to a flowchart shown in FIG. 26. It is assumed that the mobile unit $\mathbf{10}_A$ that is moving as shown in FIG. 1 exists in the area #A shown in FIG. 25. When the GPS receiving section 42 of the information receiving apparatus 40 shown in FIG. 3 that is mounted on the mobile unit $\mathbf{10}_A$ has received waves from four GPS satellites (not shown) via the antenna 41, the self-position calculating section 43 proceeds to step SH1 shown in FIG. 26.

At step SH1, the self-position calculating section 43 obtains the self-position (latitude and longitude) of the mobile unit $\mathbf{10}_A$ from the result of the reception by the GPS receiving section 42, and outputs this self-position to the PN code setting section 46 as self-position information $IP_A$, in a similar manner to that of the first embodiment. At step SH2, the PN code setting section 46 retrieves the area in which the mobile unit $\mathbf{10}_A$ exists, from the table (not shown), by using the self-position information $IP_A$ from the self-position calculating section 43 as a key.

In this case, as the mobile unit $\mathbf{10}_A$ exists in the area #A shown in FIG. 25, the PN code setting section 46 retrieves the area #A from the table, and proceeds step SH3. At step SH3, the PN code setting section 46 makes a decision as to whether or not there exists in the table an area where the mobile unit $\mathbf{10}_A$ exists. In this case, the PN code setting section 46 sets "Yes" as a result of the decision made at step SH3, and proceeds to step SH4.

At step SH4, the PN code setting section 46 makes a decision as to whether or not there exist in the table a plurality of areas in which the mobile unit $\mathbf{10}_A$ exists. In this case, the PN code setting section 46 sets "No" as a result of the decision made at step SH4, and proceeds to step SH6. At step SH6, the PN code setting section 46 makes a decision as to whether or not the area retrieved last time at step SH2 coincides with the area retrieved this time.

When the two areas do not coincide with each other, the PN code setting section 46 sets "No" as a result of the decision made at step SH6, and proceeds to step SH7. When the last area and the area this time coincide with each other, the PN code setting section 46 sets "Yes" as a result of the decision made at step SH6. The PN code setting section 46 does not set a new PN code that corresponds to the area this time, to the information receiving section 45.

At step SH7, the PN code setting section 46 makes a decision as to whether the multiplex system is the time division multiplex (TDM) system or the code division multiplex (CDM) system. More specifically, the PN code setting section 46 confirms the preset multiplex system (the time division multiplex (TDM) system or the code division multiplex (CDM) system), and makes a decision at step SH7. In this case, the PN code setting section 46 confirms that the multiplex system is the code division multiplex (CDM) system, and proceeds to step SH8.

At step SH8, the PN code setting section 46 sets the PN code $C_A$ (refer to FIG. 25) corresponding to the area #A that has been retrieved this time at step SH2, to the information receiving section 45. At step SH10, the information receiving section 45 extracts the information $I_A$ for the point A (refer to FIG. 1) from the code division multiplexed information $I_{CDM}$, by correlating the code division multiplexed information $I_{CDM}$ that has been received via the antenna 44 with the PN code $C_A$ that has been set by the PN code setting section 46. The information receiving section 45 then outputs this information $I_A$ for the point A, to the information display section 48.

The information display section 48 displays the information $I_A$ for the point A. Thereafter, the information receiving apparatus 40 that is mounted on the mobile unit $\mathbf{10}_A$ repeats the execution of the processing at step SH1 to step SH10 shown in FIG. 26.

When the mobile unit $10_A$ that is in the moving state shown in FIG. 1 exists in the superimposed area #AB shown in FIG. 25, at step SH2, the PN code setting section 46 retrieves the area in which the mobile unit $10_A$ exists from the table (not shown), by using the self-position information $IP_A$ from the self-position calculating section 43 as a key. In this case, the as the mobile unit $10_A$ exists in both the area #A and the area #B shown in FIG. 25, the PN code setting section 46 retrieves the area #A and the area #B from the table, and proceeds to step SH3.

At step SH3, the PN code setting section 46 sets "Yes" as a result of the decision made, and proceeds to step SH4. At step SH4, as there are two areas (the area #A and the area #B) in which the mobile unit $10_A$ exists in the table, the PN code setting section 46 sets "Yes" as a result of the decision made, and proceeds to step SH5.

At step SH5, the PN code setting section 46 selects an area in which the distance between the self-position of the mobile unit $10_A$ and the center of the area is the shortest, from the area #A and the area #B shown in FIG. 25. In this case, it is assumed that the distance between the self-position of the mobile unit $10_A$ and an area center $O_B$ of the area #B is shorter than the distance between the self-position of the mobile unit $10_A$ and an area center $O_A$ of the area #A. Then, the PN code setting section 46 selects the area #B, and proceeds to step SH6.

At step SH6, the PN code setting section 46 makes a decision as to whether the area #B selected at step SH5 coincides with the area #A of the last time. As the two areas do not coincide with each other, the PN code setting section 46 sets "No" as a result of the decision made at step SH6, and proceeds to step SH7. At step SH7, the PN code setting section 46 decides that the multiplex system is the code division multiplex (CDM) system, and proceeds to step SH8.

At step SH8, the PN code setting section 46 sets the PN code $C_B$ (refer to FIG. 25) corresponding to the area #B, to the information receiving section 45. At step SH10, the information receiving section 45 extracts the information $I_B$ for the point B (refer to FIG. 1) from the code division multiplexed information $I_{CDM}$, by correlating the code division multiplexed information $I_{CDM}$ that has been received via the antenna 44 with the PN code $C_B$ that has been set by the PN code setting section 46. The information receiving section 45 then outputs this information $I_B$ for the point B, to the information display section 48. The information display section 48 then displays the information $I_B$ for the point B in place of the information $I_A$ for the point A.

When the mobile unit $10_A$ shown in FIG. 1 exists outside the area #A to the area #D shown in FIG. 25, the PN code setting section 46 sets "No" as a result of the decision made at step SH3, and proceeds to step SH5. At step SH5, the PN code setting section 46 selects an area in which the distance between the self-position of the mobile unit $10_A$ and the center of the area is the shortest, from the area #A to the area #D shown in FIG. 25.

In this case, it is assumed that the distance between the self-position of the mobile unit $10_A$ and the area center $O_B$ of the area #B is the shortest. Then, the PN code setting section 46 selects the area #B, and proceeds to step SH6. Thereafter, through the above operation, the information receiving apparatus 40 of the mobile unit $10_A$ that exists outside the area receives the information $I_B$ for the point B, and displays this.

Next, the case where the mobile unit $10_A$ shown in FIG. 12 exists in the area #A shown in FIG. 25 will be explained. When the GPS receiving section 42 of the information receiving apparatus 80 shown in FIG. 13 that is mounted on the mobile unit $10_A$ has received waves from four GPS satellites (not shown) via the antenna 41, the self-position calculating section 43 proceeds to step SH1 shown in FIG. 26.

At step SH1, the self-position calculating section 43 obtains the self-position (latitude and longitude) of the mobile unit $10_A$ from the result of the reception by the GPS receiving section 42, and outputs this self-position to the time slot setting section 83 as self-position information $IP_A$, in a similar manner to that of the first embodiment.

At step SH2, the time slot setting section 83 retrieves the area in which the mobile unit $10_A$ exists, from the table (not shown), by using the self-position information $IP_A$ from the self-position calculating section 43 as a key. In this case, as the mobile unit $10_A$ exists in the area #A shown in FIG. 25, the time slot setting section 83 retrieves the area #A from the table, and proceeds step SH3.

At step SH3, the time slot setting section 83 makes a decision as to whether or not there exists in the table an area where the mobile unit $10_A$ exists. In this case, the time slot setting section 83 sets"Yes" as a result of the decision made at step SH3, and proceeds to step SH4. At step SH4, the time slot setting section 83 makes a decision as to whether or not there exist in the table a plurality of areas in which the mobile unit $10_A$ exists. In this case, the time slot setting section 83 sets "No" as a result of the decision made at step SH4, and proceeds to step SH6.

At step SH6, the time slot setting section 83 makes a decision as to whether or not the area retrieved last time at step SH2 coincides with the area retrieved this time. When the two areas do not coincide with each other, the time slot setting section 83 sets "No" as a result of the decision made at step SH6, and proceeds to step SH7. When the last area and the area this time coincide with each other, the time slot setting section 83 sets "Yes" as a result of the decision made at step SH6. The time slot setting section 83 does not set a new time slot that corresponds to the area this time, to the information receiving section 82.

At step SH7, the time slot setting section 83 makes a decision as to whether the multiplex system is the time division multiplex (TDM) system or the code division multiplex (CDM) system. More specifically, the time slot setting section 83 confirms the preset multiplex system (the time division multiplex (TDM) system or the code division multiplex (CDM) system), and makes a decision at step SH7. In this case, the time slot setting section 83 confirms that the multiplex system is the time division multiplex (TDM) system, and proceeds to step SH9.

At step SH9, the time slot setting section 83 sets the time slot $TS_A$ (refer to FIG. 25) corresponding to the area #A that has been retrieved this time at step SH2, to the information receiving section 82. At step SH10, the information receiving section 82 extracts the information $I_A$ for the point A (refer to FIG. 12) of the time slot $TS_A$ that has been set by the time slot setting section 83, from the time division multiplexed information $I_{TDM}$ that has been received via the antenna 81. The information receiving section 82 then outputs this information $I_A$ for the point A, to the information display section 48.

The information display section 48 displays the information $I_A$ for the point A. Thereafter, the information receiving apparatus 80 that is mounted on the mobile unit $10_A$ repeats the execution of the processing at step SH1 to step SH10 shown in FIG. 26.

When the mobile unit $10_A$ that is in the moving state shown in FIG. 12 exists in the superimposed area #AB shown in FIG. 25, at step SH2, the time slot setting section 83 retrieves the area in which the mobile unit $10_A$ exists from the table (not shown), by using the self-position information $IP_A$ from the self-position calculating section 43 as a key. In this case, the as the mobile unit $10_A$ exists in both the area #A and the area #B shown in FIG. 25, the time slot setting section 83 retrieves the area #A and the area #B from the table, and proceeds to step SH3.

At step SH3, the time slot setting section 83 sets "Yes" as a result of the decision made, and proceeds to step SH4. At step SH4, as there are two areas (the area #A and the area #B) in which the mobile unit $10_A$ exists in the table, the time slot setting section 83 sets "Yes" as a result of the decision made, and proceeds to step SH5.

At step SH5, the time slot setting section 83 selects an area in which the distance between the self-position of the mobile unit $10_A$ and the center of the area is the shortest, from the area #A and the area #B shown in FIG. 25. In this case, it is assumed that the distance between the self-position of the mobile unit $10_A$ and an area center $O_B$ of the area #B is shorter than the distance between the self-position of the mobile unit $10_A$ and an area center $O_A$ of the area #A. Then, the time slot setting section 83 selects the area #B, and proceeds to step SH6.

At step SH6, the time slot setting section 83 makes a decision as to whether the area #B selected at step SH5 coincides with the area #A of the last time. As the two areas do not coincide with each other, the time slot setting section 83 sets "No" as a result of the decision made at step SH6, and proceeds to step SH7. At step SH7, the time slot setting section 83 decides that the multiplex system is the time division multiplex (TDM) system, and proceeds to step SH9.

At step SH9, the time slot setting section 83 sets the time slot $TS_B$ (refer to FIG. 25) corresponding to the area #B, to the information receiving section 82. At step SH10, the information receiving section 82 extracts the information $I_B$ for the point B (refer to FIG. 12) of the time slot $TS_B$ that has been set by the time slot setting section 83, from the time division multiplexed information $I_{TDM}$ that has been received via the antenna 81. The information receiving section 82 then outputs this information $I_B$ for the point B, to the information display section 48. The information display section 48 then displays the information $I_B$ for the point B in place of the information $I_A$ for the point A.

When the mobile unit $10_A$ shown in FIG. 12 exists outside the area #A to the area #D shown in FIG. 25, the time slot setting section 83 sets "No" as a result of the decision made at step SH3, and proceeds to step SH5. At step SH5, the time slot setting section 83 selects an area in which the distance between the self-position of the mobile unit $10_A$ and the center of the area is the shortest, from the area #A to the area #D shown in FIG. 25.

In this case, it is assumed that the distance between the self-position of the mobile unit $10_A$ and the area center $O_B$ of the area #B is the shortest. Then, the time slot setting section 83 selects the area #B, and proceeds to step SH6. Thereafter, through the above operation, the information receiving apparatus 80 of the mobile unit $10_A$ that exists outside the area receives the information $I_B$ for the point B, and displays this.

Although the description has been made of the case where the code division multiplex (CDM) system and the time division multiplex (TDM) system are employed in the seventh embodiment, it is also possible that the code division multiple access (CDMA) system and the time division multiple access (TDMA) system are employed in this embodiment.

Although the first embodiment to the seventh embodiment relating to the present invention have bee explained in detail with reference to the drawings, the detailed structure examples are not limited to the first to seventh embodiments. Any other modifications in the designs within the scope not deviating from the gist of the present invention are all included in the present invention. Although it has been explained that each of the above first to seventh embodiments is carried out independently of each other, it is also possible to implement the invention by combining two or more of the above embodiments. For example, the structure that uses the center 50 as explained in the third embodiment may also be applied to other embodiments than the third embodiment. In the above first to seventh embodiment, it may also be so arranged that a relay unit equipped with the relay function similar to that of the communication satellite 30 is mounted on a flying object such as an airship. The code division multiplexed information $I_{CDM}$, the code division multiple-accessed information $I_{CDMA}$, the time division multiplexed information $I_{TDM}$, or the time division multiple-accessed information $I_{TDMA}$ may be structured to be transmitted to the ground surface via this relay unit. Further, in the first to seventh embodiments, the information to be provided to the mobile unit may be any kind of information, such as image information, character information, sound information, etc.

In the above first to fourth and seventh embodiments, the description has been made of the examples where the PN code or the time slot corresponded to the information to be provided to the mobile unit is corresponded to a position (the position $P_A$ at the point A, etc.) or an area (the area $A_A$, etc.). However, the correspondence between the information is not limited to the above examples. As explained in the fifth and sixth embodiments, the information other than the position or area information (any kind of mobile unit associated information that is associated with the mobile unit, such as, for example, the moving speed of the mobile unit) may be corresponded to the PN code (or the time slot).

As detailed examples of the mobile unit associated information, there are following information shown in items (1) to (6).

(1) Information that shows a state of a mobile unit:
 (Moving speed, acceleration, moving direction, moving distance, fuel quantity, engine rotation number, etc.)

(2) Information that can be observed by a mobile unit:
 (Temperature, moisture, air pressure, oscillation, illuminance, ultraviolet rays quantity, noise volume, NOx volume, rainfall volume, intensity of electromagnetic wave, radiation volume, etc.)

(3) On-information relating to the functions of a mobile unit:
 (Light on, wiper on, back gear on, side brake on, air-conditioner on, audio apparatus on, air cleaner on, etc.)

(4) External environmental information at a position where a mobile unit is located:
 (Height, gradient, road surface state, type of road (highway, national road, prefecture road), road number, etc.)

(5) Information on a rider or driver of a mobile unit:
 (Age, youngster, middle-aged, the elderly, sex, occupation, address, etc.)

As explained above, according to the present invention, based on the transmission of the multiplex information to the ground surface from the relay unit in the sky, it becomes possible to provide information over an extremely wider range than it has been able to provide by the conventional highway radio. In principle, the installation of a minimum one transmitting station is sufficient. Therefore, there is an effect that it becomes possible to lower the installation cost.

Further, according to the present invention, the extraction information and the position information at which the mobile unit can exist are corresponded to each other in the table. At the same time, the self-position of the mobile unit and the contents information are corresponded to each other indirectly, and the extracted contents information is automatically changed along with the move of the mobile unit. Therefore, a user can handle the information providing system of this invention substantially better than the conventional on-demand type information providing system. As a result, there is an effect that it is possible to improve the quality of the information provision service.

Further, according to the present invention, the extraction information and the area information of an area in which the mobile unit can exist are corresponded to each other in the table. At the same time, the self-position of the mobile unit and the contents information are corresponded to each other indirectly, and the extracted contents information is automatically changed along with the move of the mobile unit. Therefore, a user can handle the information providing system of this invention substantially better than the conventional on-demand type information providing system. As a result, there is an effect that it is possible to improve the quality of the information provision service.

Further, according to the present invention, one retrieving station has the position information corresponding to the information relating to the self-position of the mobile unit and the extraction information, and one memory unit stores the table. Therefore, there is an effect that it becomes easy to carry out the maintenance of the table.

Further, according to the present invention, one retrieving station has the area information corresponding to the information relating to the self-position of the mobile unit and the extraction information, and one memory unit stores the table. Therefore, there is an effect that it becomes easy to carry out the maintenance of the table.

Further, according to the present invention, based on the transmission of the multiplex information to the ground surface from the relay unit in the sky, it becomes possible to provide information over an extremely wider range than it has been able to provide by the conventional highway radio. In principle, the installation of a minimum one transmitting station is sufficient for transmitting the multiplex information (contents information). Therefore, there is an effect that it becomes possible to lower the installation cost.

Further, according to the present invention, the mobile unit associated information and the extraction information are corresponded to each other in the table in advance. Along with the change in the mobile unit associated information, the extracted contents information is automatically changed. Therefore, a user can handle the information providing system of this invention substantially better than the conventional on-demand type information providing system. As a result, there is an effect that it is possible to improve the quality of the information provision service.

Further, according to the present invention, the moving speed and the extraction information are corresponded to each other in the table in advance. Along with the change in the moving speed, the extracted contents information is automatically changed. Therefore, a user can handle the information providing system of this invention substantially better than the conventional on-demand type information providing system. As a result, there is an effect that it is possible to improve the quality of the information provision service.

Further, according to the present invention, the information receiving apparatus employs the code division multiplex system or the time division multiplex system as a system for multiplexing a plurality of pieces of contents information. Therefore, based on the multiplex principle of the code division multiplex system or the time division multiplex system, the installation of only one transmitting station is sufficient. As a result, there is an effect that it becomes possible to substantially lower the installation cost as compared with the costs of the conventional highway radio and the VICS that employ the micro cell system.

Further, according to the present invention, the information receiving apparatus employs the code division multiple access system or the time division multiple access system as a system for multiplexing a plurality of pieces of contents information. Therefore, based on the multiplex principle of the code division multiple access system or the time division multiple access system, the transmitting stations may be installed by the number corresponding to the number of pieces of the contents information. As a result, there is an effect that it becomes possible to lower the installation cost as compared with the costs of the conventional highway radio and the VICS that employ the micro cell system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information providing system comprising:

a transmitting station which transmits multiplex information having a plurality of contents information to be provided to a mobile unit multiplexed, towards the ground via a relay unit provided in the sky; and an information receiving apparatus, mounted on said mobile unit, which receives the multiplex information, wherein said information receiving apparatus having, a receiving unit which receives the multiplex information;

a self-position detecting unit which detects a self-position of said mobile unit;

a memory unit which stores a table that represents a relationship between extraction information that is used for extracting contents information from the multiplex information and position information relating to a position at which said mobile unit can exist;

a retrieving unit which retrieves the position information corresponding to the self-position from the table, and then retrieves the extraction information corresponding to the position information; and an extracting unit which extracts the contents information from the multiplex information that has been received by said receiving unit, based on the extraction information retrieved from said retrieving unit.

2. An information providing system comprising:

a transmitting station which transmits multiplex information having a plurality of contents information to be provided to a mobile unit multiplexed, towards the ground via a relay unit provided in the sky; and an information receiving apparatus, mounted on said mobile unit, which receives the multiplex information, wherein said information receiving apparatus having, a receiving unit which receives the multiplex information;

a self-position detecting unit which detects a self-position of said mobile unit;

a memory unit which stores a table that represent a relationship between extraction information that is used for extracting contents information from the multiplex information and area information relating to an area in which said mobile unit can exist;

a retrieving unit which retrieves the area information corresponding to the self-position from the table, and then retrieves the extraction information corresponding to the area information; and an extracting unit which extracts the contents information from the multiplex information that has been received by said receiving unit, based on the extraction information retrieved from said retrieving unit.

3. An information providing system comprising:

a transmitting station which transmits multiplex information having a plurality of contents information to be provided to a mobile unit multiplexed, towards the ground via a relay unit provided in the sky;

an information receiving apparatus, mounted on said mobile unit, which receives the multiplex information; and a retrieving station which retrieves extraction information that is used for extracting contents information from the multiplex information, wherein wherein said information receiving apparatus having, a receiving unit which receives the multiplex information;

a self-position detecting unit which detects a self-position of said mobile unit;

a transmitting/receiving unit which transmits information relating to the self-position to said retrieving station and receives the extraction information transmitted from said retrieving station; and an extracting unit which extracts the contents information from the multiplex information that has been received by said receiving unit based on the extraction information, and said retrieving station having, a retrieving station-side receiving unit which receives information relating to the self-position that has been transmitted from said transmitting/receiving unit;

a memory unit for storing a table that represents a relationship between the extraction information and position information relating to a position at which said mobile unit can exist;

a retrieving unit which retrieves the position information corresponding to the self-position from the table, and then retrieves the extraction information corresponding to the position information; and a retrieving station-side transmitting unit which transmits the extraction information to said transmitting/receiving unit.

4. An information providing system comprising:

a transmitting station which transmits multiplex information having a plurality of contents information to be provided to a mobile unit multiplexed, towards the ground via a relay unit provided in the sky;

an information receiving apparatus, mounted on said mobile unit, which receives the multiplex information; and a retrieving station which retrieves extraction information that is used for extracting contents information from the multiplex information, wherein wherein said information receiving apparatus having, a receiving unit which receives the multiplex information;

a self -position detecting unit which detects a self -position of said mobile unit;

a transmitting/receiving unit which transmits information relating to the self-position to said retrieving station and receives the extraction information transmitted from said retrieving station; and an extracting unit which extracts the contents information from the multiplex information that has been received by said receiving unit based on the extraction information, and said retrieving station having, a retrieving station-side receiving unit which receives information relating to the self-position that has been transmitted from said transmitting/receiving unit;

a memory unit which stores a table that represents a relationship between the extraction information and area information relating to an area in which said mobile unit can exist;

a retrieving unit which retrieves the area information corresponding to the self-position from the table, and then retrieves the extraction information corresponding to the area information; and a retrieving station-side transmitting unit which transmits the extraction information to said transmitting/receiving unit.

5. An information receiving apparatus comprising:

a receiving unit, mounted on a mobile unit, which receives multiplex information that has been transmitted to the ground via a relay unit provided in the sky and that has a plurality of contents information multiplexed;

a self-position detecting unit which detects a self-position of said mobile unit;

a memory unit which stores a table that represents a relationship between extraction information that is used for extracting contents information from the multiplex information and position information relating to a position at which said mobile unit can exist;

a retrieving unit which retrieves the position information corresponding to the self-position from the table, and then retrieves the extraction information corresponding to the position information; and an extracting unit which extracts the contents information from the multiplex information that has been received by said receiving unit, based on the extraction information retrieved from said retrieving unit.

6. The information receiving apparatus according to claim 5, wherein the multiplex information has been multiplexed by a code division multiplex system or a time division multiplex system.

7. The information receiving apparatus according to claim 5, wherein the multiplex information has been multiplexed by a code division multiple access system or a time division multiple access system.

8. An information receiving apparatus comprising:

a receiving unit, mounted on a mobile unit, which receives multiplex information that has been transmitted to the ground via a relay unit provided in the sky and that has a plurality of contents information multiplexed;

a self-position detecting unit which detects a self-position of said mobile unit;

a memory unit which stores a table that represents a relationship between extraction information that is used for extracting contents information from the multiplex information and area information relating to an area in which said mobile unit can exist;

a retrieving unit which retrieves the area information corresponding to the self-position from the table, and then retrieves the extraction information corresponding to the area information; and an extracting unit which extracts the contents information from the multiplex information that has been received by said receiving unit, based on the extraction information retrieved from said retrieving unit.

9. An information receiving apparatus comprising:

a receiving unit, mounted on a mobile unit, which receives multiplex information that has been transmitted to the ground via a relay unit provided in the sky and that has a plurality of contents information multiplexed;

a collecting unit which collects mobile unit associated information that relates to said mobile unit;

a memory unit which stores a table that represents a relationship between extraction information that is used for extracting contents information from the multiplex information and said mobile unit associated information;

a retrieving unit which retrieves the extraction information corresponding to said mobile unit associated information from the table, using the mobile unit associated information collected from said collecting unit as a key; and an extracting unit which extracts the contents information from the multiplex information that has been received by said receiving unit, based on the extraction information retrieved from said retrieving unit.

10. The information receiving apparatus according to claim 9, wherein the mobile unit associated information is the moving speed of said mobile unit.

* * * * *